US012299125B2

(12) United States Patent
Raman et al.

(10) Patent No.: US 12,299,125 B2
(45) Date of Patent: May 13, 2025

(54) USE OF DATA ENTANGLEMENT FOR IMPROVING THE SECURITY OF SEARCH INDEXES WHILE USING NATIVE ENTERPRISE SEARCH ENGINES AND FOR PROTECTING COMPUTER SYSTEMS AGAINST MALWARE INCLUDING RANSOMWARE

(71) Applicant: Titaniam, Inc., Los Gatos, CA (US)

(72) Inventors: Arti Raman, Los Gatos, CA (US); Nikita Raman, Los Gatos, CA (US); Karthikeyan Mariappan, Los Gatos, CA (US); Fadil Mesic, Los Gatos, CA (US); Seshadhri Pakshi Rajan, Los Gatos, CA (US); Prasad Kommuju, Los Gatos, CA (US)

(73) Assignee: Portal26, Inc., Los Gatos, CA (US)

( * ) Notice: Subject to any disclaimer, the term of this patent is extended or adjusted under 35 U.S.C. 154(b) by 427 days.

(21) Appl. No.: 17/512,546

(22) Filed: Oct. 27, 2021

(65) Prior Publication Data

US 2022/0129552 A1 Apr. 28, 2022

Related U.S. Application Data

(60) Provisional application No. 63/156,803, filed on Mar. 4, 2021, provisional application No. 63/106,253, filed on Oct. 27, 2020.

(51) Int. Cl.
*G06F 21/56* (2013.01)
*G06F 16/22* (2019.01)
(Continued)

(52) U.S. Cl.
CPC ........ *G06F 21/566* (2013.01); *G06F 16/2264* (2019.01); *G06F 16/953* (2019.01); *G06F 21/602* (2013.01); *G06F 2221/034* (2013.01)

(58) Field of Classification Search
CPC .. G06F 21/566; G06F 21/602; G06F 16/2264; G06F 16/953; G06F 2221/034; H04L 9/005
See application file for complete search history.

(56) References Cited

U.S. PATENT DOCUMENTS

2010/0111297 A1 5/2010 Pauker et al.
2010/0250497 A1 9/2010 Redlich et al.
(Continued)

OTHER PUBLICATIONS

International Search Report and Written Opinion issued Mar. 2, 2022 in corresponding PCT Application No. PCT/US2021/56904, filed Oct. 27, 2021. Inventor(s) Raman, Arti et al.

*Primary Examiner* — Matthew T Henning
(74) *Attorney, Agent, or Firm* — Goodwin Procter LLP

(57) ABSTRACT

A method for preprocessing cleartext strings. In some embodiments, the method includes creating dynamic multidimensional spaces based on a key. The method further includes creating a position specific variability for the cleartext strings to form a preprocessed strings, where characters that appear in different positions within the cleartext strings are encoded differently in the preprocessed strings. The method also includes applying encryption to the preprocessed strings or to preprocessed string fragments to form encrypted preprocessed strings, where the encrypted preprocessed strings are searchable in a search index.

20 Claims, 46 Drawing Sheets

(51) Int. Cl.
*G06F 16/953* (2019.01)
*G06F 21/60* (2013.01)

(56) References Cited

U.S. PATENT DOCUMENTS

| | | | | |
|---|---|---|---|---|
| 2016/0366113 | A1* | 12/2016 | Dawoud | G06F 16/14 |
| 2017/0078251 | A1* | 3/2017 | Grubbs | G06F 16/951 |
| 2019/0220620 | A1* | 7/2019 | Hahn | H04L 63/0428 |
| 2020/0059350 | A1 | 2/2020 | Nandan et al. | |

* cited by examiner

| | | | | | | |
|---|---|---|---|---|---|---|
| F5R1C1 | F5R1C2 | F5R1C3 | F5R1C4 | F5R1C5 | F5R1C6 | F5R1C7 |
| 197 | 198 | 199 | 200 | 201 | 202 | 203 |
| F5R2C1 | F5R2C2 | F5R2C3 | F5R2C4 | F5R2C5 | F5R2C6 | F5R2C7 |
| 204 | 205 | 206 | 207 | 208 | 209 | 210 |
| F5R3C1 | F5R3C2 | F5R3C3 | F5R3C4 | F5R3C5 | F5R3C6 | F5R3C7 |
| 211 | 212 | 213 | 214 | 215 | 216 | 217 |
| F5R4C1 | F5R4C2 | F5R4C3 | F5R4C4 | F5R4C5 | F5R4C6 | F5R4C7 |
| 218 | 219 | 220 | 221 | 222 | 223 | 224 |
| F5R5C1 | F5R5C2 | F5R5C3 | F5R5C4 | F5R5C5 | F5R5C6 | F5R5C7 |
| 225 | 226 | 227 | 228 | 229 | 230 | 231 |
| F5R6C1 | F5R6C2 | F5R6C3 | F5R6C4 | F5R6C5 | F5R6C6 | F5R6C7 |
| 231 | 232 | 233 | 234 | 235 | 236 | 237 |
| F5R7C1 | F5R7C2 | F5R7C3 | F5R7C4 | F5R7C5 | F5R7C6 | F5R7C7 |
| 239 | 240 | 241 | 242 | 243 | 244 | 245 |

| | | | | | | | | | | | | | | | | | | | | | | | | | | | |
|---|---|---|---|---|---|---|---|---|---|---|---|---|---|---|---|---|---|---|---|---|---|---|---|---|---|---|---|
| F1R1C1 | F1R1C2 | F1R1C3 | F1R1C4 | F1R1C5 | F1R1C6 | F1R1C7 | F2R1C1 | F2R1C2 | F2R1C3 | F2R1C4 | F2R1C5 | F2R1C6 | F2R1C7 | F3R1C1 | F3R1C2 | F3R1C3 | F3R1C4 | F3R1C5 | F3R1C6 | F3R1C7 | F4R1C1 | F4R1C2 | F4R1C3 | F4R1C4 | F4R1C5 | F4R1C6 | F4R1C7 |
| 1 | 2 | 3 | 4 | 5 | 6 | 7 | 50 | 51 | 52 | 53 | 54 | 55 | 56 | 99 | 100 | 101 | 102 | 103 | 104 | 105 | 148 | 149 | 150 | 151 | 152 | 153 | 154 |
| F1R2C1 | F1R2C2 | F1R2C3 | F1R2C4 | F1R2C5 | F1R2C6 | F1R2C7 | F2R2C1 | F2R2C2 | F2R2C3 | F2R2C4 | F2R2C5 | F2R2C6 | F2R2C7 | F3R2C1 | F3R2C2 | F3R2C3 | F3R2C4 | F3R2C5 | F3R2C6 | F3R2C7 | F4R2C1 | F4R2C2 | F4R2C3 | F4R2C4 | F4R2C5 | F4R2C6 | F4R2C7 |
| 8 | 9 | 10 | 11 | 12 | 13 | 14 | 57 | 58 | 59 | 60 | 61 | 62 | 63 | 106 | 107 | 108 | 109 | 110 | 111 | 112 | 155 | 156 | 157 | 158 | 159 | 160 | 161 |
| F1R3C1 | F1R3C2 | F1R3C3 | F1R3C4 | F1R3C5 | F1R3C6 | F1R3C7 | F2R3C1 | F2R3C2 | F2R3C3 | F2R3C4 | F2R3C5 | F2R3C6 | F2R3C7 | F3R3C1 | F3R3C2 | F3R3C3 | F3R3C4 | F3R3C5 | F3R3C6 | F3R3C7 | F4R3C1 | F4R3C2 | F4R3C3 | F4R3C4 | F4R3C5 | F4R3C6 | F4R3C7 |
| 15 | 16 | 17 | 18 | 19 | 20 | 21 | 64 | 65 | 66 | 67 | 68 | 69 | 70 | 113 | 114 | 115 | 116 | 117 | 118 | 119 | 162 | 163 | 164 | 165 | 166 | 167 | 168 |
| F1R4C1 | F1R4C2 | F1R4C3 | F1R4C4 | F1R4C5 | F1R4C6 | F1R4C7 | F2R4C1 | F2R4C2 | F2R4C3 | F2R4C4 | F2R4C5 | F2R4C6 | F2R4C7 | F3R4C1 | F3R4C2 | F3R4C3 | F3R4C4 | F3R4C5 | F3R4C6 | F3R4C7 | F4R4C1 | F4R4C2 | F4R4C3 | F4R4C4 | F4R4C5 | F4R4C6 | F4R4C7 |
| 22 | 23 | 24 | 25 | 26 | 27 | 28 | 71 | 72 | 73 | 74 | 75 | 76 | 77 | 120 | 121 | 122 | 123 | 124 | 125 | 126 | 169 | 170 | 171 | 172 | 173 | 174 | 175 |
| F1R5C1 | F1R5C2 | F1R5C3 | F1R5C4 | F1R5C5 | F1R5C6 | F1R5C7 | F2R5C1 | F2R5C2 | F2R5C3 | F2R5C4 | F2R5C5 | F2R5C6 | F2R5C7 | F3R5C1 | F3R5C2 | F3R5C3 | F3R5C4 | F3R5C5 | F3R5C6 | F3R5C7 | F4R5C1 | F4R5C2 | F4R5C3 | F4R5C4 | F4R5C5 | F4R5C6 | F4R5C7 |
| 29 | 30 | 31 | 32 | 33 | 34 | 35 | 78 | 79 | 80 | 81 | 82 | 83 | 84 | 127 | 128 | 129 | 130 | 131 | 132 | 133 | 176 | 177 | 178 | 179 | 180 | 181 | 182 |
| F1R6C1 | F1R6C2 | F1R6C3 | F1R6C4 | F1R6C5 | F1R6C6 | F1R6C7 | F2R6C1 | F2R6C2 | F2R6C3 | F2R6C4 | F2R6C5 | F2R6C6 | F2R6C7 | F3R6C1 | F3R6C2 | F3R6C3 | F3R6C4 | F3R6C5 | F3R6C6 | F3R6C7 | F4R6C1 | F4R6C2 | F4R6C3 | F4R6C4 | F4R6C5 | F4R6C6 | F4R6C7 |
| 36 | 37 | 38 | 39 | 40 | 41 | 42 | 85 | 86 | 87 | 88 | 89 | 90 | 91 | 134 | 135 | 136 | 137 | 138 | 139 | 140 | 183 | 184 | 185 | 186 | 187 | 188 | 189 |
| F1R7C1 | F1R7C2 | F1R7C3 | F1R7C4 | F1R7C5 | F1R7C6 | F1R7C7 | F2R7C1 | F2R7C2 | F2R7C3 | F2R7C4 | F2R7C5 | F2R7C6 | F2R7C7 | F3R7C1 | F3R7C2 | F3R7C3 | F3R7C4 | F3R7C5 | F3R7C6 | F3R7C7 | F4R7C1 | F4R7C2 | F4R7C3 | F4R7C4 | F4R7C5 | F4R7C6 | F4R7C7 |
| 43 | 44 | 45 | 46 | 47 | 48 | 49 | 92 | 93 | 94 | 95 | 96 | 97 | 98 | 141 | 142 | 143 | 144 | 145 | 146 | 147 | 190 | 191 | 192 | 193 | 194 | 195 | 196 |

| | | | | | | |
|---|---|---|---|---|---|---|
| F6R1C1 | F6R1C2 | F6R1C3 | F6R1C4 | F6R1C5 | F6R1C6 | F6R1C7 |
| 246 | 247 | 248 | 249 | 250 | 251 | 252 |
| F6R2C1 | F6R2C2 | F6R2C3 | F6R2C4 | F6R2C5 | F6R2C6 | F6R2C7 |
| 253 | 254 | 255 | 256 | 257 | 258 | 259 |
| F6R3C1 | F6R3C2 | F6R3C3 | F6R3C4 | F6R3C5 | F6R3C6 | F6R3C7 |
| 260 | 261 | 262 | 263 | 264 | 265 | 266 |
| F6R4C1 | F6R4C2 | F6R4C3 | F6R4C4 | F6R4C5 | F6R4C6 | F6R4C7 |
| 267 | 268 | 269 | 270 | 271 | 272 | 273 |
| F6R5C1 | F6R5C2 | F6R5C3 | F6R5C4 | F6R5C5 | F6R5C6 | F6R5C7 |
| 274 | 275 | 276 | 277 | 278 | 279 | 280 |
| F6R6C1 | F6R6C2 | F6R6C3 | F6R6C4 | F6R6C5 | F6R6C6 | F6R6C7 |
| 281 | 282 | 283 | 284 | 285 | 286 | 287 |
| F6R7C1 | F6R7C2 | F6R7C3 | F6R7C4 | F6R7C5 | F6R7C6 | F6R7C7 |
| 288 | 289 | 290 | 291 | 292 | 293 | 0 |

Fig. 2

Move 2

Move 3

Move 4

Move 5

Move 6

| | | | | | | | | | | | | | | | | | | | | | | | | | | | |
|---|---|---|---|---|---|---|---|---|---|---|---|---|---|---|---|---|---|---|---|---|---|---|---|---|---|---|---|
| | | | | | | | F5R1C1 | F5R1C2 | F5R1C3 | F5R1C4 | F5R1C5 | F5R1C6 | F5R1C7 | | | | | | | | | | | | | | |
| | | | | | | | 197 | 198 | 199 | 200 | 201 | 202 | 203 | | | | | | | | | | | | | | |
| | | | | | | | F5R2C1 | F5R2C2 | F5R2C3 | F5R2C4 | F5R2C5 | F5R2C6 | F5R2C7 | | | | | | | | | | | | | | |
| | | | | | | | 204 | 205 | 206 | 207 | 208 | 209 | 210 | | | | | | | | | | | | | | |
| | | | | | | | F5R3C1 | F5R3C2 | F5R3C3 | F5R3C4 | F5R3C5 | F5R3C6 | F5R3C7 | | | | | | | | | | | | | | |
| | | | | | | | 211 | 212 | 213 | 214 | 215 | 216 | 217 | | | | | | | | | | | | | | |
| | | | | | | | F5R4C1 | F5R4C2 | F5R4C3 | F5R4C4 | F5R4C5 | F5R4C6 | F5R4C7 | | | | | | | | | | | | | | |
| | | | | | | | 218 | 219 | 220 | 221 | 222 | 223 | 224 | | | | | | | | | | | | | | |
| | | | | | | | F5R5C1 | F5R5C2 | F5R5C3 | F5R5C4 | F5R5C5 | F5R5C6 | F5R5C7 | | | | | | | | | | | | | | |
| | | | | | | | 225 | 226 | 227 | 228 | 229 | 230 | 231 | | | | | | | | | | | | | | |
| | | | | | | | F5R6C1 | F5R6C2 | F5R6C3 | F5R6C4 | F5R6C5 | F5R6C6 | F5R6C7 | | | | | | | | | | | | | | |
| | | | | | | | 231 | 232 | 233 | 234 | 235 | 236 | 237 | | | | | | | | | | | | | | |
| | | | | | | | F5R7C1 | F5R7C2 | F5R7C3 | F5R7C4 | F5R7C5 | F5R7C6 | F5R7C7 | | | | | | | | | | | | | | |
| | | | | | | | 239 | 240 | 241 | 242 | 243 | 244 | 245 | | | | | | | | | | | | | | |
| F1R1C1 | F1R1C2 | F1R1C3 | F1R1C4 | F1R1C5 | F1R1C6 | F1R1C7 | F2R1C1 | F2R1C2 | F2R1C3 | F2R1C4 | F2R1C5 | F2R1C6 | F2R1C7 | F3R1C1 | F3R1C2 | F3R1C3 | F3R1C4 | F3R1C5 | F3R1C6 | F3R1C7 | F4R1C1 | F4R1C2 | F4R1C3 | F4R1C4 | F4R1C5 | F4R1C6 | F4R1C7 |
| 1 | 2 | 3 | 4 | 5 | 6 | 7 | 50 | 51 | 52 | 53 | 54 | 55 | 56 | 99 | 100 | 101 | 102 | 103 | 104 | 105 | 148 | 149 | 150 | 151 | 152 | 153 | 154 |
| F1R2C1 | F1R2C2 | F1R2C3 | F1R2C4 | F1R2C5 | F1R2C6 | F1R2C7 | F2R2C1 | F2R2C2 | F2R2C3 | F2R2C4 | F2R2C5 | F2R2C6 | F2R2C7 | F3R2C1 | F3R2C2 | F3R2C3 | F3R2C4 | F3R2C5 | F3R2C6 | F3R2C7 | F4R2C1 | F4R2C2 | F4R2C3 | F4R2C4 | F4R2C5 | F4R2C6 | F4R2C7 |
| 8 | 9 | 10 | 11 | 12 | 13 | 14 | 57 | 58 | 59 | 60 | 61 | 62 | 63 | 106 | 107 | 108 | 109 | 110 | 111 | 112 | 155 | 156 | 157 | 158 | 159 | 160 | 161 |
| F1R3C1 | F1R3C2 | F1R3C3 | F1R3C4 | F1R3C5 | F1R3C6 | F1R3C7 | F2R3C1 | F2R3C2 | F2R3C3 | F2R3C4 | F2R3C5 | F2R3C6 | F2R3C7 | F3R3C1 | F3R3C2 | F3R3C3 | F3R3C4 | F3R3C5 | F3R3C6 | F3R3C7 | F4R3C1 | F4R3C2 | F4R3C3 | F4R3C4 | F4R3C5 | F4R3C6 | F4R3C7 |
| 64 | 65 | 66 | 67 | 68 | 69 | 70 | 113 | 114 | 115 | 116 | 117 | 118 | 119 | 162 | 163 | 164 | 165 | 166 | 167 | 168 | 15 | 16 | 17 | 18 | 19 | 20 | 21 |
| F1R4C1 | F1R4C2 | F1R4C3 | F1R4C4 | F1R4C5 | F1R4C6 | F1R4C7 | F2R4C1 | F2R4C2 | F2R4C3 | F2R4C4 | F2R4C5 | F2R4C6 | F2R4C7 | F3R4C1 | F3R4C2 | F3R4C3 | F3R4C4 | F3R4C5 | F3R4C6 | F3R4C7 | F4R4C1 | F4R4C2 | F4R4C3 | F4R4C4 | F4R4C5 | F4R4C6 | F4R4C7 |
| 22 | 23 | 24 | 25 | 26 | 27 | 28 | 71 | 72 | 73 | 74 | 75 | 76 | 77 | 120 | 121 | 122 | 123 | 124 | 125 | 126 | 169 | 170 | 171 | 172 | 173 | 174 | 175 |
| F1R5C1 | F1R5C2 | F1R5C3 | F1R5C4 | F1R5C5 | F1R5C6 | F1R5C7 | F2R5C1 | F2R5C2 | F2R5C3 | F2R5C4 | F2R5C5 | F2R5C6 | F2R5C7 | F3R5C1 | F3R5C2 | F3R5C3 | F3R5C4 | F3R5C5 | F3R5C6 | F3R5C7 | F4R5C1 | F4R5C2 | F4R5C3 | F4R5C4 | F4R5C5 | F4R5C6 | F4R5C7 |
| 29 | 30 | 31 | 32 | 33 | 34 | 35 | 78 | 79 | 80 | 81 | 82 | 83 | 84 | 127 | 128 | 129 | 130 | 131 | 132 | 133 | 176 | 177 | 178 | 179 | 180 | 181 | 182 |
| F1R6C1 | F1R6C2 | F1R6C3 | F1R6C4 | F1R6C5 | F1R6C6 | F1R6C7 | F2R6C1 | F2R6C2 | F2R6C3 | F2R6C4 | F2R6C5 | F2R6C6 | F2R6C7 | F3R6C1 | F3R6C2 | F3R6C3 | F3R6C4 | F3R6C5 | F3R6C6 | F3R6C7 | F4R6C1 | F4R6C2 | F4R6C3 | F4R6C4 | F4R6C5 | F4R6C6 | F4R6C7 |
| 36 | 37 | 38 | 39 | 40 | 41 | 42 | 85 | 86 | 87 | 88 | 89 | 90 | 91 | 134 | 135 | 136 | 137 | 138 | 139 | 140 | 183 | 184 | 185 | 186 | 187 | 188 | 189 |
| F1R7C1 | F1R7C2 | F1R7C3 | F1R7C4 | F1R7C5 | F1R7C6 | F1R7C7 | F2R7C1 | F2R7C2 | F2R7C3 | F2R7C4 | F2R7C5 | F2R7C6 | F2R7C7 | F3R7C1 | F3R7C2 | F3R7C3 | F3R7C4 | F3R7C5 | F3R7C6 | F3R7C7 | F4R7C1 | F4R7C2 | F4R7C3 | F4R7C4 | F4R7C5 | F4R7C6 | F4R7C7 |
| 43 | 44 | 45 | 46 | 47 | 48 | 49 | 92 | 93 | 94 | 95 | 96 | 97 | 98 | 141 | 142 | 143 | 144 | 145 | 146 | 147 | 190 | 191 | 192 | 193 | 194 | 195 | 196 |
| | | | | | | | F6R1C1 | F6R1C2 | F6R1C3 | F6R1C4 | F6R1C5 | F6R1C6 | F6R1C7 | | | | | | | | | | | | | | |
| | | | | | | | 246 | 247 | 248 | 249 | 250 | 251 | 252 | | | | | | | | | | | | | | |
| | | | | | | | F6R2C1 | F6R2C2 | F6R2C3 | F6R2C4 | F6R2C5 | F6R2C6 | F6R2C7 | | | | | | | | | | | | | | |
| | | | | | | | 253 | 254 | 255 | 256 | 257 | 258 | 259 | | | | | | | | | | | | | | |
| | | | | | | | F6R3C1 | F6R3C2 | F6R3C3 | F6R3C4 | F6R3C5 | F6R3C6 | F6R3C7 | | | | | | | | | | | | | | |
| | | | | | | | 260 | 261 | 262 | 263 | 264 | 265 | 266 | | | | | | | | | | | | | | |
| | | | | | | | F6R4C1 | F6R4C2 | F6R4C3 | F6R4C4 | F6R4C5 | F6R4C6 | F6R4C7 | | | | | | | | | | | | | | |
| | | | | | | | 267 | 268 | 269 | 270 | 271 | 272 | 273 | | | | | | | | | | | | | | |
| | | | | | | | F6R5C1 | F6R5C2 | F6R5C3 | F6R5C4 | F6R5C5 | F6R5C6 | F6R5C7 | | | | | | | | | | | | | | |
| | | | | | | | 274 | 275 | 276 | 277 | 278 | 279 | 280 | | | | | | | | | | | | | | |
| | | | | | | | F6R6C1 | F6R6C2 | F6R6C3 | F6R6C4 | F6R6C5 | F6R6C6 | F6R6C7 | | | | | | | | | | | | | | |
| | | | | | | | 281 | 282 | 283 | 284 | 285 | 286 | 287 | | | | | | | | | | | | | | |
| | | | | | | | F6R7C1 | F6R7C2 | F6R7C3 | F6R7C4 | F6R7C5 | F6R7C6 | F6R7C7 | | | | | | | | | | | | | | |
| | | | | | | | 288 | 289 | 290 | 291 | 292 | 293 | 0 | | | | | | | | | | | | | | |

Fig. 8

Move 7

Move 8

| | | | | | | | | | | | | | | | | | | | | | | | | | | | |
|---|---|---|---|---|---|---|---|---|---|---|---|---|---|---|---|---|---|---|---|---|---|---|---|---|---|---|---|
| | | | | | | | F5R1C1 | F5R1C2 | F5R1C3 | F5R1C4 | F5R1C5 | F5R1C6 | F5R1C7 | | | | | | | | | | | | | | |
| | | | | | | | 197 | 198 | 199 | 200 | 201 | 202 | 203 | | | | | | | | | | | | | | |
| | | | | | | | F5R2C1 | F5R2C2 | F5R2C3 | F5R2C4 | F5R2C5 | F5R2C6 | F5R2C7 | | | | | | | | | | | | | | |
| | | | | | | | 204 | 205 | 206 | 207 | 208 | 209 | 210 | | | | | | | | | | | | | | |
| | | | | | | | F5R3C1 | F5R3C2 | F5R3C3 | F5R3C4 | F5R3C5 | F5R3C6 | F5R3C7 | | | | | | | | | | | | | | |
| | | | | | | | 211 | 212 | 213 | 214 | 215 | 216 | 217 | | | | | | | | | | | | | | |
| | | | | | | | F5R4C1 | F5R4C2 | F5R4C3 | F5R4C4 | F5R4C5 | F5R4C6 | F5R4C7 | | | | | | | | | | | | | | |
| | | | | | | | 218 | 219 | 220 | 221 | 222 | 223 | 224 | | | | | | | | | | | | | | |
| | | | | | | | F5R5C1 | F5R5C2 | F5R5C3 | F5R5C4 | F5R5C5 | F5R5C6 | F5R5C7 | | | | | | | | | | | | | | |
| | | | | | | | 225 | 226 | 227 | 228 | 229 | 230 | 231 | | | | | | | | | | | | | | |
| | | | | | | | F5R6C1 | F5R6C2 | F5R6C3 | F5R6C4 | F5R6C5 | F5R6C6 | F5R6C7 | | | | | | | | | | | | | | |
| | | | | | | | 231 | 232 | 233 | 234 | 235 | 236 | 237 | | | | | | | | | | | | | | |
| | | | | | | | F5R7C1 | F5R7C2 | F5R7C3 | F5R7C4 | F5R7C5 | F5R7C6 | F5R7C7 | | | | | | | | | | | | | | |
| | | | | | | | 239 | 240 | 241 | 242 | 243 | 244 | 245 | | | | | | | | | | | | | | |
| F1R1C1 | F1R1C2 | F1R1C3 | F1R1C4 | F1R1C5 | F1R1C6 | F1R1C7 | F2R1C1 | F2R1C2 | F2R1C3 | F2R1C4 | F2R1C5 | F2R1C6 | F2R1C7 | F3R1C1 | F3R1C2 | F3R1C3 | F3R1C4 | F3R1C5 | F3R1C6 | F3R1C7 | F4R1C1 | F4R1C2 | F4R1C3 | F4R1C4 | F4R1C5 | F4R1C6 | F4R1C7 |
| 1 | 2 | 3 | 4 | 5 | 6 | 7 | 50 | 51 | 52 | 53 | 54 | 55 | 56 | 99 | 100 | 101 | 102 | 103 | 104 | 105 | 148 | 149 | 150 | 151 | 152 | 153 | 154 |
| F1R2C1 | F1R2C2 | F1R2C3 | F1R2C4 | F1R2C5 | F1R2C6 | F1R2C7 | F2R2C1 | F2R2C2 | F2R2C3 | F2R2C4 | F2R2C5 | F2R2C6 | F2R2C7 | F3R2C1 | F3R2C2 | F3R2C3 | F3R2C4 | F3R2C5 | F3R2C6 | F3R2C7 | F4R2C1 | F4R2C2 | F4R2C3 | F4R2C4 | F4R2C5 | F4R2C6 | F4R2C7 |
| 8 | 9 | 10 | 11 | 12 | 13 | 14 | 57 | 58 | 59 | 60 | 61 | 62 | 63 | 106 | 107 | 108 | 109 | 110 | 111 | 112 | 155 | 156 | 157 | 158 | 159 | 160 | 161 |
| F1R3C1 | F1R3C2 | F1R3C3 | F1R3C4 | F1R3C5 | F1R3C6 | F1R3C7 | F2R3C1 | F2R3C2 | F2R3C3 | F2R3C4 | F2R3C5 | F2R3C6 | F2R3C7 | F3R3C1 | F3R3C2 | F3R3C3 | F3R3C4 | F3R3C5 | F3R3C6 | F3R3C7 | F4R3C1 | F4R3C2 | F4R3C3 | F4R3C4 | F4R3C5 | F4R3C6 | F4R3C7 |
| 15 | 16 | 17 | 18 | 19 | 20 | 21 | 64 | 65 | 66 | 67 | 68 | 69 | 70 | 113 | 114 | 115 | 116 | 117 | 118 | 119 | 162 | 163 | 164 | 165 | 166 | 167 | 168 |
| F1R4C1 | F1R4C2 | F1R4C3 | F1R4C4 | F1R4C5 | F1R4C6 | F1R4C7 | F2R4C1 | F2R4C2 | F2R4C3 | F2R4C4 | F2R4C5 | F2R4C6 | F2R4C7 | F3R4C1 | F3R4C2 | F3R4C3 | F3R4C4 | F3R4C5 | F3R4C6 | F3R4C7 | F4R4C1 | F4R4C2 | F4R4C3 | F4R4C4 | F4R4C5 | F4R4C6 | F4R4C7 |
| 71 | 72 | 73 | 74 | 75 | 76 | 77 | 120 | 121 | 122 | 123 | 124 | 125 | 126 | 169 | 170 | 171 | 172 | 173 | 174 | 175 | 22 | 23 | 24 | 25 | 26 | 27 | 28 |
| F1R5C1 | F1R5C2 | F1R5C3 | F1R5C4 | F1R5C5 | F1R5C6 | F1R5C7 | F2R5C1 | F2R5C2 | F2R5C3 | F2R5C4 | F2R5C5 | F2R5C6 | F2R5C7 | F3R5C1 | F3R5C2 | F3R5C3 | F3R5C4 | F3R5C5 | F3R5C6 | F3R5C7 | F4R5C1 | F4R5C2 | F4R5C3 | F4R5C4 | F4R5C5 | F4R5C6 | F4R5C7 |
| 29 | 30 | 31 | 32 | 33 | 34 | 35 | 78 | 79 | 80 | 81 | 82 | 83 | 84 | 127 | 128 | 129 | 130 | 131 | 132 | 133 | 176 | 177 | 178 | 179 | 180 | 181 | 182 |
| F1R6C1 | F1R6C2 | F1R6C3 | F1R6C4 | F1R6C5 | F1R6C6 | F1R6C7 | F2R6C1 | F2R6C2 | F2R6C3 | F2R6C4 | F2R6C5 | F2R6C6 | F2R6C7 | F3R6C1 | F3R6C2 | F3R6C3 | F3R6C4 | F3R6C5 | F3R6C6 | F3R6C7 | F4R6C1 | F4R6C2 | F4R6C3 | F4R6C4 | F4R6C5 | F4R6C6 | F4R6C7 |
| 36 | 37 | 38 | 39 | 40 | 41 | 42 | 85 | 86 | 87 | 88 | 89 | 90 | 91 | 134 | 135 | 136 | 137 | 138 | 139 | 140 | 183 | 184 | 185 | 186 | 187 | 188 | 189 |
| F1R7C1 | F1R7C2 | F1R7C3 | F1R7C4 | F1R7C5 | F1R7C6 | F1R7C7 | F2R7C1 | F2R7C2 | F2R7C3 | F2R7C4 | F2R7C5 | F2R7C6 | F2R7C7 | F3R7C1 | F3R7C2 | F3R7C3 | F3R7C4 | F3R7C5 | F3R7C6 | F3R7C7 | F4R7C1 | F4R7C2 | F4R7C3 | F4R7C4 | F4R7C5 | F4R7C6 | F4R7C7 |
| 43 | 44 | 45 | 46 | 47 | 48 | 49 | 92 | 93 | 94 | 95 | 96 | 97 | 98 | 141 | 142 | 143 | 144 | 145 | 146 | 147 | 190 | 191 | 192 | 193 | 194 | 195 | 196 |
| | | | | | | | F6R1C1 | F6R1C2 | F6R1C3 | F6R1C4 | F6R1C5 | F6R1C6 | F6R1C7 | | | | | | | | | | | | | | |
| | | | | | | | 246 | 247 | 248 | 249 | 250 | 251 | 252 | | | | | | | | | | | | | | |
| | | | | | | | F6R2C1 | F6R2C2 | F6R2C3 | F6R2C4 | F6R2C5 | F6R2C6 | F6R2C7 | | | | | | | | | | | | | | |
| | | | | | | | 253 | 254 | 255 | 256 | 257 | 258 | 259 | | | | | | | | | | | | | | |
| | | | | | | | F6R3C1 | F6R3C2 | F6R3C3 | F6R3C4 | F6R3C5 | F6R3C6 | F6R3C7 | | | | | | | | | | | | | | |
| | | | | | | | 260 | 261 | 262 | 263 | 264 | 265 | 266 | | | | | | | | | | | | | | |
| | | | | | | | F6R4C1 | F6R4C2 | F6R4C3 | F6R4C4 | F6R4C5 | F6R4C6 | F6R4C7 | | | | | | | | | | | | | | |
| | | | | | | | 267 | 268 | 269 | 270 | 271 | 272 | 273 | | | | | | | | | | | | | | |
| | | | | | | | F6R5C1 | F6R5C2 | F6R5C3 | F6R5C4 | F6R5C5 | F6R5C6 | F6R5C7 | | | | | | | | | | | | | | |
| | | | | | | | 274 | 275 | 276 | 277 | 278 | 279 | 280 | | | | | | | | | | | | | | |
| | | | | | | | F6R6C1 | F6R6C2 | F6R6C3 | F6R6C4 | F6R6C5 | F6R6C6 | F6R6C7 | | | | | | | | | | | | | | |
| | | | | | | | 281 | 282 | 283 | 284 | 285 | 286 | 287 | | | | | | | | | | | | | | |
| | | | | | | | F6R7C1 | F6R7C2 | F6R7C3 | F6R7C4 | F6R7C5 | F6R7C6 | F6R7C7 | | | | | | | | | | | | | | |
| | | | | | | | 288 | 289 | 290 | 291 | 292 | 293 | 0 | | | | | | | | | | | | | | |

Fig. 10

Move 9

Move 10

Move 11

| | | | | | | | | | | | | | | | | | | | | | | | | | | | |
|---|---|---|---|---|---|---|---|---|---|---|---|---|---|---|---|---|---|---|---|---|---|---|---|---|---|---|---|
| | | | | | | | F5R1C1 | F5R1C2 | F5R1C3 | F5R1C4 | F5R1C5 | F5R1C6 | F5R1C7 | | | | | | | | | | | | | | |
| | | | | | | | 197 | 198 | 199 | 200 | 201 | 202 | 203 | | | | | | | | | | | | | | |
| | | | | | | | F5R2C1 | F5R2C2 | F5R2C3 | F5R2C4 | F5R2C5 | F5R2C6 | F5R2C7 | | | | | | | | | | | | | | |
| | | | | | | | 204 | 205 | 206 | 207 | 208 | 209 | 210 | | | | | | | | | | | | | | |
| | | | | | | | F5R3C1 | F5R3C2 | F5R3C3 | F5R3C4 | F5R3C5 | F5R3C6 | F5R3C7 | | | | | | | | | | | | | | |
| | | | | | | | 211 | 212 | 213 | 214 | 215 | 216 | 217 | | | | | | | | | | | | | | |
| | | | | | | | F5R4C1 | F5R4C2 | F5R4C3 | F5R4C4 | F5R4C5 | F5R4C6 | F5R4C7 | | | | | | | | | | | | | | |
| | | | | | | | 218 | 219 | 220 | 221 | 222 | 223 | 224 | | | | | | | | | | | | | | |
| | | | | | | | F5R5C1 | F5R5C2 | F5R5C3 | F5R5C4 | F5R5C5 | F5R5C6 | F5R5C7 | | | | | | | | | | | | | | |
| | | | | | | | 225 | 226 | 227 | 228 | 229 | 230 | 231 | | | | | | | | | | | | | | |
| | | | | | | | F5R6C1 | F5R6C2 | F5R6C3 | F5R6C4 | F5R6C5 | F5R6C6 | F5R6C7 | | | | | | | | | | | | | | |
| | | | | | | | 231 | 232 | 233 | 234 | 235 | 236 | 237 | | | | | | | | | | | | | | |
| | | | | | | | F5R7C1 | F5R7C2 | F5R7C3 | F5R7C4 | F5R7C5 | F5R7C6 | F5R7C7 | | | | | | | | | | | | | | |
| | | | | | | | 239 | 240 | 241 | 242 | 243 | 244 | 245 | | | | | | | | | | | | | | |
| F1R1C1 | F1R1C2 | F1R1C3 | F1R1C4 | F1R1C5 | F1R1C6 | F1R1C7 | F2R1C1 | F2R1C2 | F2R1C3 | F2R1C4 | F2R1C5 | F2R1C6 | F2R1C7 | F3R1C1 | F3R1C2 | F3R1C3 | F3R1C4 | F3R1C5 | F3R1C6 | F3R1C7 | F4R1C1 | F4R1C2 | F4R1C3 | F4R1C4 | F4R1C5 | F4R1C6 | F4R1C7 |
| 1 | 2 | 3 | 4 | 5 | 6 | 7 | 50 | 51 | 52 | 53 | 54 | 55 | 56 | 99 | 100 | 101 | 102 | 103 | 104 | 105 | 148 | 149 | 150 | 151 | 152 | 153 | 154 |
| F1R2C1 | F1R2C2 | F1R2C3 | F1R2C4 | F1R2C5 | F1R2C6 | F1R2C7 | F2R2C1 | F2R2C2 | F2R2C3 | F2R2C4 | F2R2C5 | F2R2C6 | F2R2C7 | F3R2C1 | F3R2C2 | F3R2C3 | F3R2C4 | F3R2C5 | F3R2C6 | F3R2C7 | F4R2C1 | F4R2C2 | F4R2C3 | F4R2C4 | F4R2C5 | F4R2C6 | F4R2C7 |
| 8 | 9 | 10 | 11 | 12 | 13 | 14 | 57 | 58 | 59 | 60 | 61 | 62 | 63 | 106 | 107 | 108 | 109 | 110 | 111 | 112 | 155 | 156 | 157 | 158 | 159 | 160 | 161 |
| F1R3C1 | F1R3C2 | F1R3C3 | F1R3C4 | F1R3C5 | F1R3C6 | F1R3C7 | F2R3C1 | F2R3C2 | F2R3C3 | F2R3C4 | F2R3C5 | F2R3C6 | F2R3C7 | F3R3C1 | F3R3C2 | F3R3C3 | F3R3C4 | F3R3C5 | F3R3C6 | F3R3C7 | F4R3C1 | F4R3C2 | F4R3C3 | F4R3C4 | F4R3C5 | F4R3C6 | F4R3C7 |
| 15 | 16 | 17 | 18 | 19 | 20 | 21 | 64 | 65 | 66 | 67 | 68 | 69 | 70 | 113 | 114 | 115 | 116 | 117 | 118 | 119 | 162 | 163 | 164 | 165 | 166 | 167 | 168 |
| F1R4C1 | F1R4C2 | F1R4C3 | F1R4C4 | F1R4C5 | F1R4C6 | F1R4C7 | F2R4C1 | F2R4C2 | F2R4C3 | F2R4C4 | F2R4C5 | F2R4C6 | F2R4C7 | F3R4C1 | F3R4C2 | F3R4C3 | F3R4C4 | F3R4C5 | F3R4C6 | F3R4C7 | F4R4C1 | F4R4C2 | F4R4C3 | F4R4C4 | F4R4C5 | F4R4C6 | F4R4C7 |
| 22 | 23 | 24 | 25 | 26 | 27 | 28 | 71 | 72 | 73 | 74 | 75 | 76 | 77 | 120 | 121 | 122 | 123 | 124 | 125 | 126 | 169 | 170 | 171 | 172 | 173 | 174 | 175 |
| F1R5C1 | F1R5C2 | F1R5C3 | F1R5C4 | F1R5C5 | F1R5C6 | F1R5C7 | F2R5C1 | F2R5C2 | F2R5C3 | F2R5C4 | F2R5C5 | F2R5C6 | F2R5C7 | F3R5C1 | F3R5C2 | F3R5C3 | F3R5C4 | F3R5C5 | F3R5C6 | F3R5C7 | F4R5C1 | F4R5C2 | F4R5C3 | F4R5C4 | F4R5C5 | F4R5C6 | F4R5C7 |
| 29 | 30 | 31 | 32 | 33 | 34 | 35 | 78 | 79 | 80 | 81 | 82 | 83 | 84 | 127 | 128 | 129 | 130 | 131 | 132 | 133 | 176 | 177 | 178 | 179 | 180 | 181 | 182 |
| F1R6C1 | F1R6C2 | F1R6C3 | F1R6C4 | F1R6C5 | F1R6C6 | F1R6C7 | F2R6C1 | F2R6C2 | F2R6C3 | F2R6C4 | F2R6C5 | F2R6C6 | F2R6C7 | F3R6C1 | F3R6C2 | F3R6C3 | F3R6C4 | F3R6C5 | F3R6C6 | F3R6C7 | F4R6C1 | F4R6C2 | F4R6C3 | F4R6C4 | F4R6C5 | F4R6C6 | F4R6C7 |
| 183 | 184 | 185 | 186 | 187 | 188 | 189 | 36 | 37 | 38 | 39 | 40 | 41 | 42 | 85 | 86 | 87 | 88 | 89 | 90 | 91 | 134 | 135 | 136 | 137 | 138 | 139 | 140 |
| F1R7C1 | F1R7C2 | F1R7C3 | F1R7C4 | F1R7C5 | F1R7C6 | F1R7C7 | F2R7C1 | F2R7C2 | F2R7C3 | F2R7C4 | F2R7C5 | F2R7C6 | F2R7C7 | F3R7C1 | F3R7C2 | F3R7C3 | F3R7C4 | F3R7C5 | F3R7C6 | F3R7C7 | F4R7C1 | F4R7C2 | F4R7C3 | F4R7C4 | F4R7C5 | F4R7C6 | F4R7C7 |
| 43 | 44 | 45 | 46 | 47 | 48 | 49 | 92 | 93 | 94 | 95 | 96 | 97 | 98 | 141 | 142 | 143 | 144 | 145 | 146 | 147 | 190 | 191 | 192 | 193 | 194 | 195 | 196 |
| | | | | | | | F6R1C1 | F6R1C2 | F6R1C3 | F6R1C4 | F6R1C5 | F6R1C6 | F6R1C7 | | | | | | | | | | | | | | |
| | | | | | | | 246 | 247 | 248 | 249 | 250 | 251 | 252 | | | | | | | | | | | | | | |
| | | | | | | | F6R2C1 | F6R2C2 | F6R2C3 | F6R2C4 | F6R2C5 | F6R2C6 | F6R2C7 | | | | | | | | | | | | | | |
| | | | | | | | 253 | 254 | 255 | 256 | 257 | 258 | 259 | | | | | | | | | | | | | | |
| | | | | | | | F6R3C1 | F6R3C2 | F6R3C3 | F6R3C4 | F6R3C5 | F6R3C6 | F6R3C7 | | | | | | | | | | | | | | |
| | | | | | | | 260 | 261 | 262 | 263 | 264 | 265 | 266 | | | | | | | | | | | | | | |
| | | | | | | | F6R4C1 | F6R4C2 | F6R4C3 | F6R4C4 | F6R4C5 | F6R4C6 | F6R4C7 | | | | | | | | | | | | | | |
| | | | | | | | 267 | 268 | 269 | 270 | 271 | 272 | 273 | | | | | | | | | | | | | | |
| | | | | | | | F6R5C1 | F6R5C2 | F6R5C3 | F6R5C4 | F6R5C5 | F6R5C6 | F6R5C7 | | | | | | | | | | | | | | |
| | | | | | | | 274 | 275 | 276 | 277 | 278 | 279 | 280 | | | | | | | | | | | | | | |
| | | | | | | | F6R6C1 | F6R6C2 | F6R6C3 | F6R6C4 | F6R6C5 | F6R6C6 | F6R6C7 | | | | | | | | | | | | | | |
| | | | | | | | 281 | 282 | 283 | 284 | 285 | 286 | 287 | | | | | | | | | | | | | | |
| | | | | | | | F6R7C1 | F6R7C2 | F6R7C3 | F6R7C4 | F6R7C5 | F6R7C6 | F6R7C7 | | | | | | | | | | | | | | |
| | | | | | | | 288 | 289 | 290 | 291 | 292 | 293 | 0 | | | | | | | | | | | | | | |

Fig. 13

Move 12

| | | | | | | |
|---|---|---|---|---|---|---|
| F5R1C1 | F5R1C2 | F5R1C3 | F5R1C4 | F5R1C5 | F5R1C6 | F5R1C7 |
| 197 | 198 | 199 | 200 | 201 | 202 | 203 |
| F5R2C1 | F5R2C2 | F5R2C3 | F5R2C4 | F5R2C5 | F5R2C6 | F5R2C7 |
| 204 | 205 | 206 | 207 | 208 | 209 | 210 |
| F5R3C1 | F5R3C2 | F5R3C3 | F5R3C4 | F5R3C5 | F5R3C6 | F5R3C7 |
| 211 | 212 | 213 | 214 | 215 | 216 | 217 |
| F5R4C1 | F5R4C2 | F5R4C3 | F5R4C4 | F5R4C5 | F5R4C6 | F5R4C7 |
| 218 | 219 | 220 | 221 | 222 | 223 | 224 |
| F5R5C1 | F5R5C2 | F5R5C3 | F5R5C4 | F5R5C5 | F5R5C6 | F5R5C7 |
| 225 | 226 | 227 | 228 | 229 | 230 | 231 |
| F5R6C1 | F5R6C2 | F5R6C3 | F5R6C4 | F5R6C5 | F5R6C6 | F5R6C7 |
| 231 | 232 | 233 | 234 | 235 | 236 | 237 |
| F5R7C1 | F5R7C2 | F5R7C3 | F5R7C4 | F5R7C5 | F5R7C6 | F5R7C7 |
| 239 | 240 | 241 | 242 | 243 | 244 | 245 |

| | | | | | | | | | | | | | | | | | | | | | | | | | | | |
|---|---|---|---|---|---|---|---|---|---|---|---|---|---|---|---|---|---|---|---|---|---|---|---|---|---|---|---|
| F1R1C1 | F1R1C2 | F1R1C3 | F1R1C4 | F1R1C5 | F1R1C6 | F1R1C7 | F2R1C1 | F2R1C2 | F2R1C3 | F2R1C4 | F2R1C5 | F2R1C6 | F2R1C7 | F3R1C1 | F3R1C2 | F3R1C3 | F3R1C4 | F3R1C5 | F3R1C6 | F3R1C7 | F4R1C1 | F4R1C2 | F4R1C3 | F4R1C4 | F4R1C5 | F4R1C6 | F4R1C7 |
| 1 | 2 | 3 | 4 | 5 | 6 | 7 | 50 | 51 | 52 | 53 | 54 | 55 | 56 | 99 | 100 | 101 | 102 | 103 | 104 | 105 | 148 | 149 | 150 | 151 | 152 | 153 | 154 |
| F1R2C1 | F1R2C2 | F1R2C3 | F1R2C4 | F1R2C5 | F1R2C6 | F1R2C7 | F2R2C1 | F2R2C2 | F2R2C3 | F2R2C4 | F2R2C5 | F2R2C6 | F2R2C7 | F3R2C1 | F3R2C2 | F3R2C3 | F3R2C4 | F3R2C5 | F3R2C6 | F3R2C7 | F4R2C1 | F4R2C2 | F4R2C3 | F4R2C4 | F4R2C5 | F4R2C6 | F4R2C7 |
| 8 | 9 | 10 | 11 | 12 | 13 | 14 | 57 | 58 | 59 | 60 | 61 | 62 | 63 | 106 | 107 | 108 | 109 | 110 | 111 | 112 | 155 | 156 | 157 | 158 | 159 | 160 | 161 |
| F1R3C1 | F1R3C2 | F1R3C3 | F1R3C4 | F1R3C5 | F1R3C6 | F1R3C7 | F2R3C1 | F2R3C2 | F2R3C3 | F2R3C4 | F2R3C5 | F2R3C6 | F2R3C7 | F3R3C1 | F3R3C2 | F3R3C3 | F3R3C4 | F3R3C5 | F3R3C6 | F3R3C7 | F4R3C1 | F4R3C2 | F4R3C3 | F4R3C4 | F4R3C5 | F4R3C6 | F4R3C7 |
| 15 | 16 | 17 | 18 | 19 | 20 | 21 | 64 | 65 | 66 | 67 | 68 | 69 | 70 | 113 | 114 | 115 | 116 | 117 | 118 | 119 | 162 | 163 | 164 | 165 | 166 | 167 | 168 |
| F1R4C1 | F1R4C2 | F1R4C3 | F1R4C4 | F1R4C5 | F1R4C6 | F1R4C7 | F2R4C1 | F2R4C2 | F2R4C3 | F2R4C4 | F2R4C5 | F2R4C6 | F2R4C7 | F3R4C1 | F3R4C2 | F3R4C3 | F3R4C4 | F3R4C5 | F3R4C6 | F3R4C7 | F4R4C1 | F4R4C2 | F4R4C3 | F4R4C4 | F4R4C5 | F4R4C6 | F4R4C7 |
| 22 | 23 | 24 | 25 | 26 | 27 | 28 | 71 | 72 | 73 | 74 | 75 | 76 | 77 | 120 | 121 | 122 | 123 | 124 | 125 | 126 | 169 | 170 | 171 | 172 | 173 | 174 | 175 |
| F1R5C1 | F1R5C2 | F1R5C3 | F1R5C4 | F1R5C5 | F1R5C6 | F1R5C7 | F2R5C1 | F2R5C2 | F2R5C3 | F2R5C4 | F2R5C5 | F2R5C6 | F2R5C7 | F3R5C1 | F3R5C2 | F3R5C3 | F3R5C4 | F3R5C5 | F3R5C6 | F3R5C7 | F4R5C1 | F4R5C2 | F4R5C3 | F4R5C4 | F4R5C5 | F4R5C6 | F4R5C7 |
| 29 | 30 | 31 | 32 | 33 | 34 | 35 | 78 | 79 | 80 | 81 | 82 | 83 | 84 | 127 | 128 | 129 | 130 | 131 | 132 | 133 | 176 | 177 | 178 | 179 | 180 | 181 | 182 |
| F1R6C1 | F1R6C2 | F1R6C3 | F1R6C4 | F1R6C5 | F1R6C6 | F1R6C7 | F2R6C1 | F2R6C2 | F2R6C3 | F2R6C4 | F2R6C5 | F2R6C6 | F2R6C7 | F3R6C1 | F3R6C2 | F3R6C3 | F3R6C4 | F3R6C5 | F3R6C6 | F3R6C7 | F4R6C1 | F4R6C2 | F4R6C3 | F4R6C4 | F4R6C5 | F4R6C6 | F4R6C7 |
| 85 | 86 | 87 | 88 | 89 | 90 | 91 | 134 | 135 | 136 | 137 | 138 | 139 | 140 | 183 | 184 | 185 | 186 | 187 | 188 | 189 | 36 | 37 | 38 | 39 | 40 | 41 | 42 |
| F1R7C1 | F1R7C2 | F1R7C3 | F1R7C4 | F1R7C5 | F1R7C6 | F1R7C7 | F2R7C1 | F2R7C2 | F2R7C3 | F2R7C4 | F2R7C5 | F2R7C6 | F2R7C7 | F3R7C1 | F3R7C2 | F3R7C3 | F3R7C4 | F3R7C5 | F3R7C6 | F3R7C7 | F4R7C1 | F4R7C2 | F4R7C3 | F4R7C4 | F4R7C5 | F4R7C6 | F4R7C7 |
| 43 | 44 | 45 | 46 | 47 | 48 | 49 | 92 | 93 | 94 | 95 | 96 | 97 | 98 | 141 | 142 | 143 | 144 | 145 | 146 | 147 | 190 | 191 | 192 | 193 | 194 | 195 | 196 |

| | | | | | | |
|---|---|---|---|---|---|---|
| F6R1C1 | F6R1C2 | F6R1C3 | F6R1C4 | F6R1C5 | F6R1C6 | F6R1C7 |
| 246 | 247 | 248 | 249 | 250 | 251 | 252 |
| F6R2C1 | F6R2C2 | F6R2C3 | F6R2C4 | F6R2C5 | F6R2C6 | F6R2C7 |
| 253 | 254 | 255 | 256 | 257 | 258 | 259 |
| F6R3C1 | F6R3C2 | F6R3C3 | F6R3C4 | F6R3C5 | F6R3C6 | F6R3C7 |
| 260 | 261 | 262 | 263 | 264 | 265 | 266 |
| F6R4C1 | F6R4C2 | F6R4C3 | F6R4C4 | F6R4C5 | F6R4C6 | F6R4C7 |
| 267 | 268 | 269 | 270 | 271 | 272 | 273 |
| F6R5C1 | F6R5C2 | F6R5C3 | F6R5C4 | F6R5C5 | F6R5C6 | F6R5C7 |
| 274 | 275 | 276 | 277 | 278 | 279 | 280 |
| F6R6C1 | F6R6C2 | F6R6C3 | F6R6C4 | F6R6C5 | F6R6C6 | F6R6C7 |
| 281 | 282 | 283 | 284 | 285 | 286 | 287 |
| F6R7C1 | F6R7C2 | F6R7C3 | F6R7C4 | F6R7C5 | F6R7C6 | F6R7C7 |
| 288 | 289 | 290 | 291 | 292 | 293 | 0 |

Fig. 14

Move 13

Move 14

| | | | | | | |
|---|---|---|---|---|---|---|
| F5R1C1 | F5R1C2 | F5R1C3 | F5R1C4 | F5R1C5 | F5R1C6 | F5R1C7 |
| 197 | 198 | 199 | 200 | 201 | 202 | 203 |
| F5R2C1 | F5R2C2 | F5R2C3 | F5R2C4 | F5R2C5 | F5R2C6 | F5R2C7 |
| 204 | 205 | 206 | 207 | 208 | 209 | 210 |
| F5R3C1 | F5R3C2 | F5R3C3 | F5R3C4 | F5R3C5 | F5R3C6 | F5R3C7 |
| 211 | 212 | 213 | 214 | 215 | 216 | 217 |
| F5R4C1 | F5R4C2 | F5R4C3 | F5R4C4 | F5R4C5 | F5R4C6 | F5R4C7 |
| 218 | 219 | 220 | 221 | 222 | 223 | 224 |
| F5R5C1 | F5R5C2 | F5R5C3 | F5R5C4 | F5R5C5 | F5R5C6 | F5R5C7 |
| 225 | 226 | 227 | 228 | 229 | 230 | 231 |
| F5R6C1 | F5R6C2 | F5R6C3 | F5R6C4 | F5R6C5 | F5R6C6 | F5R6C7 |
| 231 | 232 | 233 | 234 | 235 | 236 | 237 |
| F5R7C1 | F5R7C2 | F5R7C3 | F5R7C4 | F5R7C5 | F5R7C6 | F5R7C7 |
| 239 | 240 | 241 | 242 | 243 | 244 | 245 |

| | | | | | | |
|---|---|---|---|---|---|---|
| F1R1C1 | F1R1C2 | F1R1C3 | F1R1C4 | F1R1C5 | F1R1C6 | F1R1C7 |
| 1 | 2 | 3 | 4 | 5 | 6 | 7 |
| F1R2C1 | F1R2C2 | F1R2C3 | F1R2C4 | F1R2C5 | F1R2C6 | F1R2C7 |
| 8 | 9 | 10 | 11 | 12 | 13 | 14 |
| F1R3C1 | F1R3C2 | F1R3C3 | F1R3C4 | F1R3C5 | F1R3C6 | F1R3C7 |
| 15 | 16 | 17 | 18 | 19 | 20 | 21 |
| F1R4C1 | F1R4C2 | F1R4C3 | F1R4C4 | F1R4C5 | F1R4C6 | F1R4C7 |
| 22 | 23 | 24 | 25 | 26 | 27 | 28 |
| F1R5C1 | F1R5C2 | F1R5C3 | F1R5C4 | F1R5C5 | F1R5C6 | F1R5C7 |
| 29 | 30 | 31 | 32 | 33 | 34 | 35 |
| F1R6C1 | F1R6C2 | F1R6C3 | F1R6C4 | F1R6C5 | F1R6C6 | F1R6C7 |
| 36 | 37 | 38 | 39 | 40 | 41 | 42 |
| F1R7C1 | F1R7C2 | F1R7C3 | F1R7C4 | F1R7C5 | F1R7C6 | F1R7C7 |
| 92 | 93 | 94 | 95 | 96 | 97 | 98 |

| | | | | | | |
|---|---|---|---|---|---|---|
| F2R1C1 | F2R1C2 | F2R1C3 | F2R1C4 | F2R1C5 | F2R1C6 | F2R1C7 |
| 50 | 51 | 52 | 53 | 54 | 55 | 56 |
| F2R2C1 | F2R2C2 | F2R2C3 | F2R2C4 | F2R2C5 | F2R2C6 | F2R2C7 |
| 57 | 58 | 59 | 60 | 61 | 62 | 63 |
| F2R3C1 | F2R3C2 | F2R3C3 | F2R3C4 | F2R3C5 | F2R3C6 | F2R3C7 |
| 64 | 65 | 66 | 67 | 68 | 69 | 70 |
| F2R4C1 | F2R4C2 | F2R4C3 | F2R4C4 | F2R4C5 | F2R4C6 | F2R4C7 |
| 71 | 72 | 73 | 74 | 75 | 76 | 77 |
| F2R5C1 | F2R5C2 | F2R5C3 | F2R5C4 | F2R5C5 | F2R5C6 | F2R5C7 |
| 78 | 79 | 80 | 81 | 82 | 83 | 84 |
| F2R6C1 | F2R6C2 | F2R6C3 | F2R6C4 | F2R6C5 | F2R6C6 | F2R6C7 |
| 85 | 86 | 87 | 88 | 89 | 90 | 91 |
| F2R7C1 | F2R7C2 | F2R7C3 | F2R7C4 | F2R7C5 | F2R7C6 | F2R7C7 |
| 141 | 142 | 143 | 144 | 145 | 146 | 147 |

| | | | | | | |
|---|---|---|---|---|---|---|
| F3R1C1 | F3R1C2 | F3R1C3 | F3R1C4 | F3R1C5 | F3R1C6 | F3R1C7 |
| 99 | 100 | 101 | 102 | 103 | 104 | 105 |
| F3R2C1 | F3R2C2 | F3R2C3 | F3R2C4 | F3R2C5 | F3R2C6 | F3R2C7 |
| 106 | 107 | 108 | 109 | 110 | 111 | 112 |
| F3R3C1 | F3R3C2 | F3R3C3 | F3R3C4 | F3R3C5 | F3R3C6 | F3R3C7 |
| 113 | 114 | 115 | 116 | 117 | 118 | 119 |
| F3R4C1 | F3R4C2 | F3R4C3 | F3R4C4 | F3R4C5 | F3R4C6 | F3R4C7 |
| 120 | 121 | 122 | 123 | 124 | 125 | 126 |
| F3R5C1 | F3R5C2 | F3R5C3 | F3R5C4 | F3R5C5 | F3R5C6 | F3R5C7 |
| 127 | 128 | 129 | 130 | 131 | 132 | 133 |
| F3R6C1 | F3R6C2 | F3R6C3 | F3R6C4 | F3R6C5 | F3R6C6 | F3R6C7 |
| 134 | 135 | 136 | 137 | 138 | 139 | 140 |
| F3R7C1 | F3R7C2 | F3R7C3 | F3R7C4 | F3R7C5 | F3R7C6 | F3R7C7 |
| 190 | 191 | 192 | 193 | 194 | 195 | 196 |

| | | | | | | |
|---|---|---|---|---|---|---|
| F4R1C1 | F4R1C2 | F4R1C3 | F4R1C4 | F4R1C5 | F4R1C6 | F4R1C7 |
| 148 | 149 | 150 | 151 | 152 | 153 | 154 |
| F4R2C1 | F4R2C2 | F4R2C3 | F4R2C4 | F4R2C5 | F4R2C6 | F4R2C7 |
| 155 | 156 | 157 | 158 | 159 | 160 | 161 |
| F4R3C1 | F4R3C2 | F4R3C3 | F4R3C4 | F4R3C5 | F4R3C6 | F4R3C7 |
| 162 | 163 | 164 | 165 | 166 | 167 | 168 |
| F4R4C1 | F4R4C2 | F4R4C3 | F4R4C4 | F4R4C5 | F4R4C6 | F4R4C7 |
| 169 | 170 | 171 | 172 | 173 | 174 | 175 |
| F4R5C1 | F4R5C2 | F4R5C3 | F4R5C4 | F4R5C5 | F4R5C6 | F4R5C7 |
| 176 | 177 | 178 | 179 | 180 | 181 | 182 |
| F4R6C1 | F4R6C2 | F4R6C3 | F4R6C4 | F4R6C5 | F4R6C6 | F4R6C7 |
| 183 | 184 | 185 | 186 | 187 | 188 | 189 |
| F4R7C1 | F4R7C2 | F4R7C3 | F4R7C4 | F4R7C5 | F4R7C6 | F4R7C7 |
| 43 | 44 | 45 | 46 | 47 | 48 | 49 |

| | | | | | | |
|---|---|---|---|---|---|---|
| F6R1C1 | F6R1C2 | F6R1C3 | F6R1C4 | F6R1C5 | F6R1C6 | F6R1C7 |
| 252 | 259 | 266 | 273 | 280 | 287 | 0 |
| F6R2C1 | F6R2C2 | F6R2C3 | F6R2C4 | F6R2C5 | F6R2C6 | F6R2C7 |
| 251 | 258 | 265 | 272 | 279 | 286 | 293 |
| F6R3C1 | F6R3C2 | F6R3C3 | F6R3C4 | F6R3C5 | F6R3C6 | F6R3C7 |
| 250 | 257 | 264 | 271 | 278 | 285 | 292 |
| F6R4C1 | F6R4C2 | F6R4C3 | F6R4C4 | F6R4C5 | F6R4C6 | F6R4C7 |
| 249 | 256 | 263 | 270 | 277 | 284 | 291 |
| F6R5C1 | F6R5C2 | F6R5C3 | F6R5C4 | F6R5C5 | F6R5C6 | F6R5C7 |
| 248 | 255 | 262 | 269 | 276 | 283 | 290 |
| F6R6C1 | F6R6C2 | F6R6C3 | F6R6C4 | F6R6C5 | F6R6C6 | F6R6C7 |
| 247 | 254 | 261 | 268 | 275 | 282 | 289 |
| F6R7C1 | F6R7C2 | F6R7C3 | F6R7C4 | F6R7C5 | F6R7C6 | F6R7C7 |
| 246 | 253 | 260 | 267 | 274 | 281 | 288 |

Fig. 16

Move 17

Move 18

Move 19

Move 20

Move 21

Move 22

Move 25

Move 27

Move 28

Move 29

Move 30

Move 31

Move 32

Move 33

Move 34

Move 35

Move 36

Move 37

Move 41

USE OF DATA ENTANGLEMENT FOR IMPROVING THE SECURITY OF SEARCH INDEXES WHILE USING NATIVE ENTERPRISE SEARCH ENGINES AND FOR PROTECTING COMPUTER SYSTEMS AGAINST MALWARE INCLUDING RANSOMWARE

CROSS-REFERENCE TO RELATED APPLICATION

This application claims the benefit of U.S. Provisional Patent Application No. 63/156,803, filed on Mar. 4, 2021, and titled "Use Of Data Entanglement For Improving The Security Of Search Indexes While Using Native Enterprise Search Engines And For Protecting Computer Systems Against Malware Including Ransomware, Protecting Data Entanglement with Cryptography and Creation of Valet Keys." and of U.S. Provisional Patent Application No. 63/106,253, filed on Oct. 27, 2020, and titled "Use Of Data Entanglement For Improving The Security Of Search Indexes While Using Native Enterprise Search Engines And For Protecting Computer Systems Against Malware Including Ransomware." The contents of both applications are incorporated by reference herein in their entireties.

TECHNICAL FIELD

This disclosure relates to a method and system for the use of data entanglement to improve the security of search indexes while using native enterprise search engines, and for protecting computer systems against malware.

BACKGROUND

Common causes of data breaches include the exposure of sensitive data in cleartext (i.e., a non-encrypted form) by accident, loss of access credentials, or malicious insiders. The sensitive data may include, but are not limited to, data inside search indexes, data used in native search engines of enterprise search platforms, internet protocol (IP) addresses and numbers, file-related data (e.g., file names or other file identification attributes, source documents), data in structured and unstructured datastores, and the like.

Existing encryption systems do not lend themselves to search and cannot be used, for example, to protect sensitive data in search indices. Further, encryption does not prevent data from being breached if the intruder has logical access to the file system—for example, system administrators or information technology (IT) staff who installs software components on the host machines may access the data in plain text. On the other hand, applications that generate and consume the data, encrypt and decrypt the data before sending them to a database, which adds another layer of data security and renders the data inaccessible even by system and database administrators. However, this form of encryption is computationally expensive and may not be supported by all application vendors. Additionally, when the data must be queried and analyzed, existing encryption-based approaches are not helpful because encryption prevents software-based applications to perform analytical tasks. Therefore, the majority of analytical stores (Enterprise data lakes, ElasticSearch indices, etc.) keeps data in plain text, which poses a substantial risk to organizations.

SUMMARY

The present system uses data entanglement and reduces the impact of opportunistic and targeted breaches by ensuring that any sensitive data resident in the datastore are not available in cleartext. According to some embodiments, there are six primary aspects implemented by the system and method disclosed herein: (i) text entanglement and the corresponding text search process; (ii) numerical entanglement for numbers and internet protocol (IP) addresses and the corresponding numerical search process; (iii) a process to generate format preserving tokens and the process for retrieval of the tokens; (iv) software platforms that implement the present text search process, the numerical search process, and format preserving tokens; (v) implementation of data entanglement using 3-dimensional or higher dimensional cubes; and (vi) use of data entanglement to protect against malware, including ransomware.

According to some embodiments, the present system provides a new approach to securing the data by entangling it prior to index construction and encryption. The present system secures data while allowing them to be searched and analyzed without the penalty posed by decryption and re-encryption using traditional approaches. The present system allows the secure data format(s) to become established as the de-facto secured formats in an organization. In this modality, all sensitive data are secured as soon as they enter an organization, making it easy to share the data without worrying about breaches. In addition, all systems that must access the data would be granted the right set of privileges to consume, search, and analyze the secured data which are not in the form of plain text anywhere.

The foregoing is a summary and thus contains, by necessity, simplifications, generalizations and omissions of detail; consequently, the summary is illustrative only and is not limiting in any way. Other aspects, inventive features, and advantages of the systems and/or processes described herein will become apparent in the non-limiting detailed description set forth herein.

BRIEF DESCRIPTION OF THE DRAWINGS

The disclosed embodiments have advantages and features which will be more readily apparent from the detailed description, the appended claims, and the accompanying figures (or drawings). A brief introduction of the figures is provided below.

FIG. 2 is an initialized cube represented as a flattened cube, according to some embodiments.

FIGS. 3-44 are representation of flattened cubes after the application of rotation moves on the initialized cube to create respective interim scrambled cubes, according to some embodiments.

DETAILED DESCRIPTION

Figure 1:
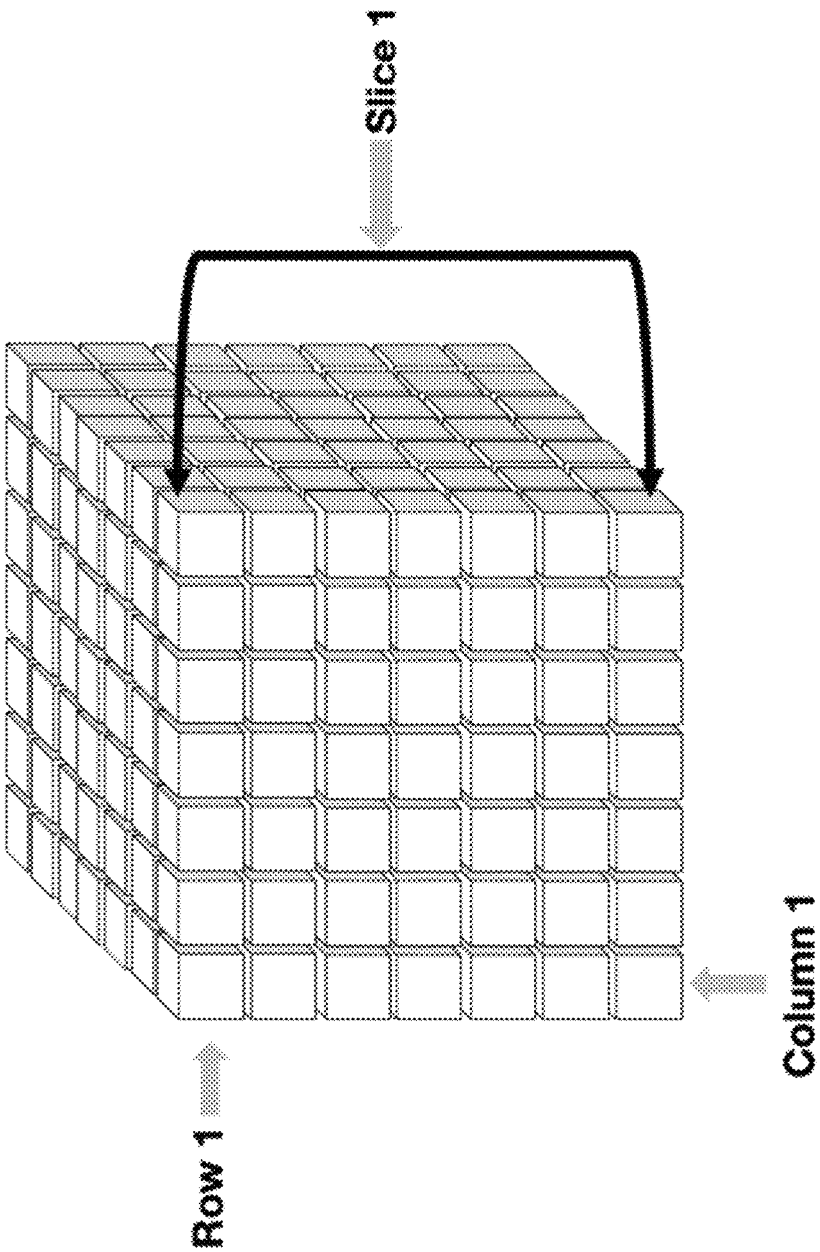
FIG. 1 is a 7×7 cube for implementing a spatial tangling routine, according to some embodiments.
Figure 3:
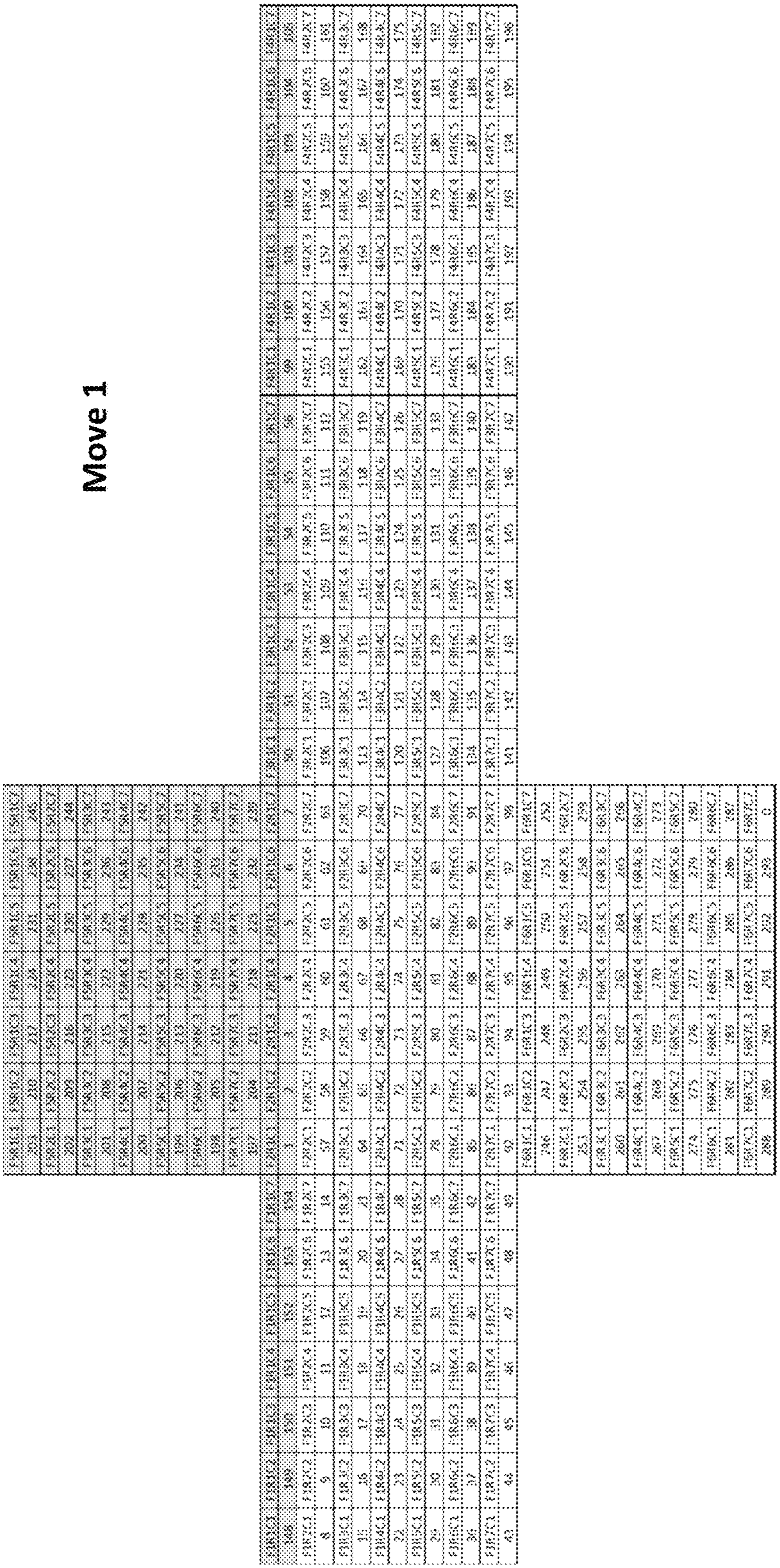
Figure 4:
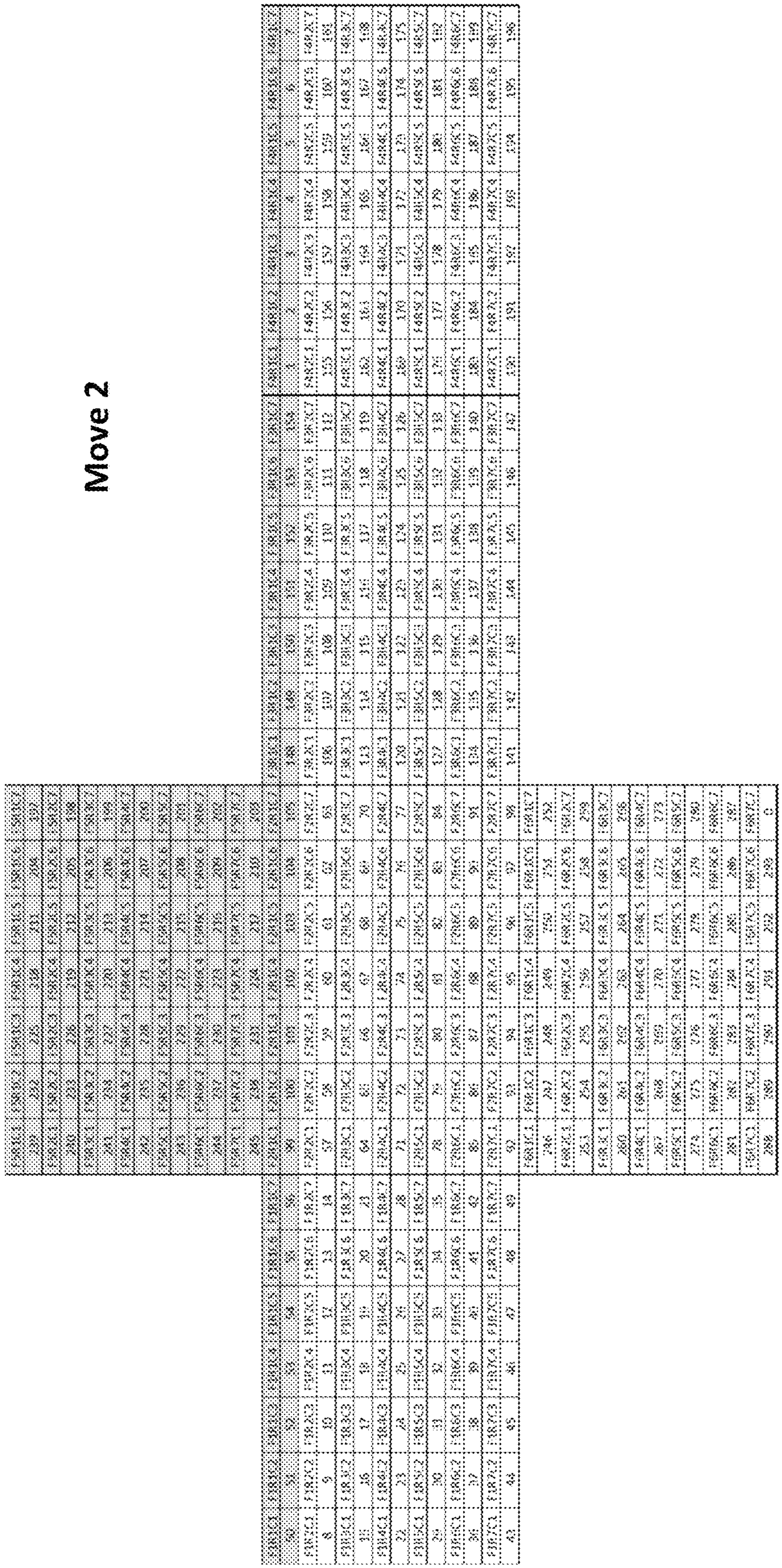
Figure 5:
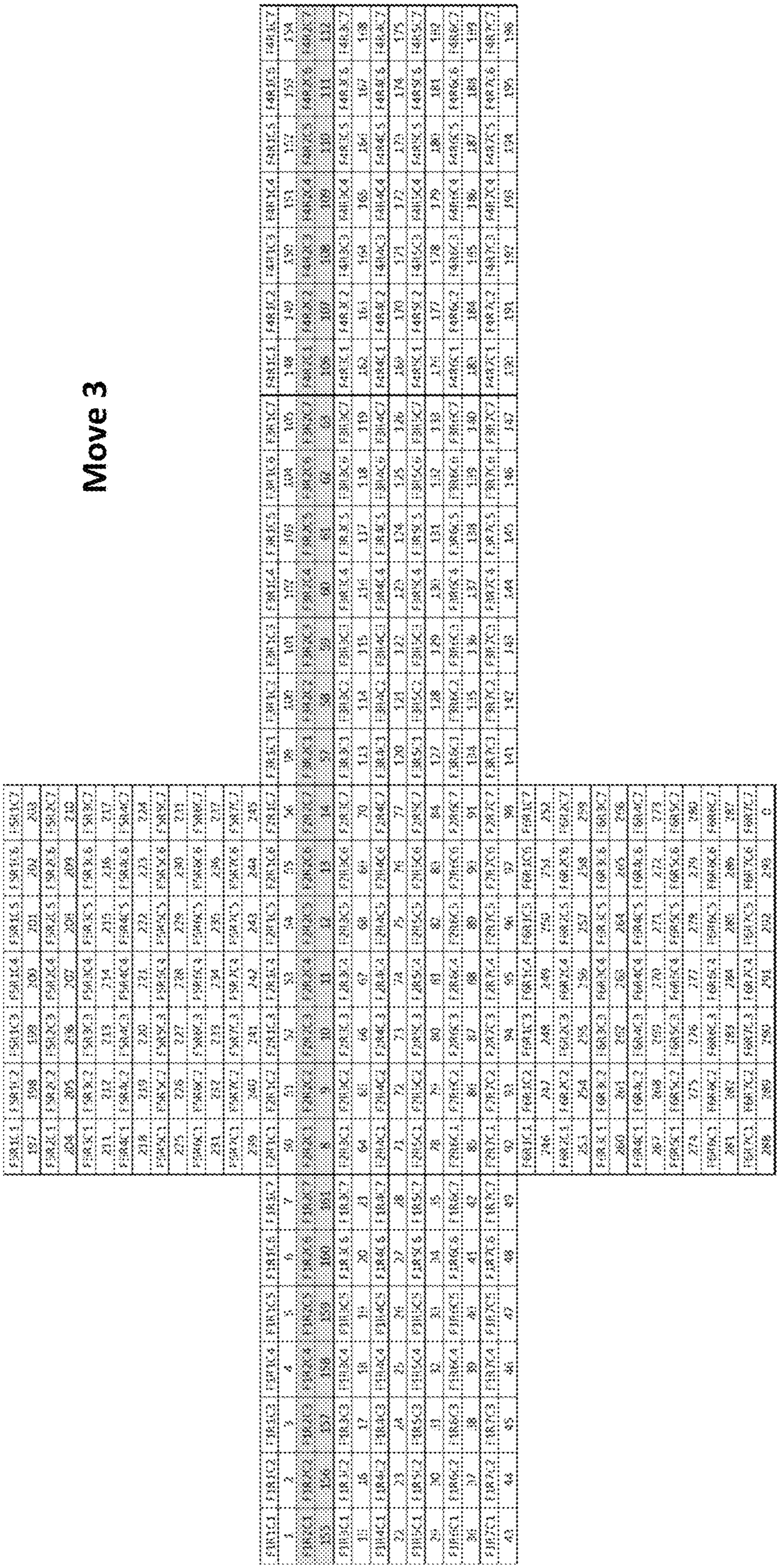
Figure 6:
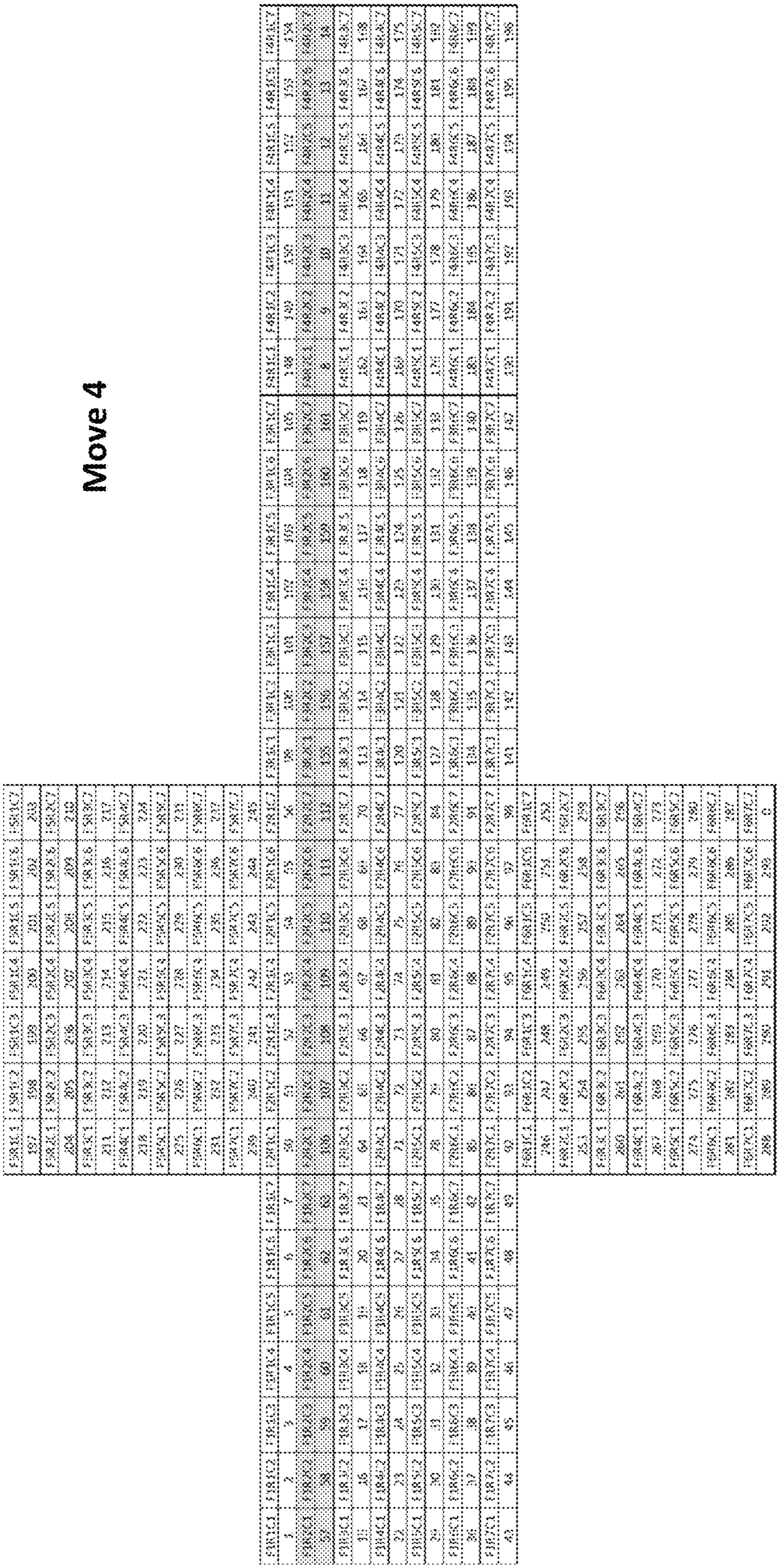
Figure 7:
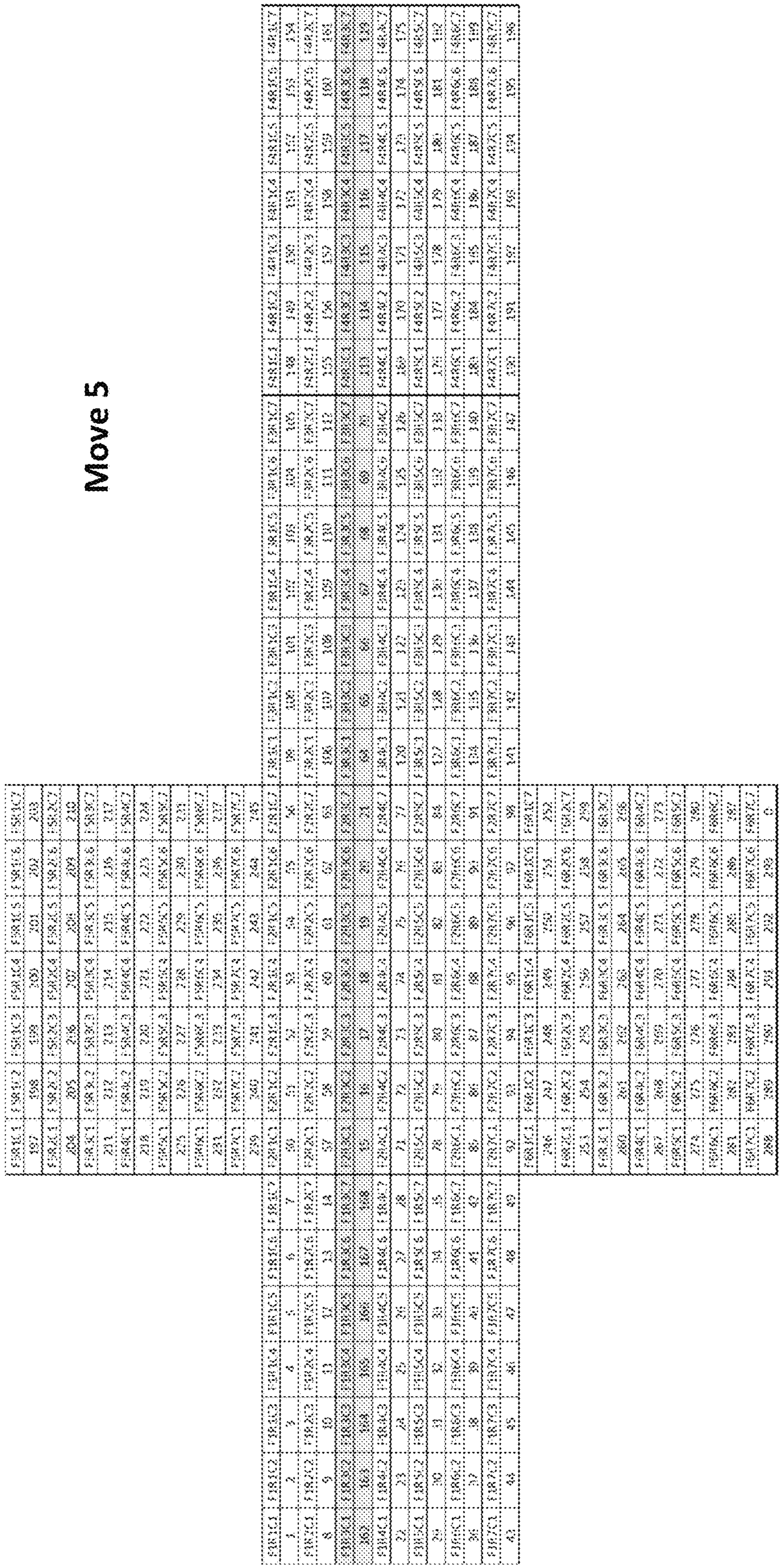
Figure 9:
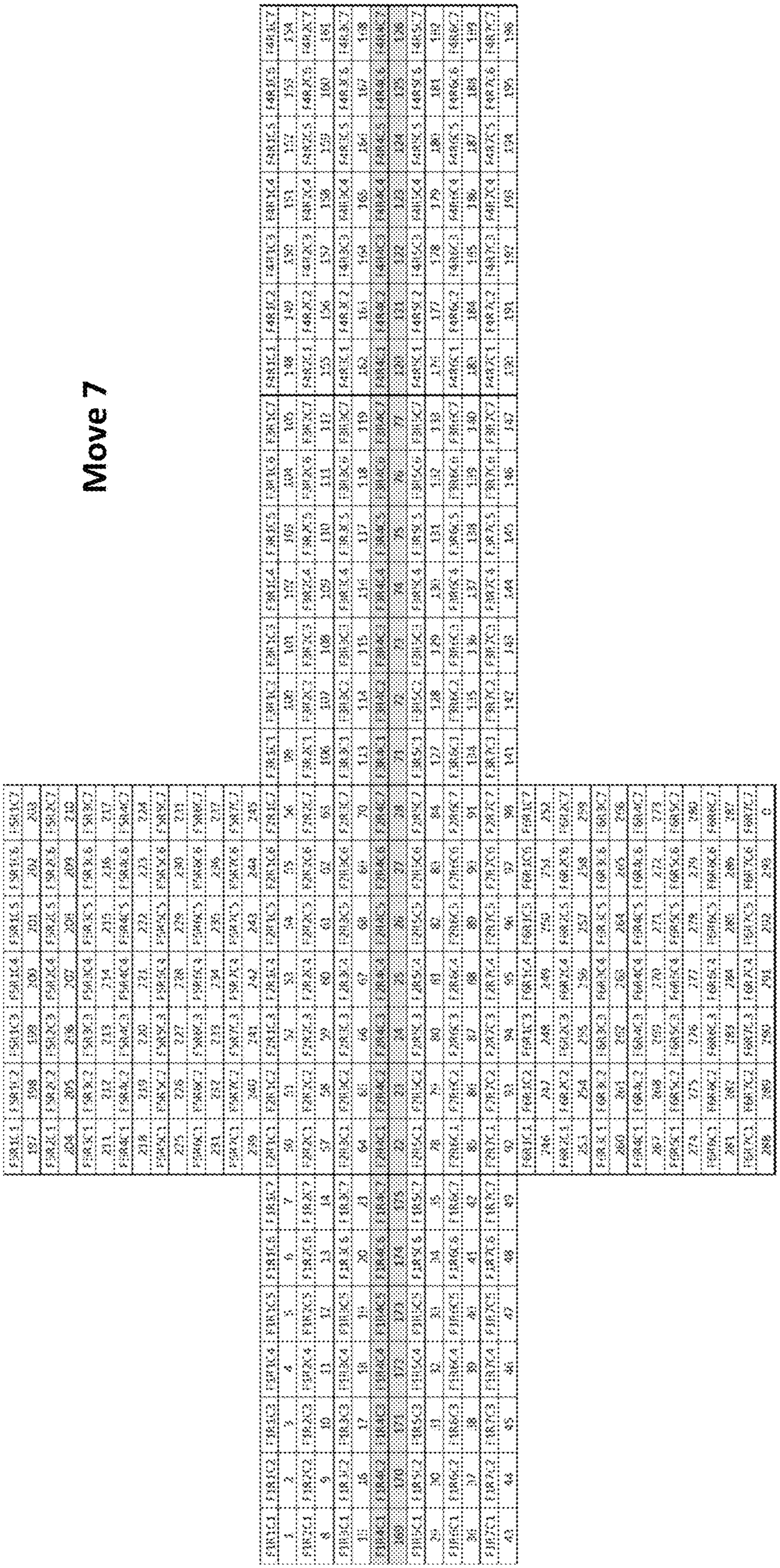
Figure 11:
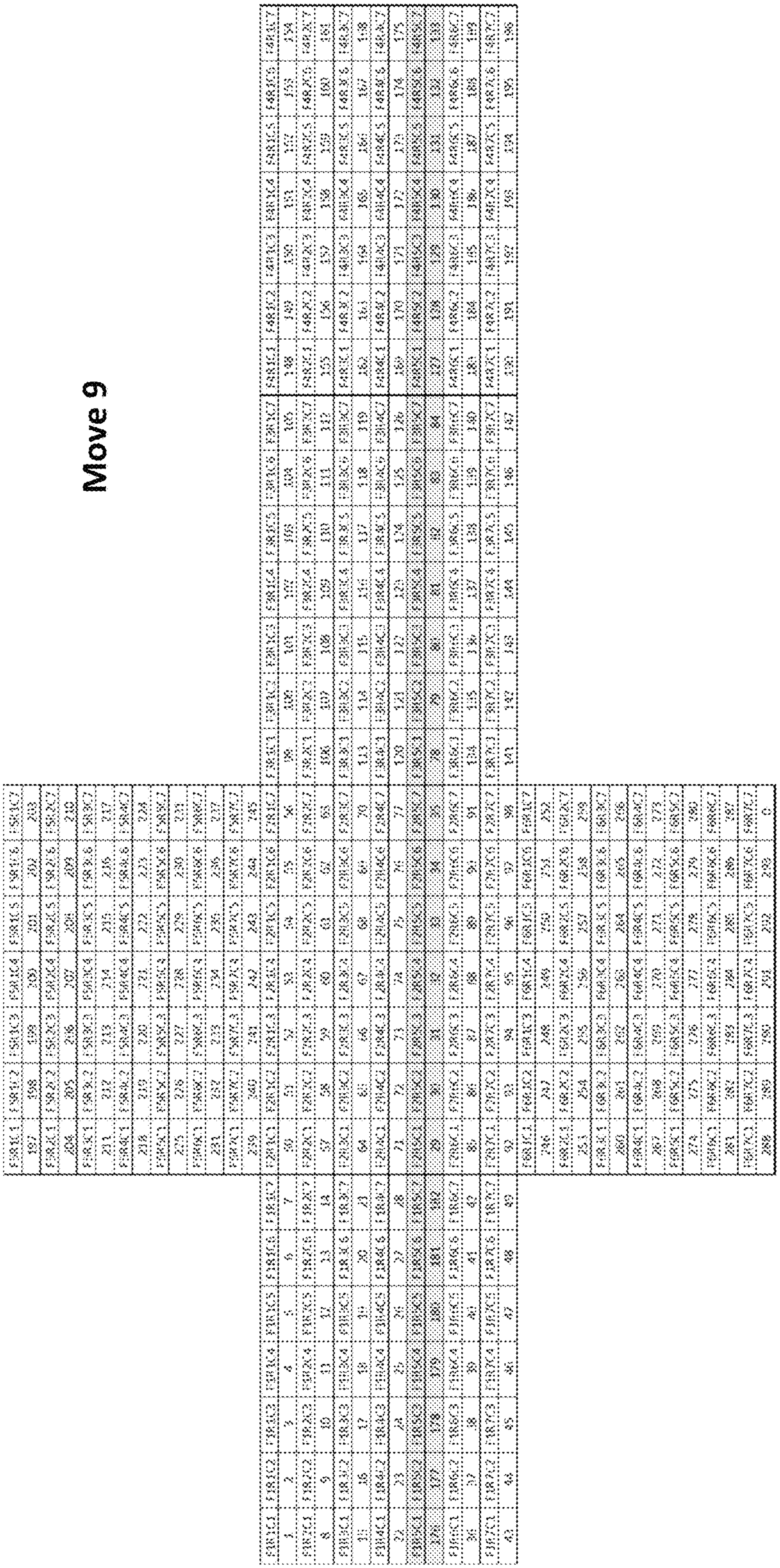
Figure 12:
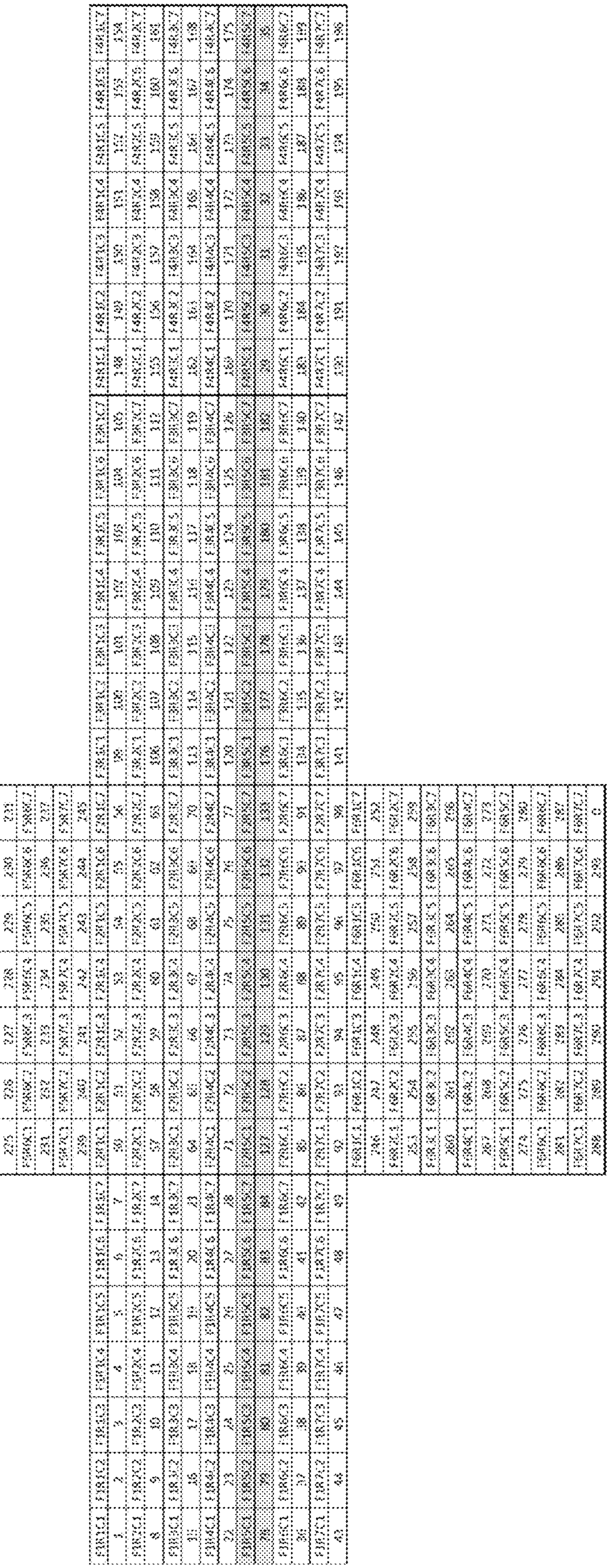
Figure 15:
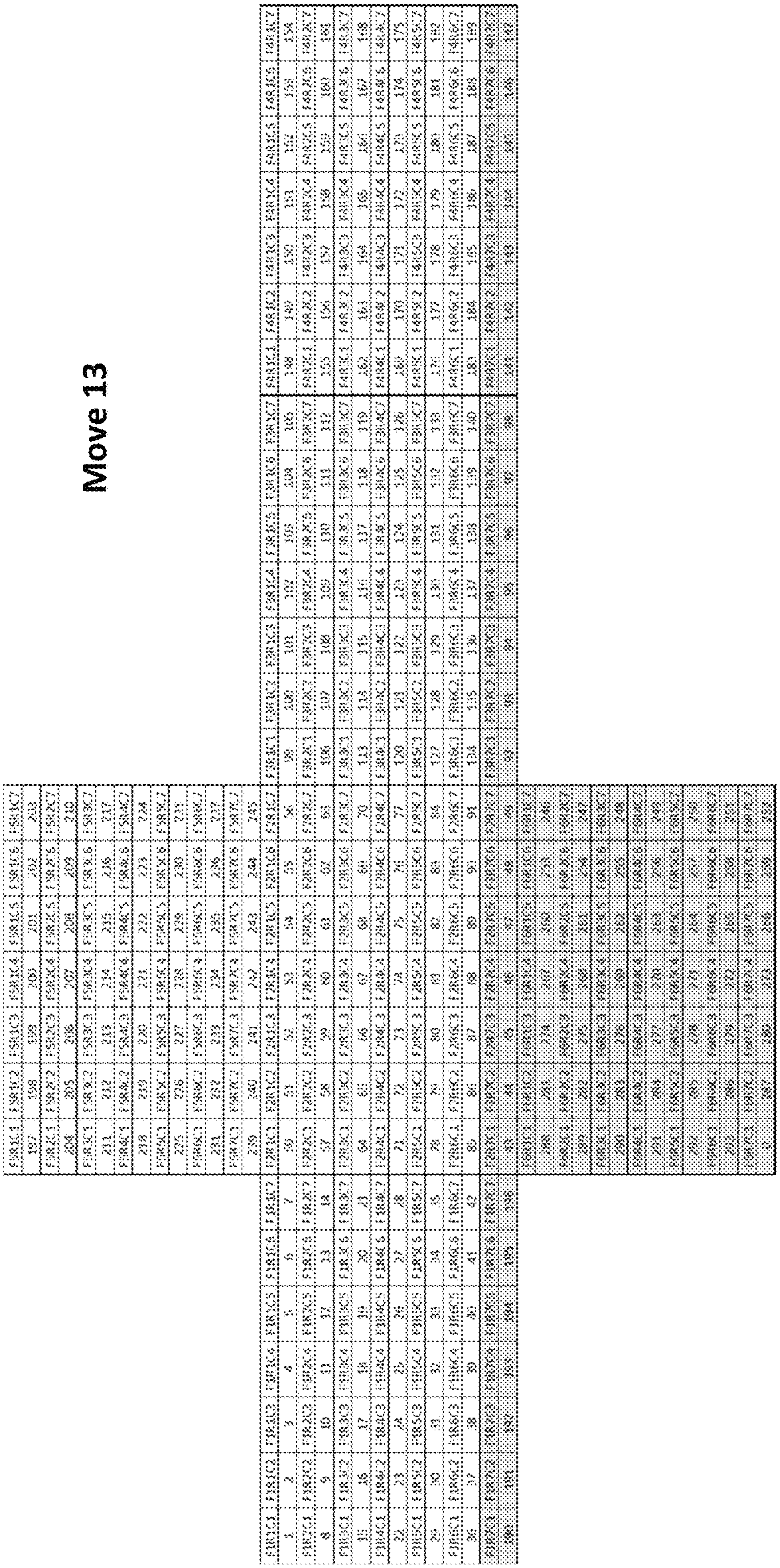
Figure 17:
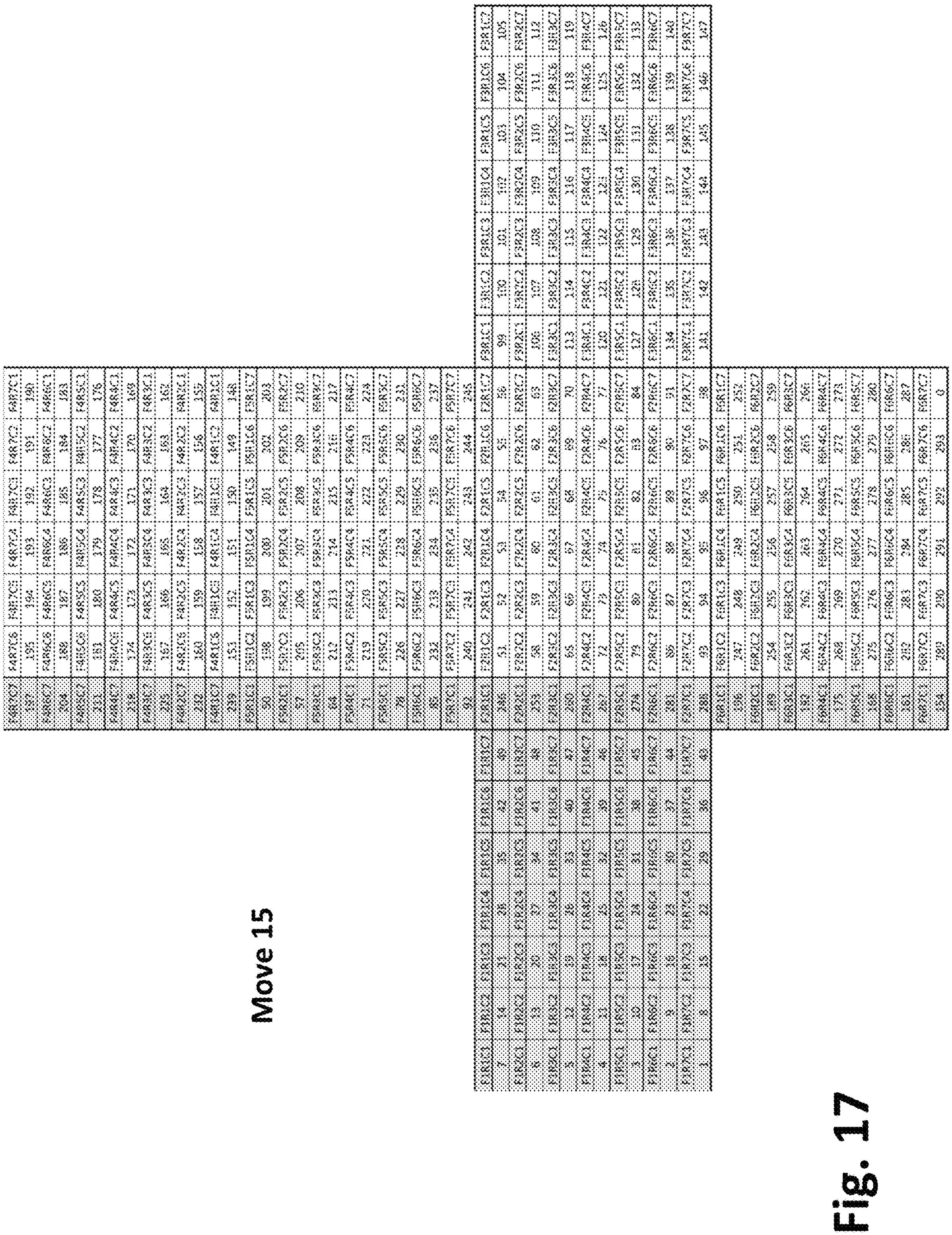
Figure 18:
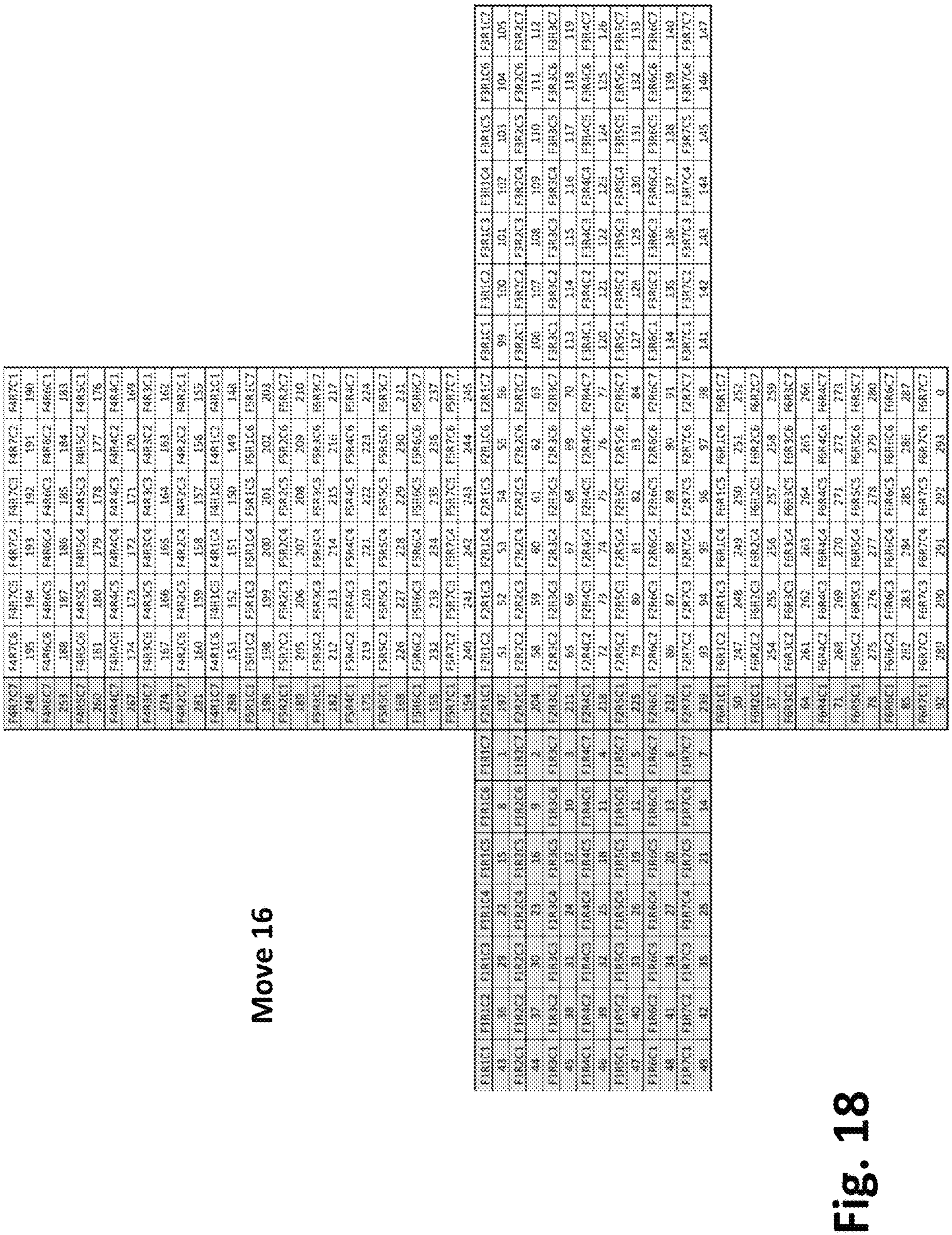
Figure 19:
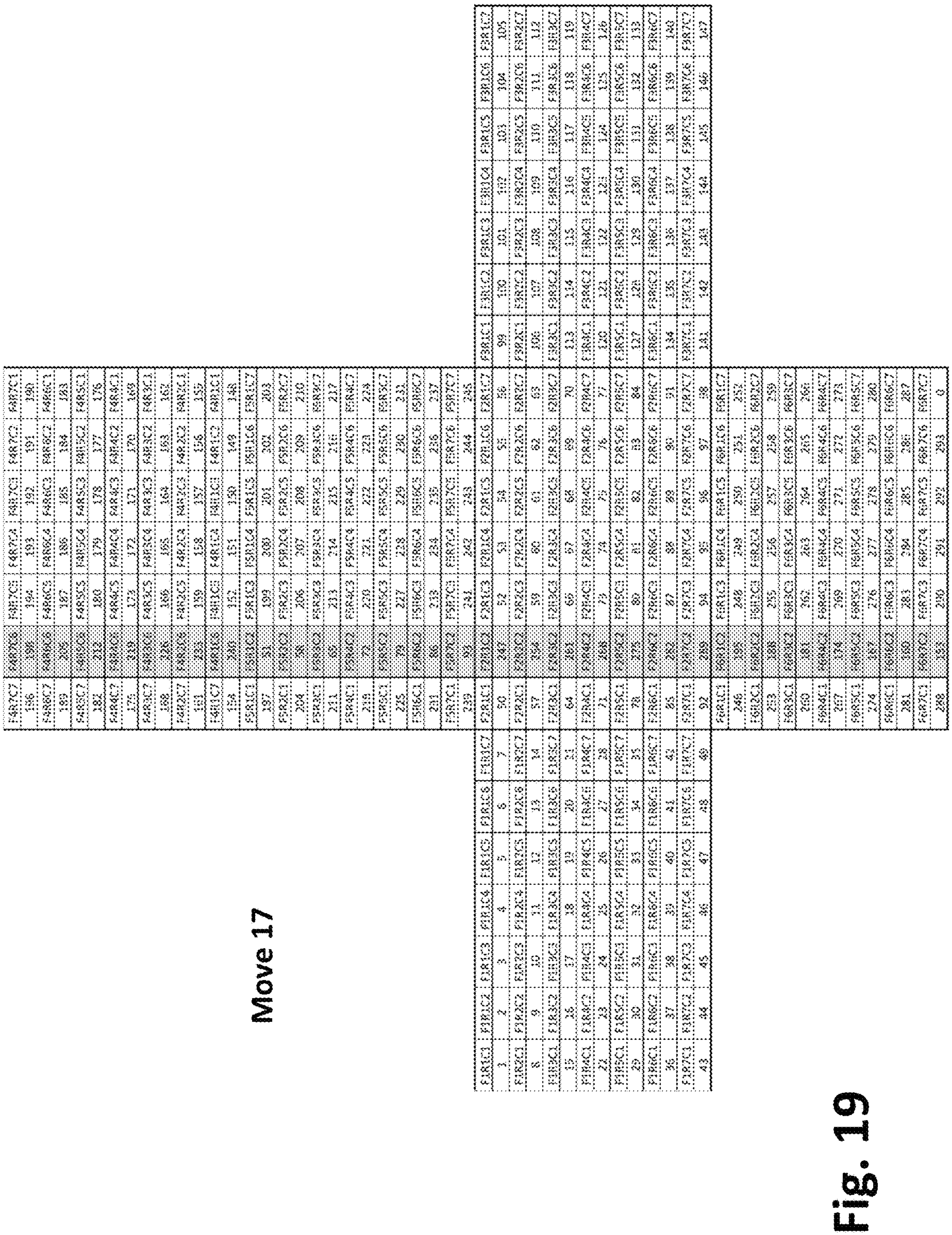
Figure 20:
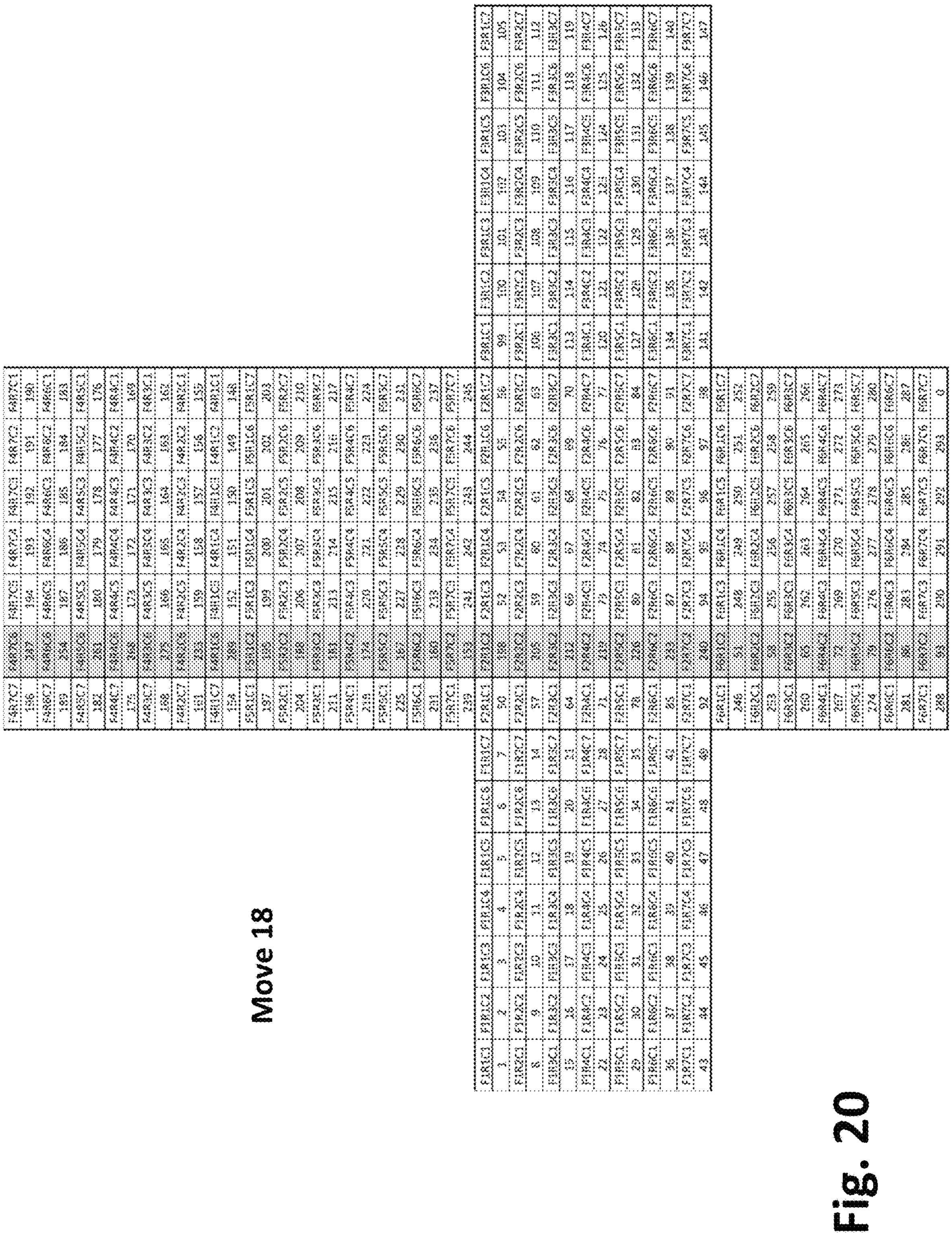
Figure 21:
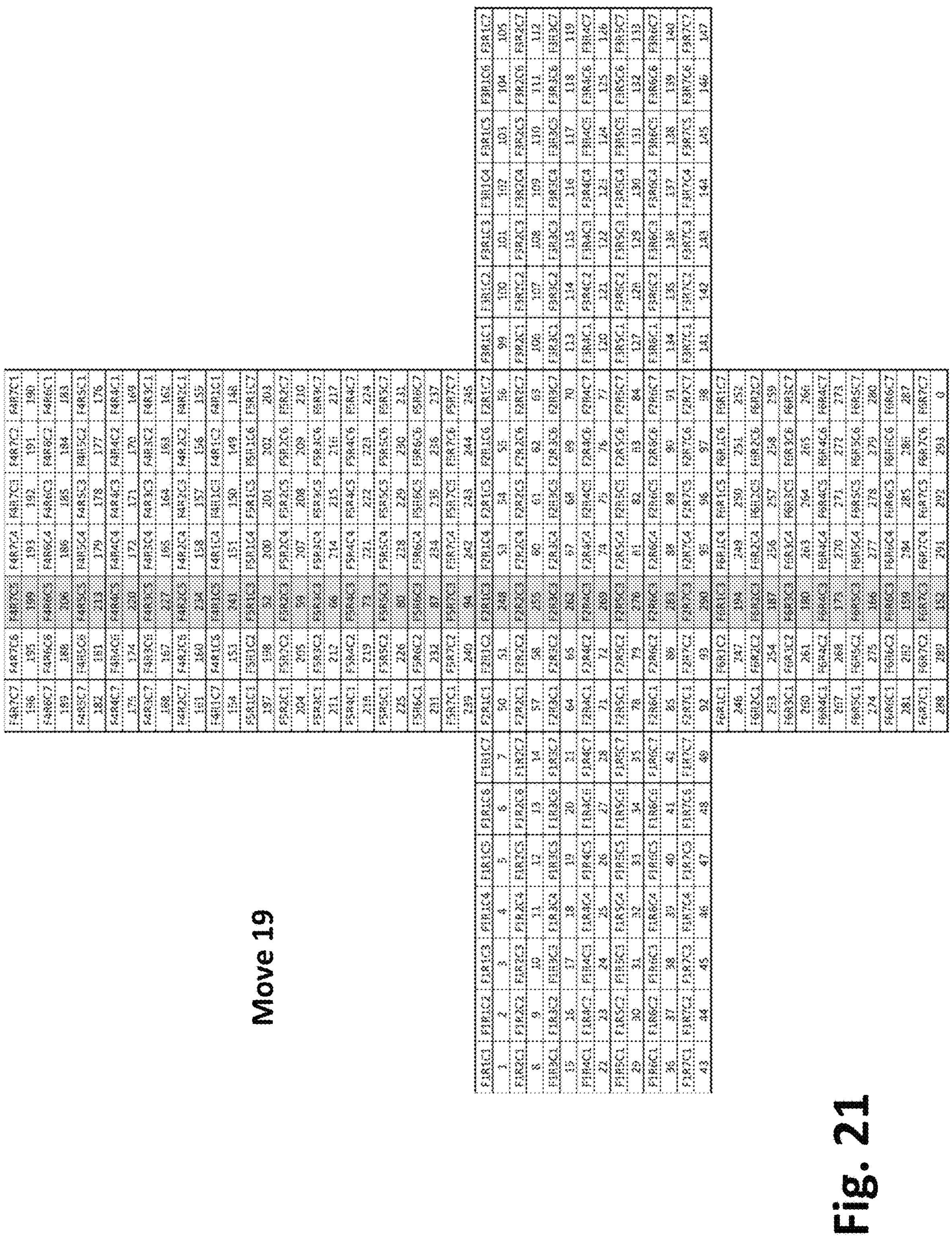
Figure 22:
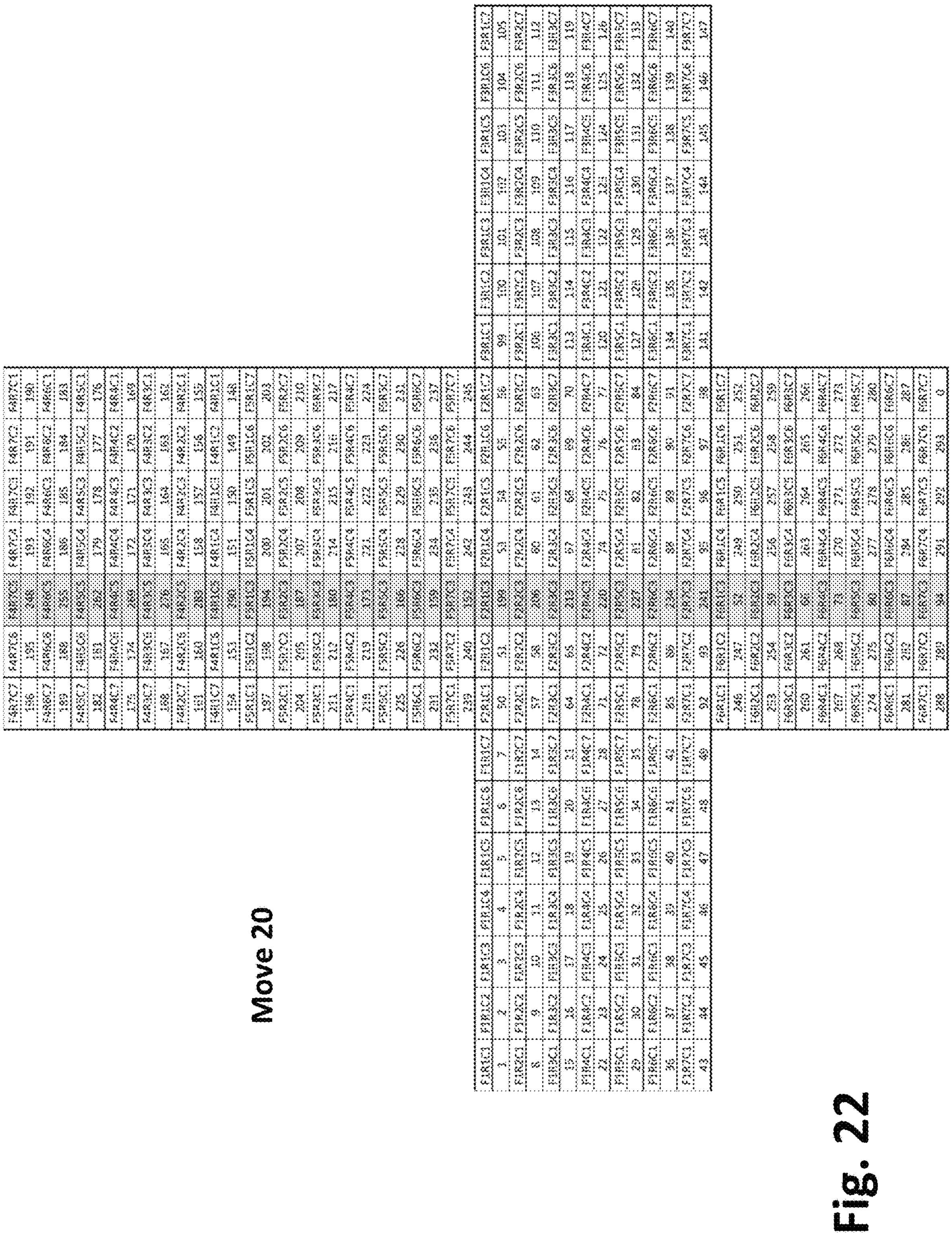
Figure 23:
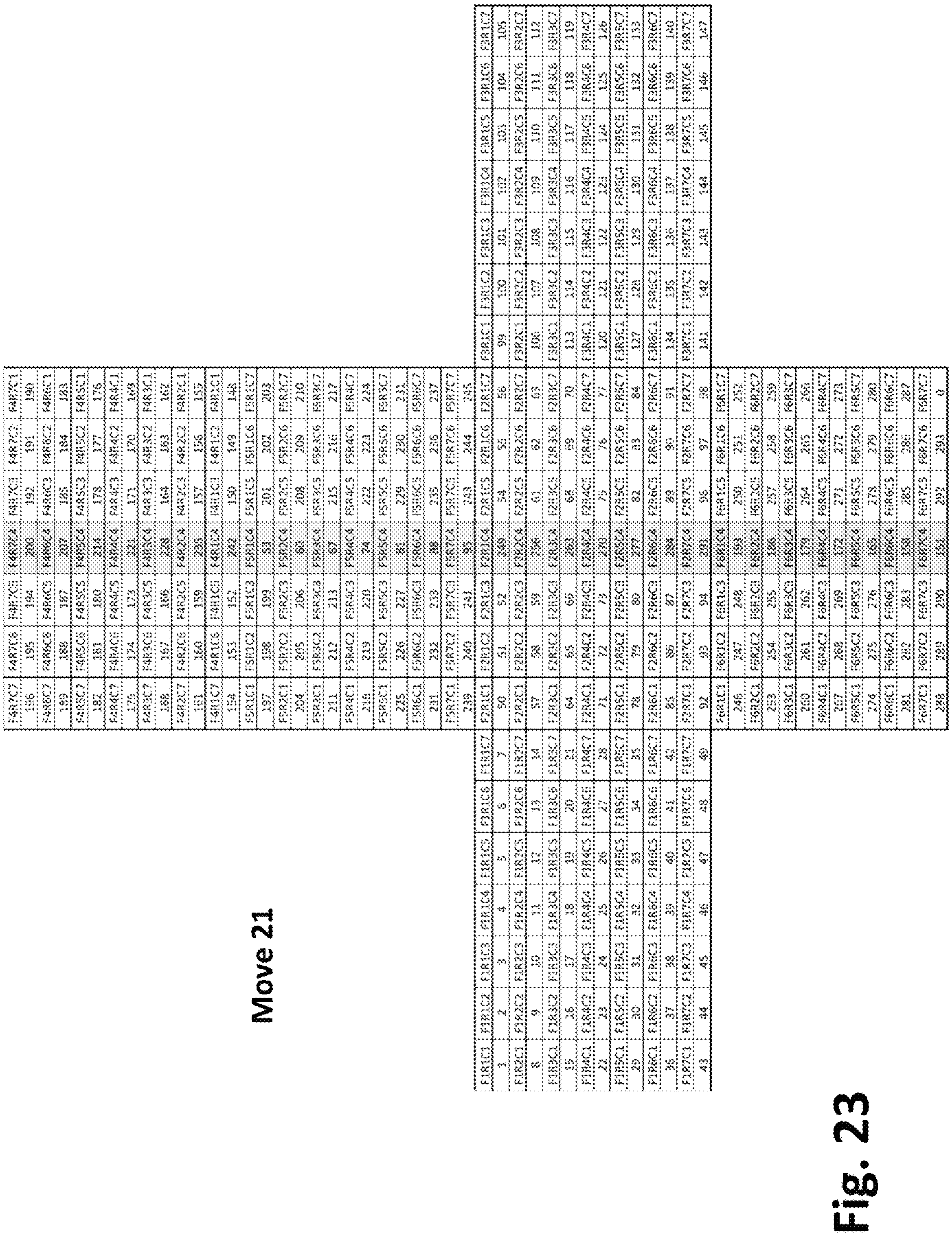
Figure 24:
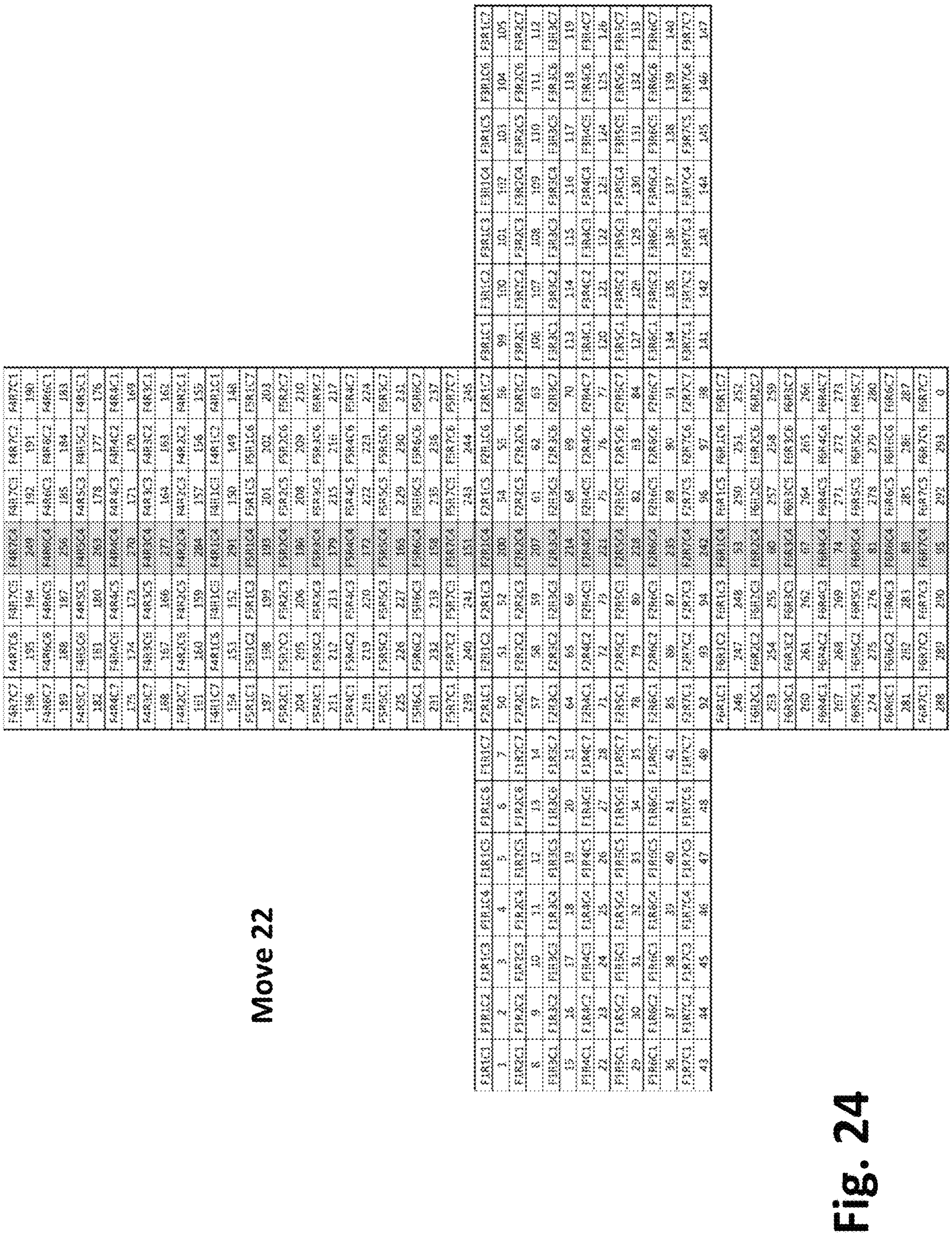
Figure 25:
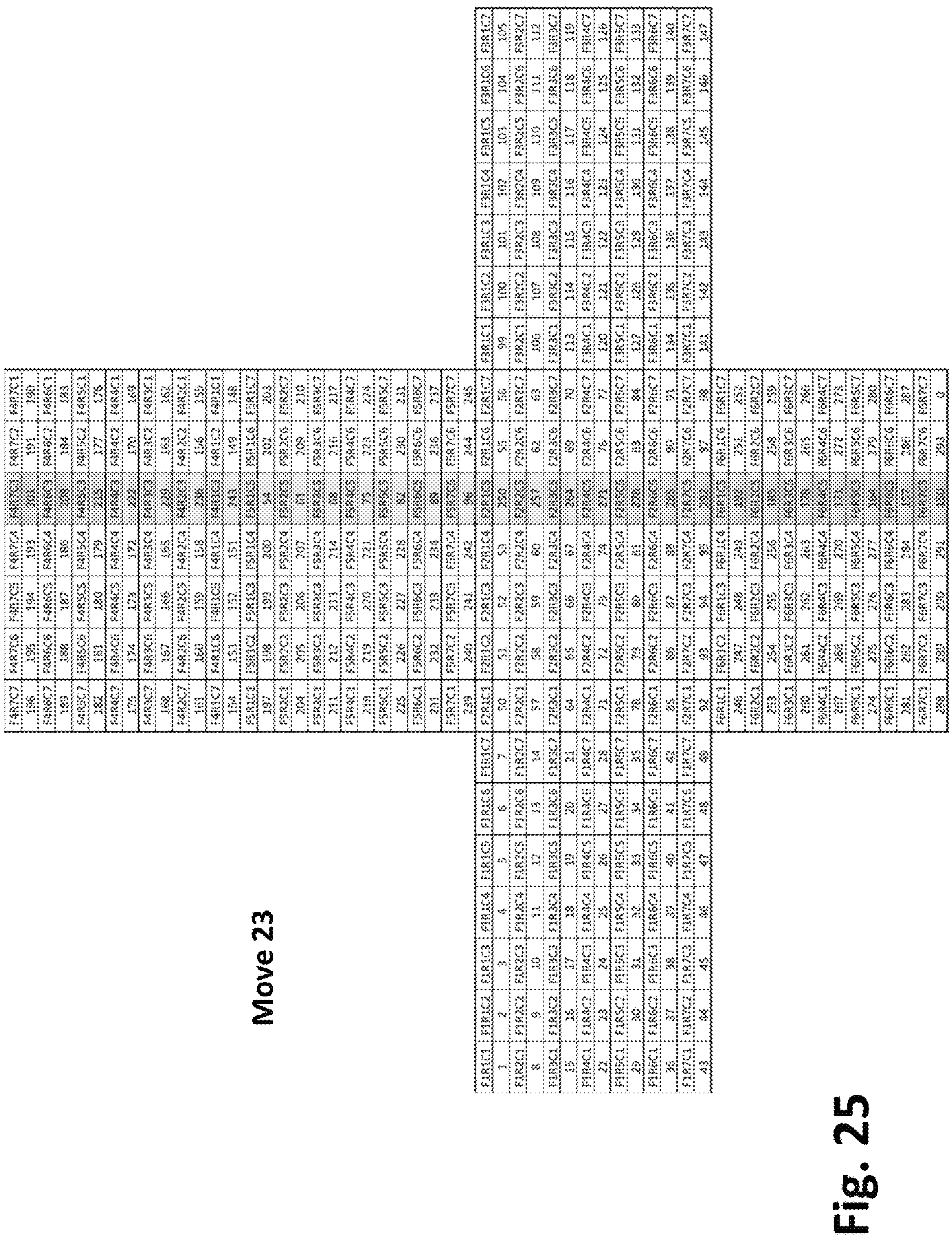
Figure 26:
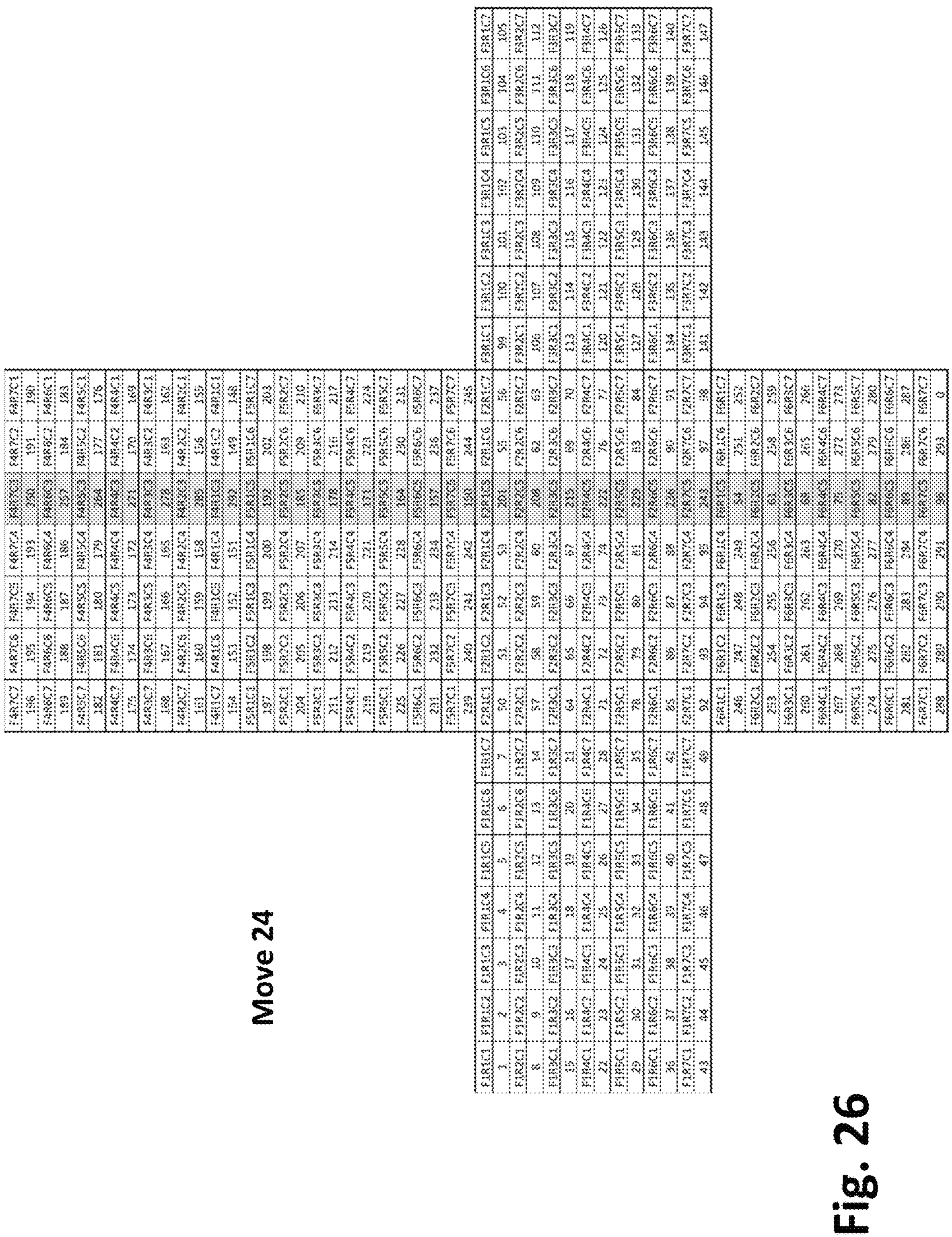
Figure 27:
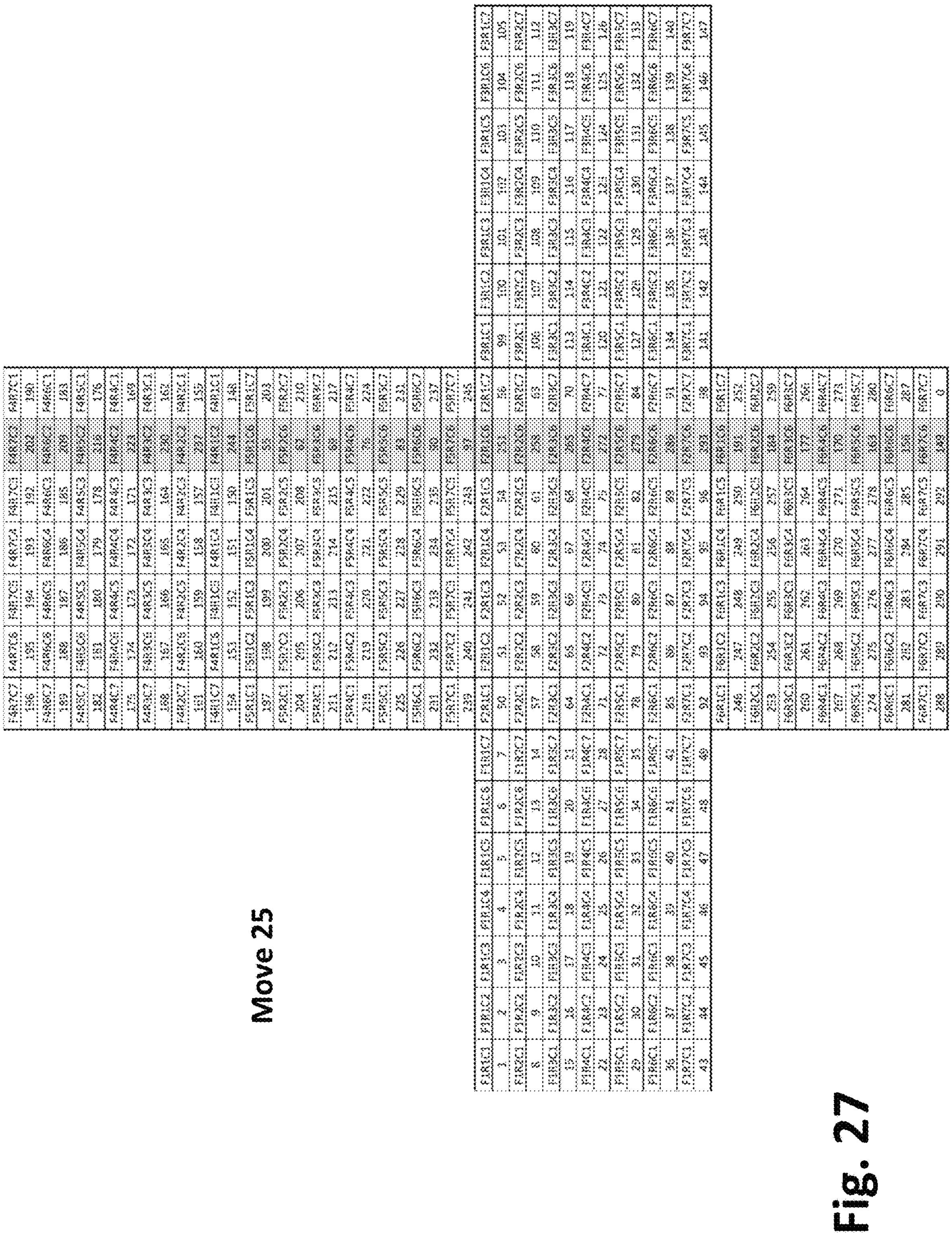
Figure 28:
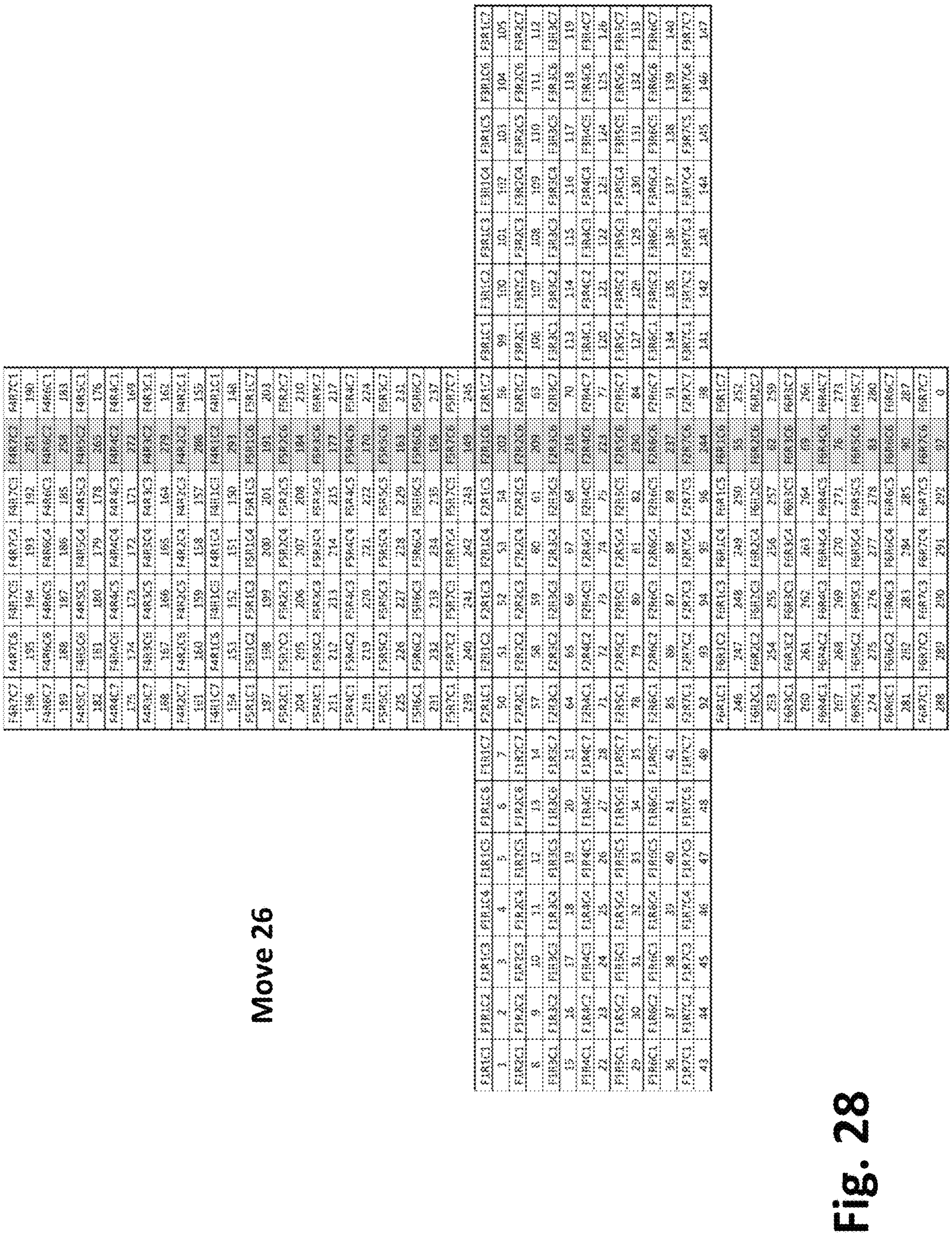
Figure 29:
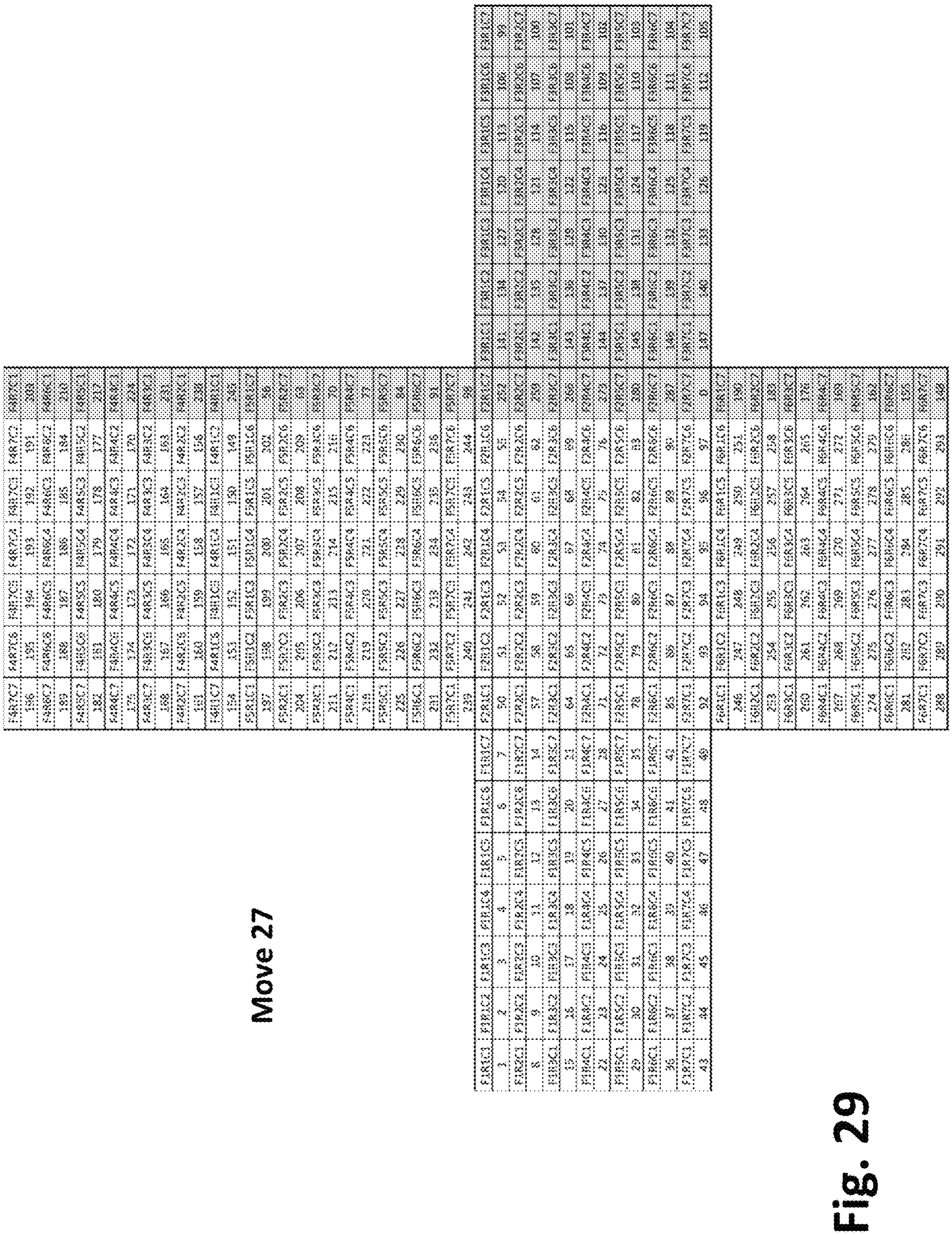
Figure 30:
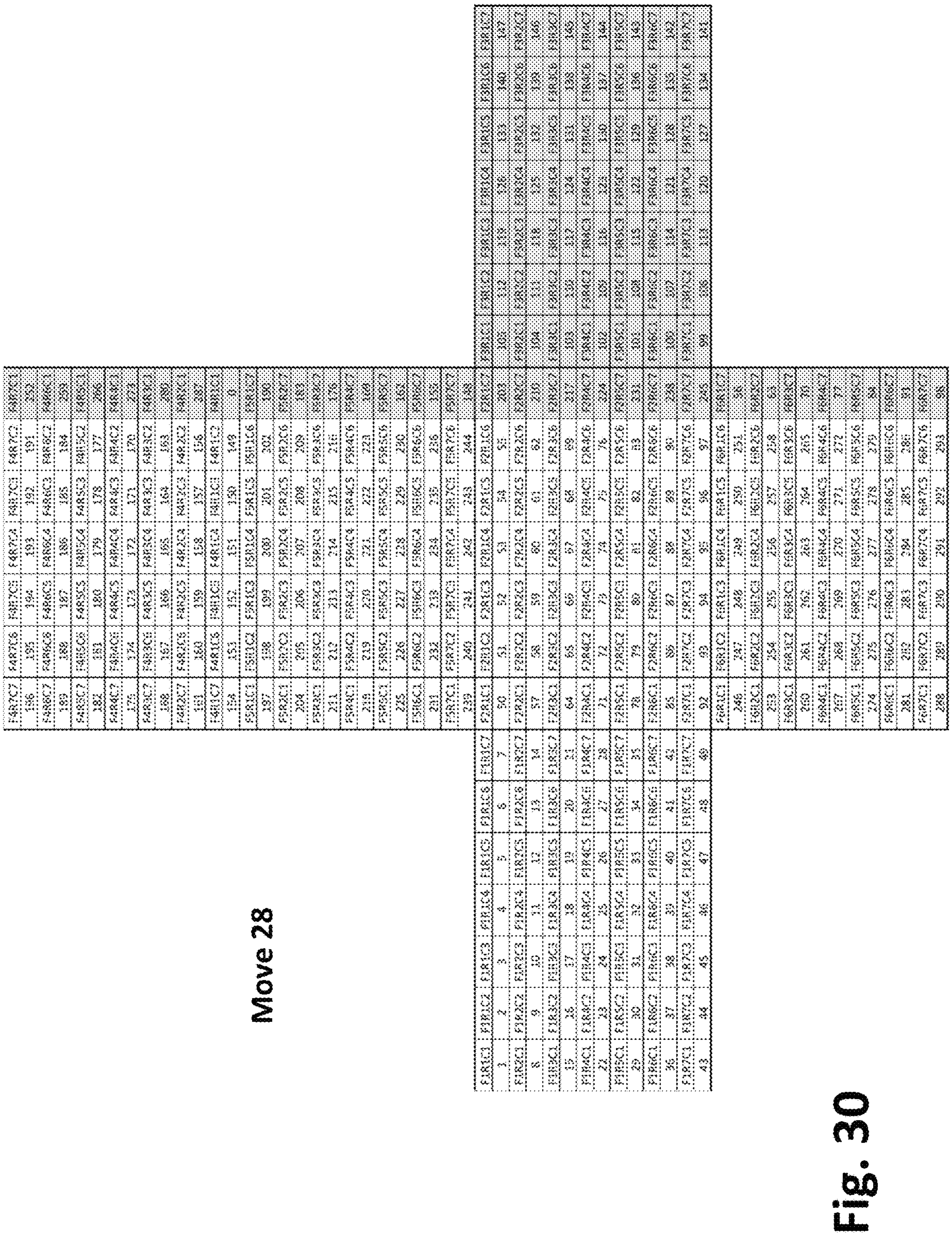
Figure 31:
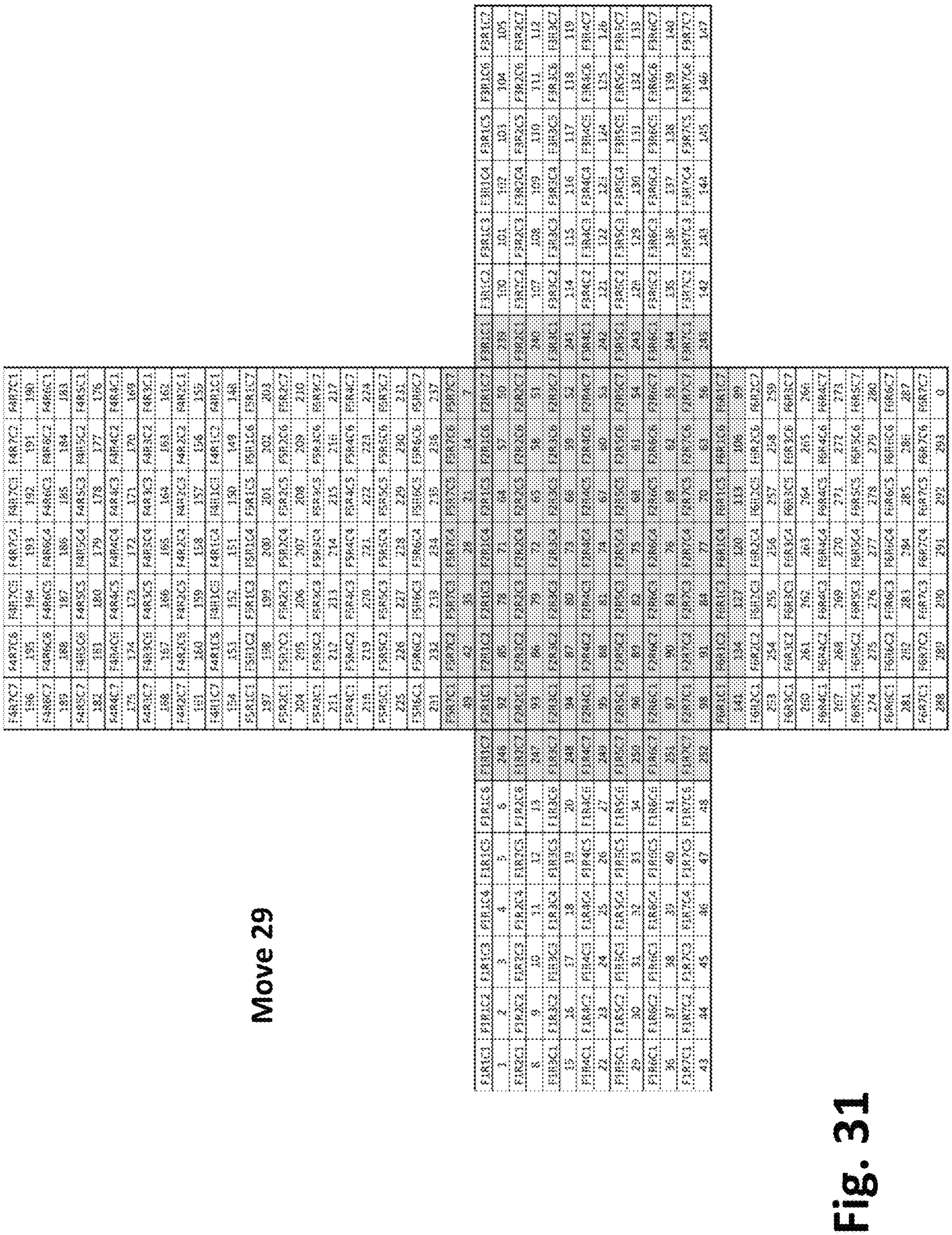
Figure 32:
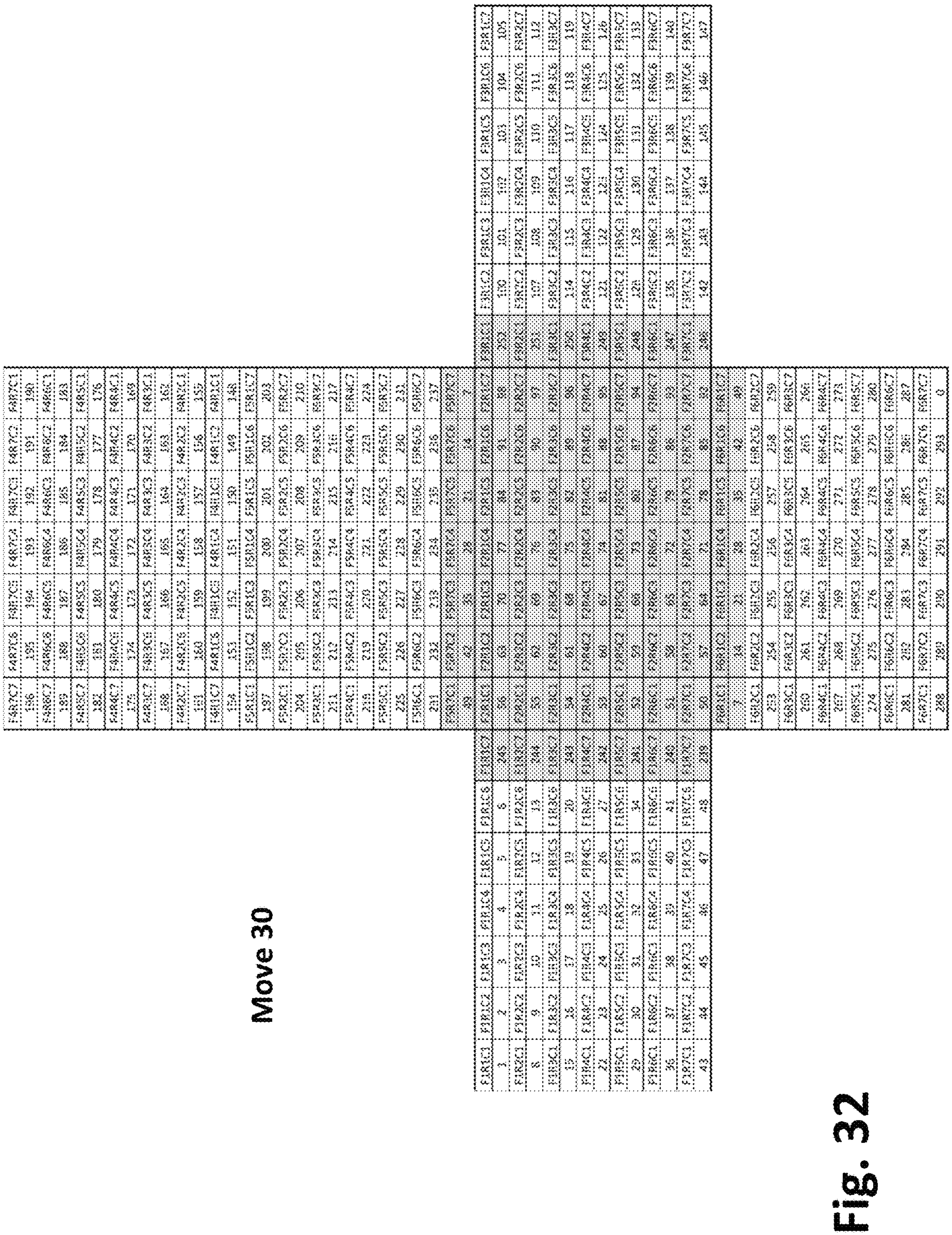
Figure 33:
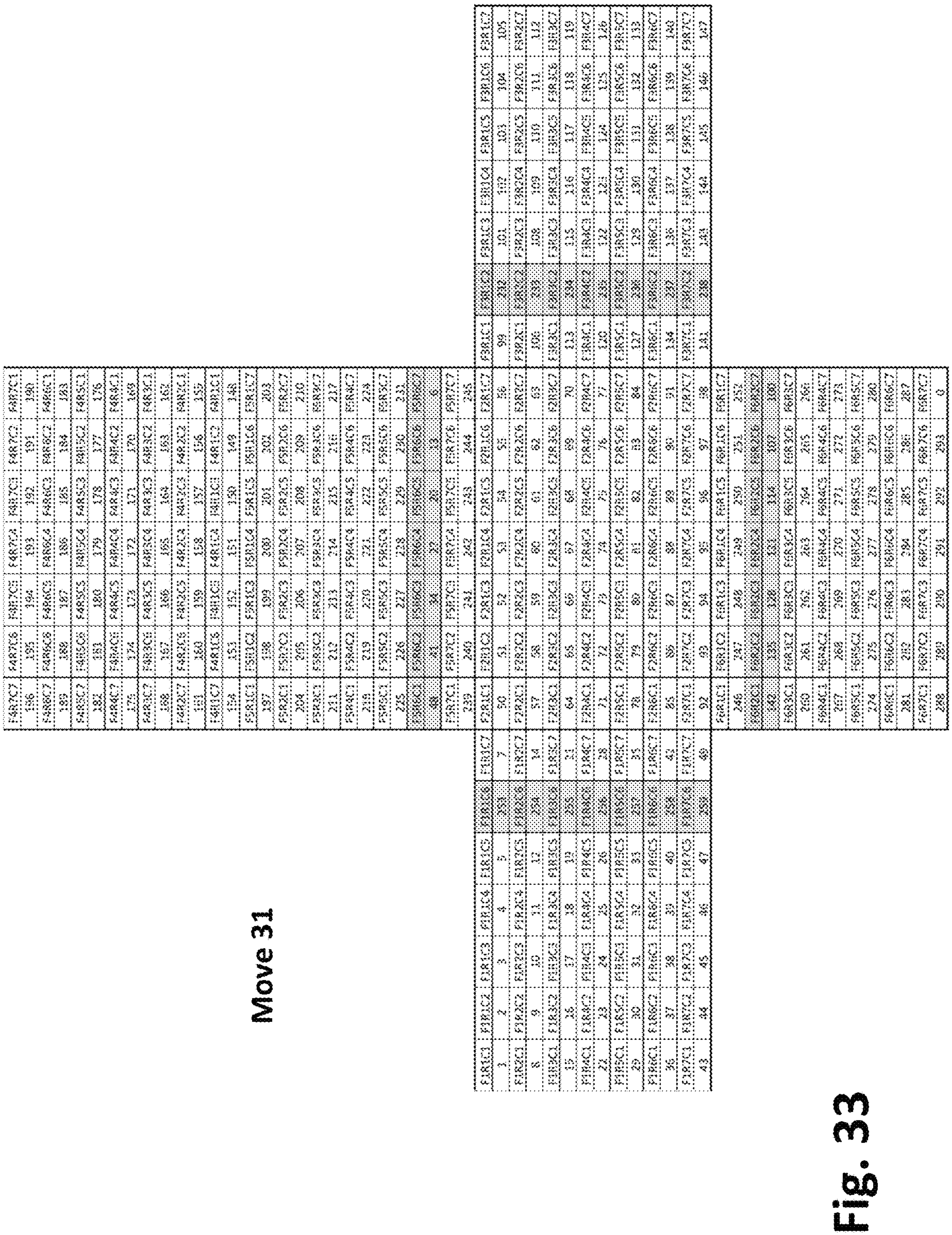
Figure 34:
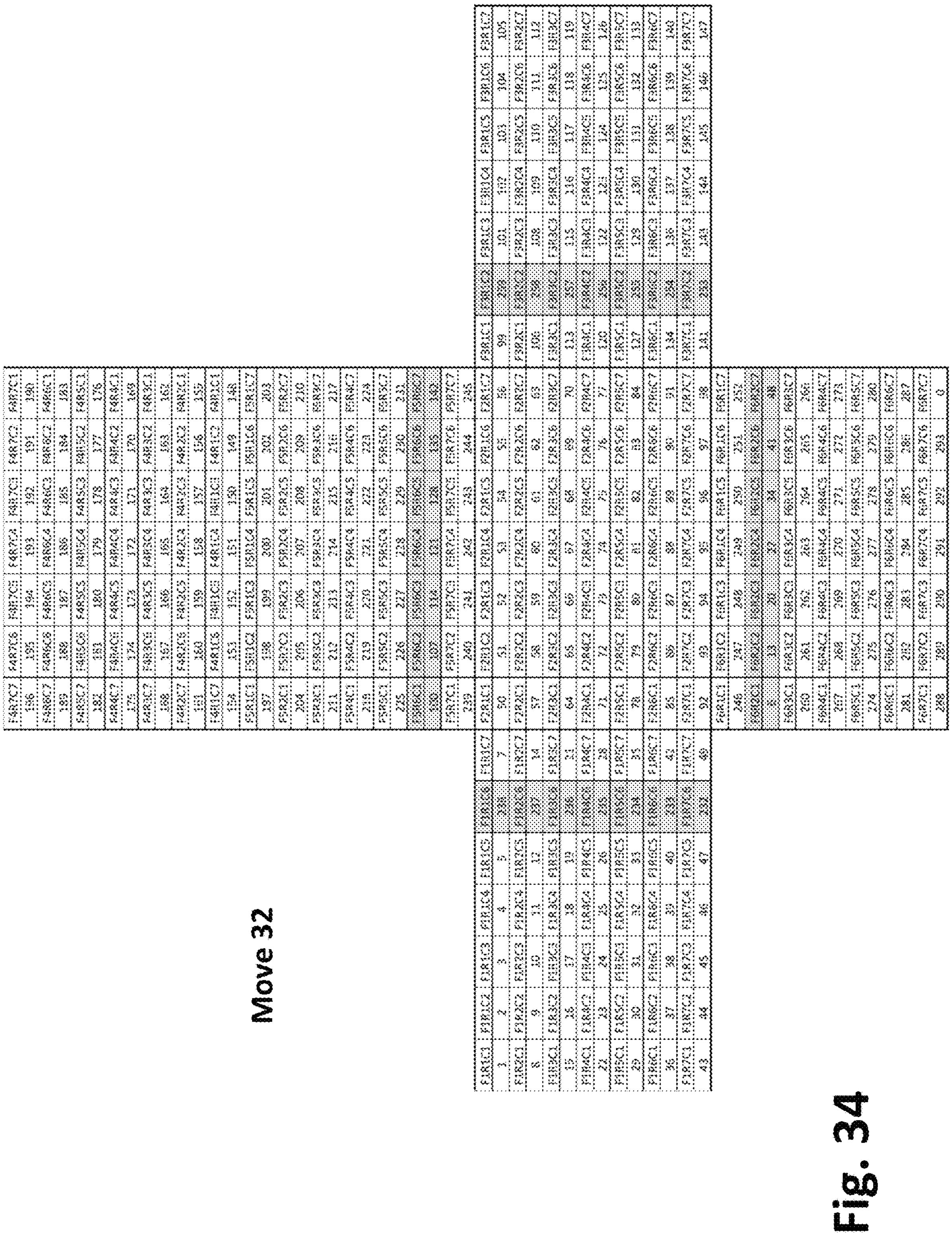
Figure 35:
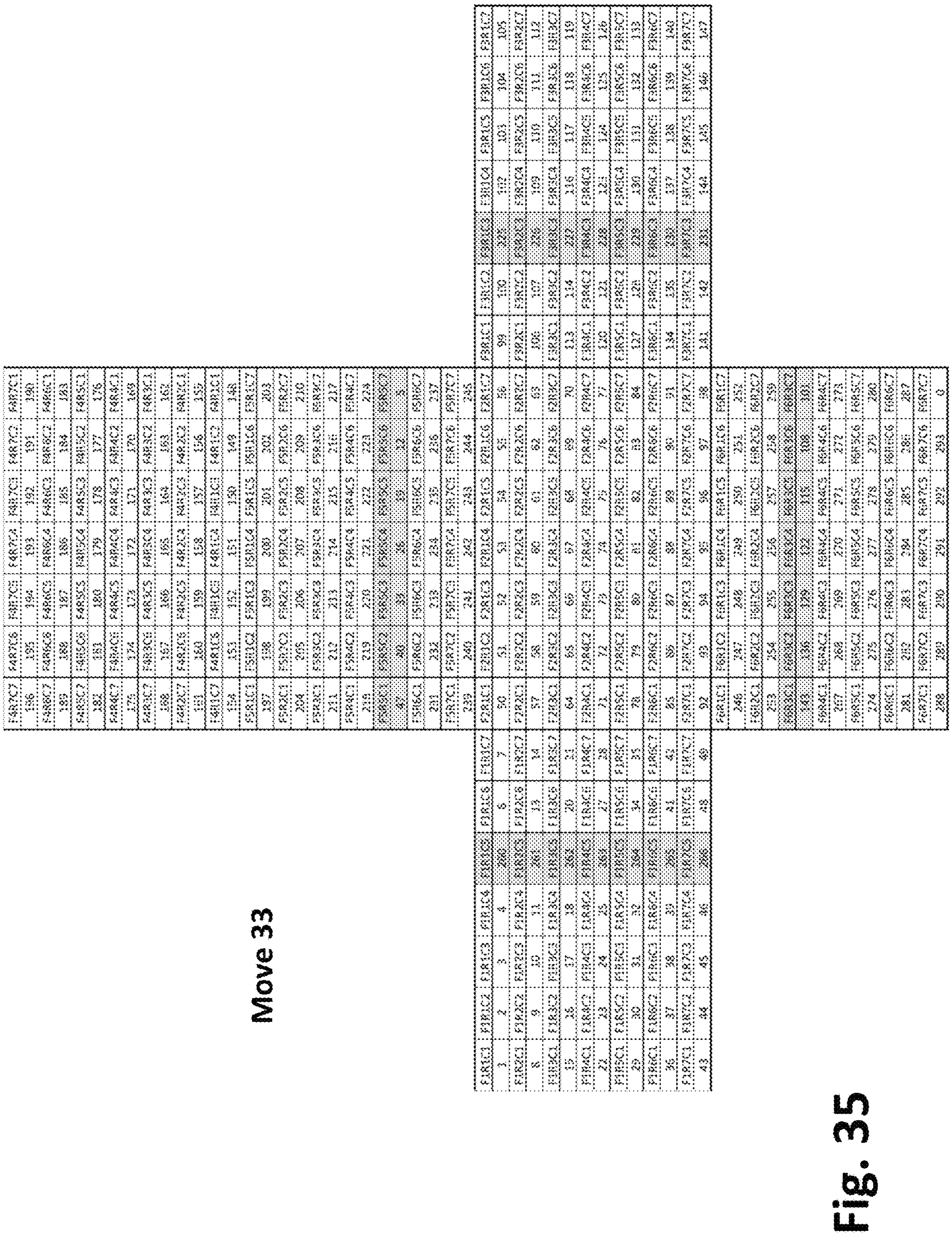
Figure 36:
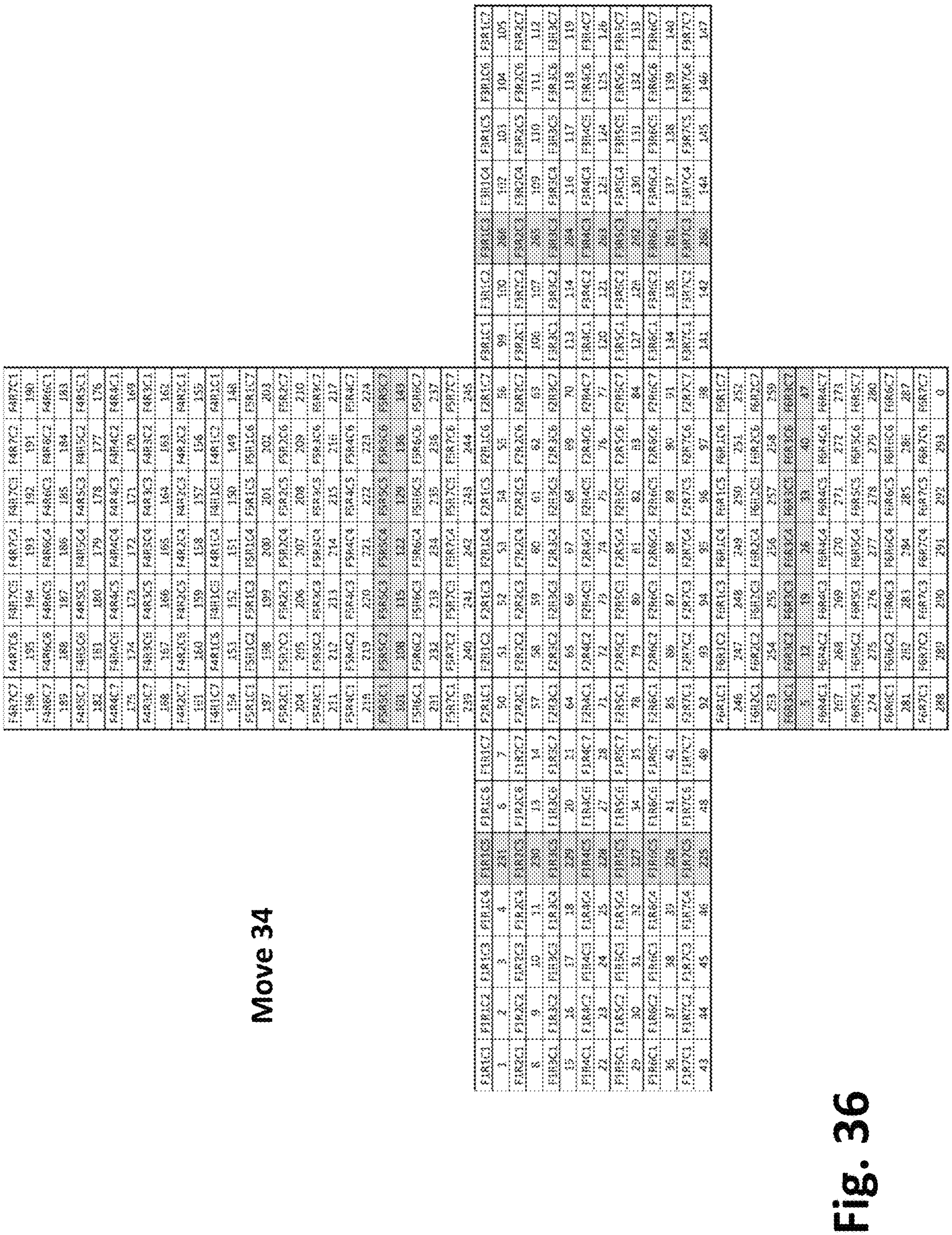
Figure 37:
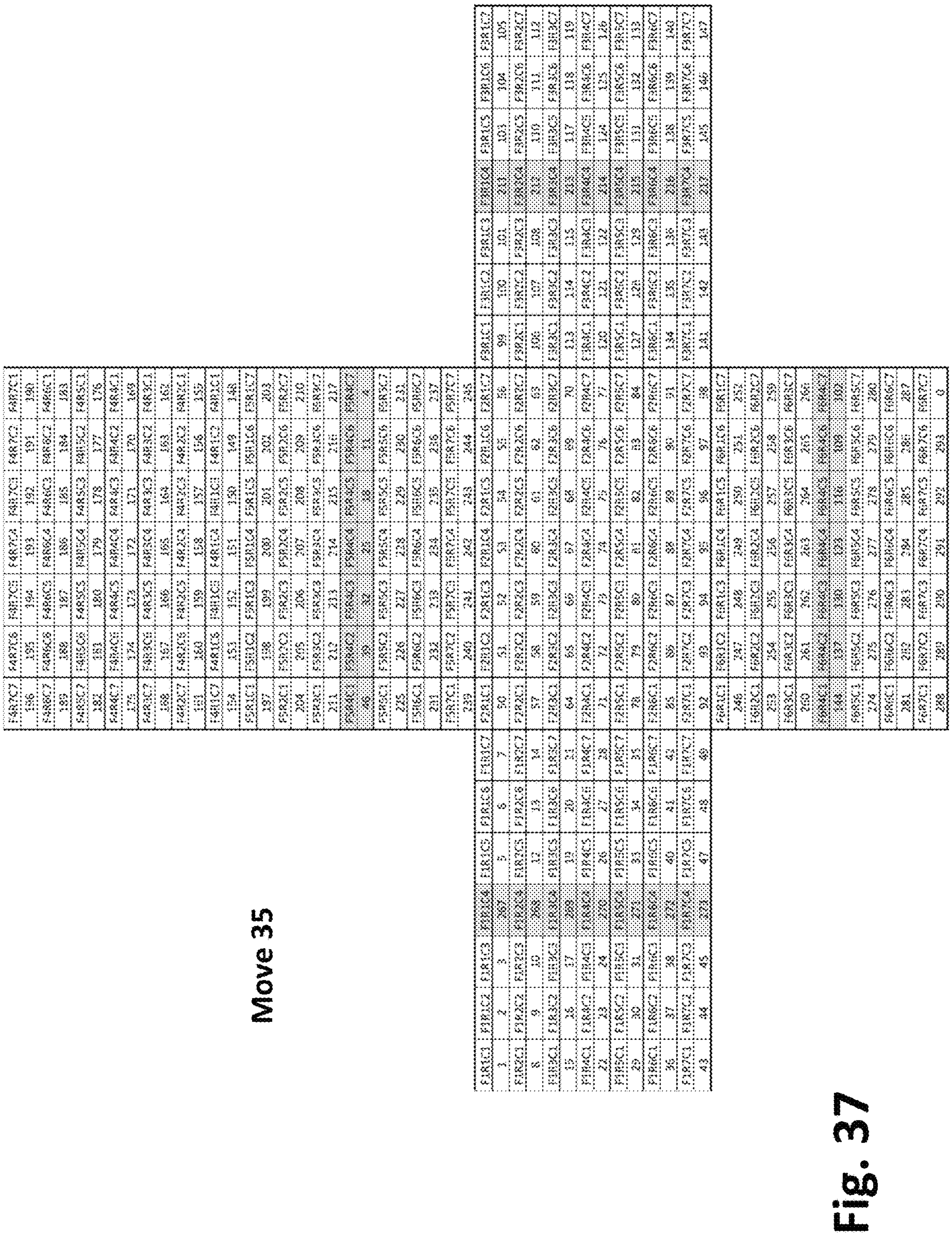
Figure 38:
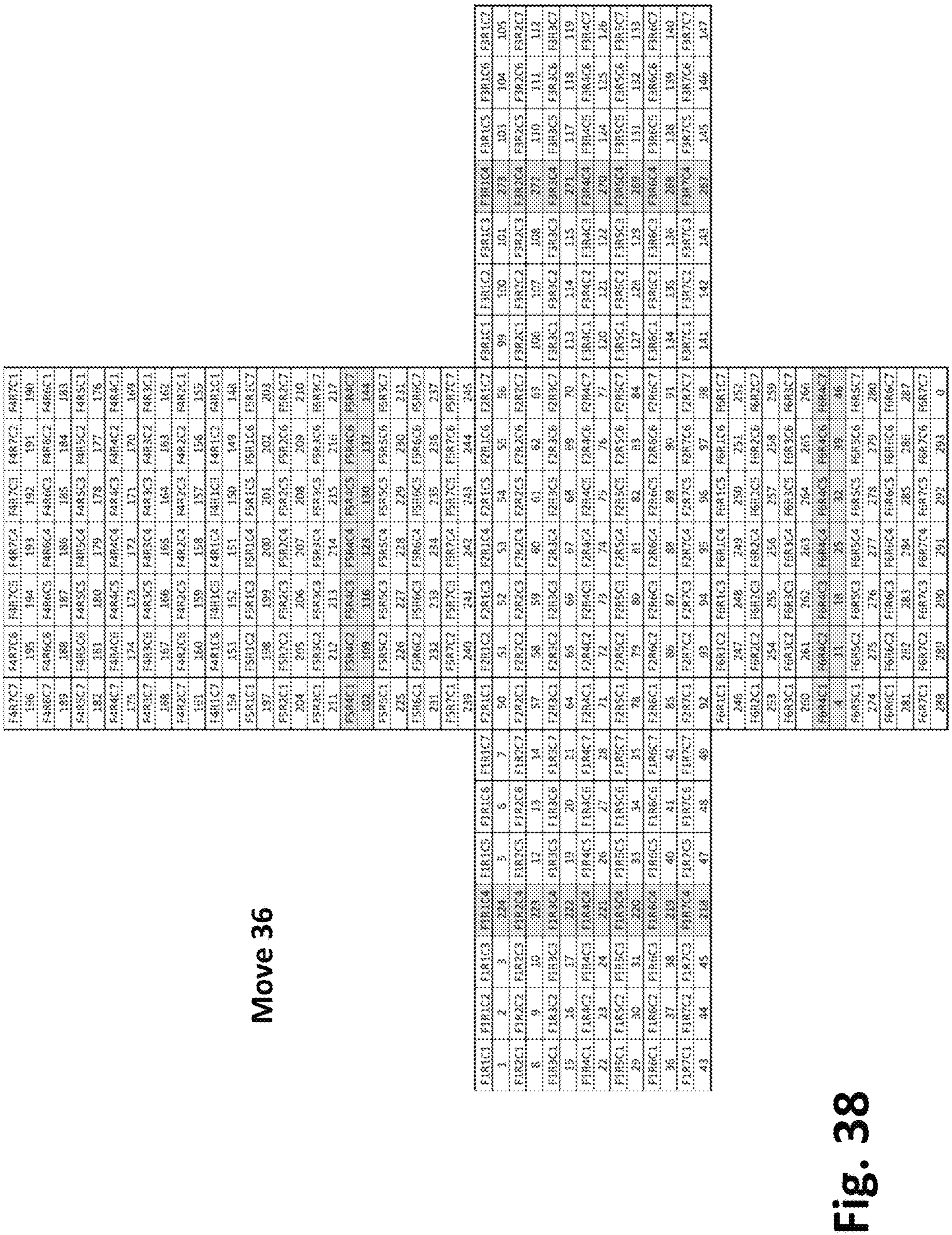
Figure 39:
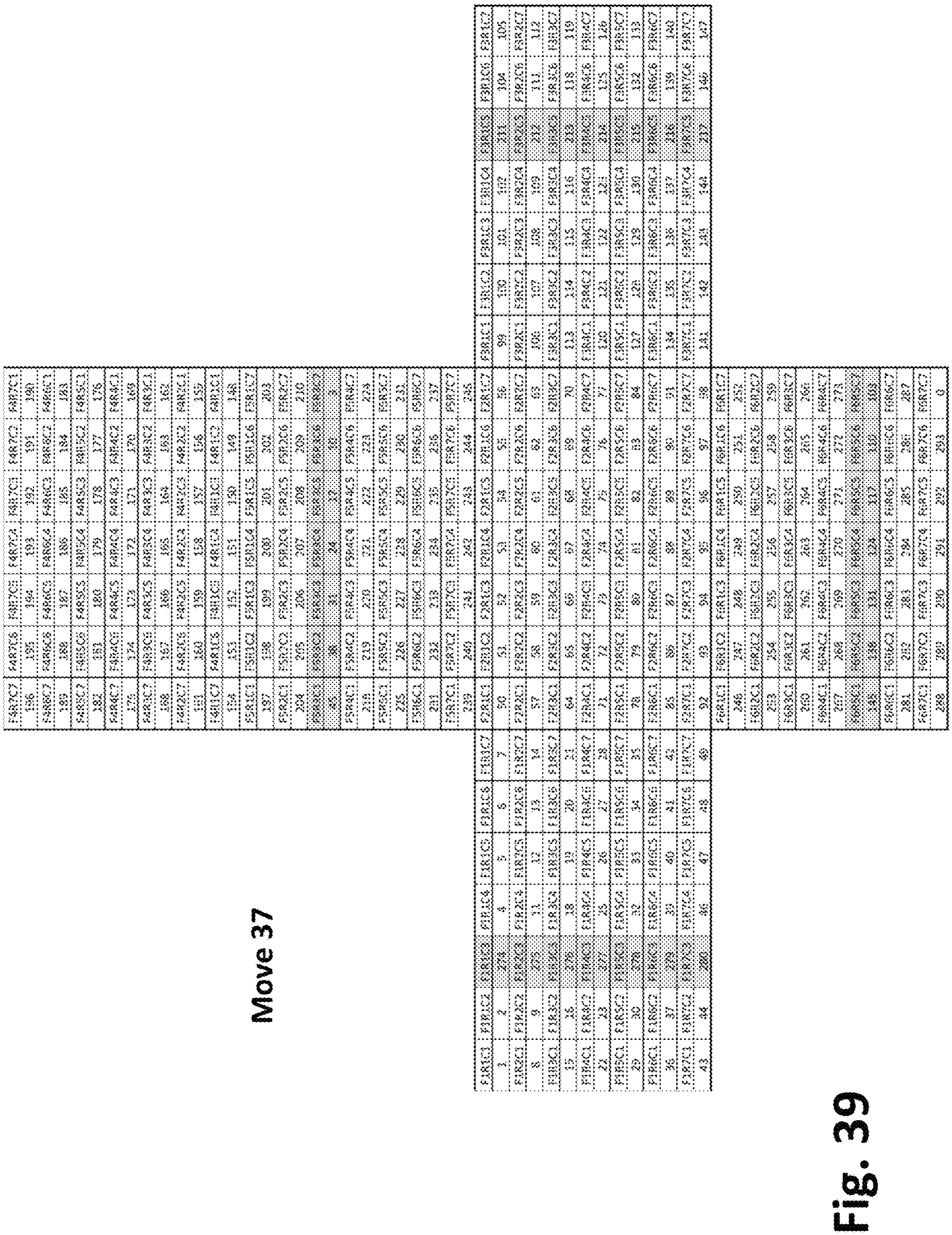
Figure 40:
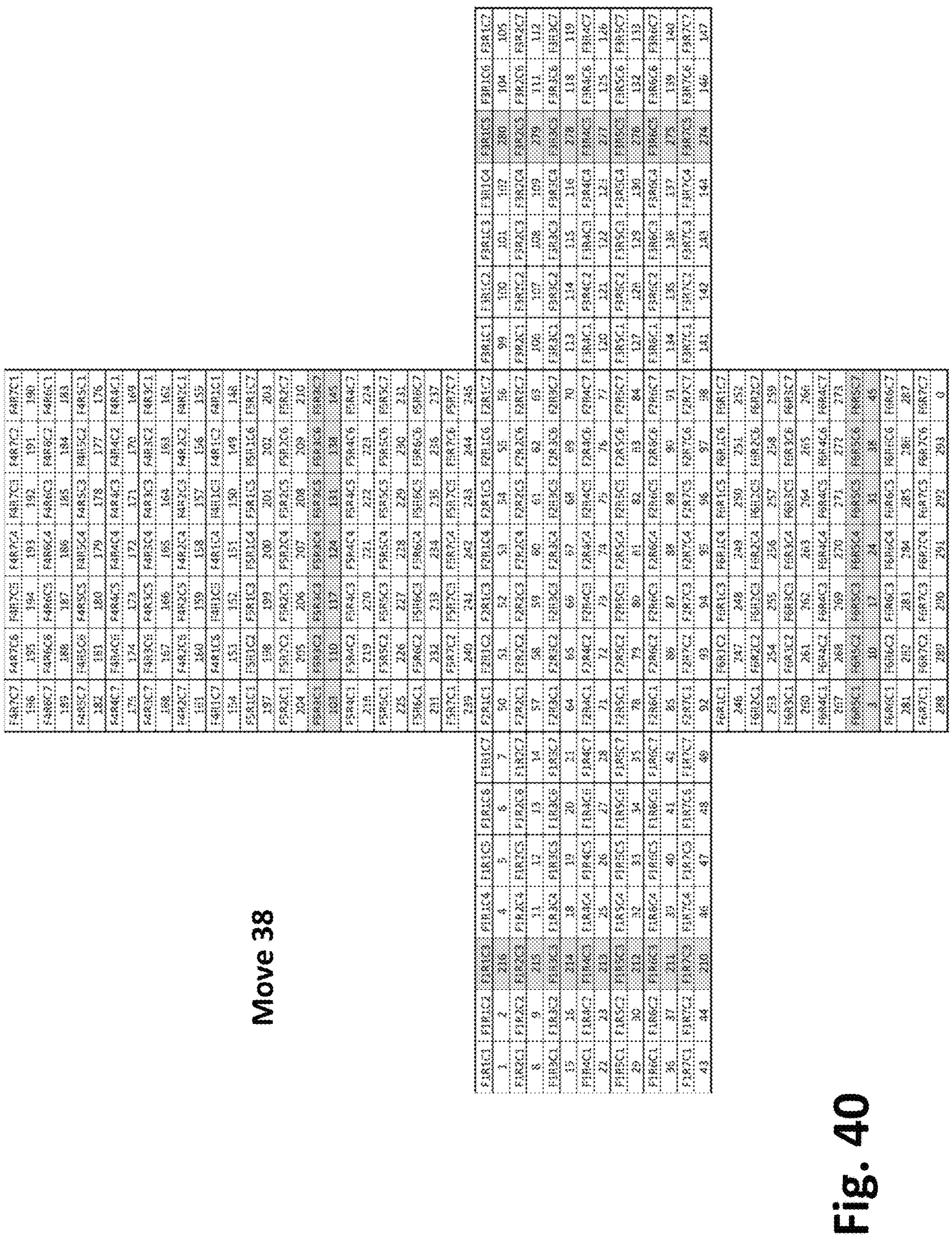
Figure 41:
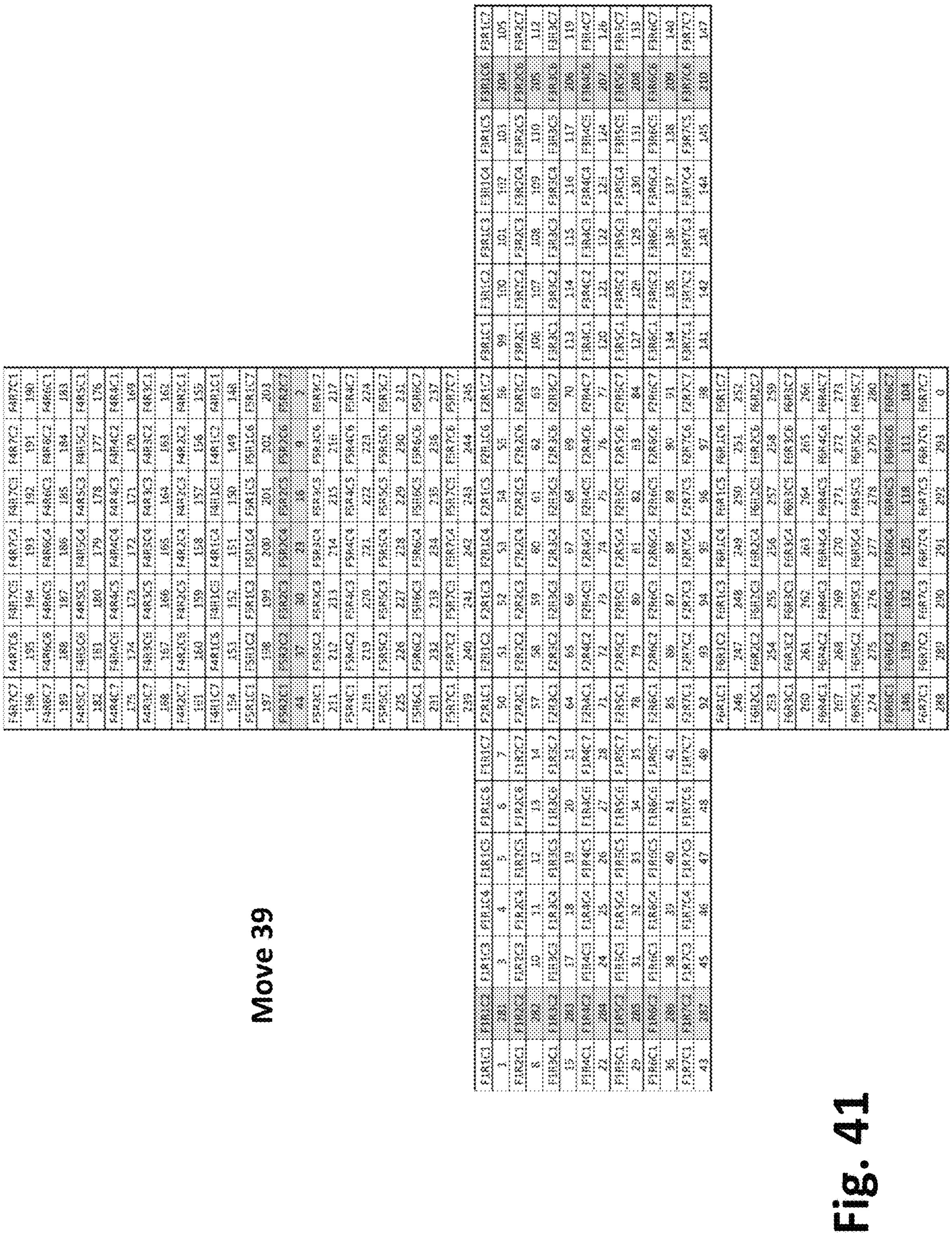
Figure 42:
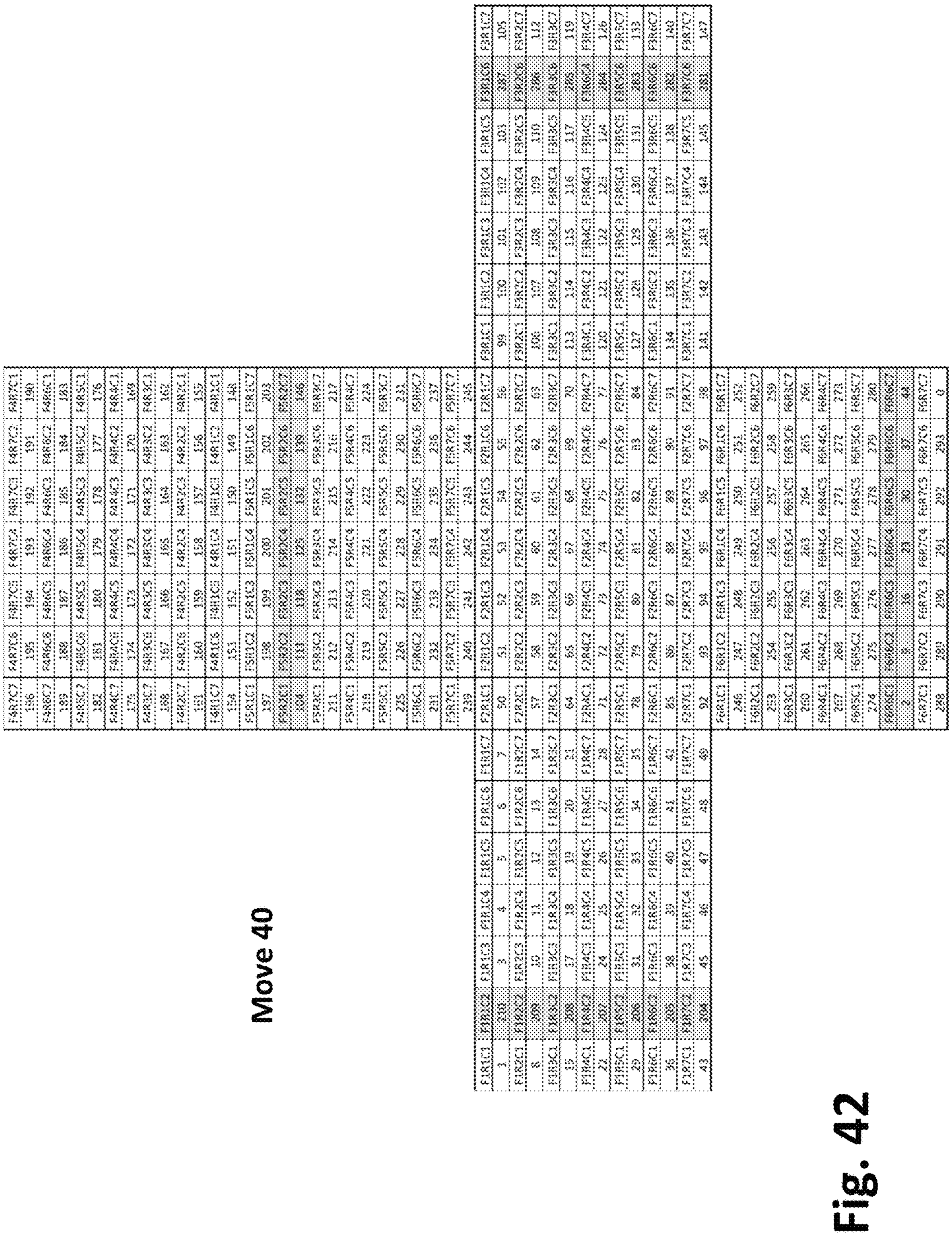
Figure 43:
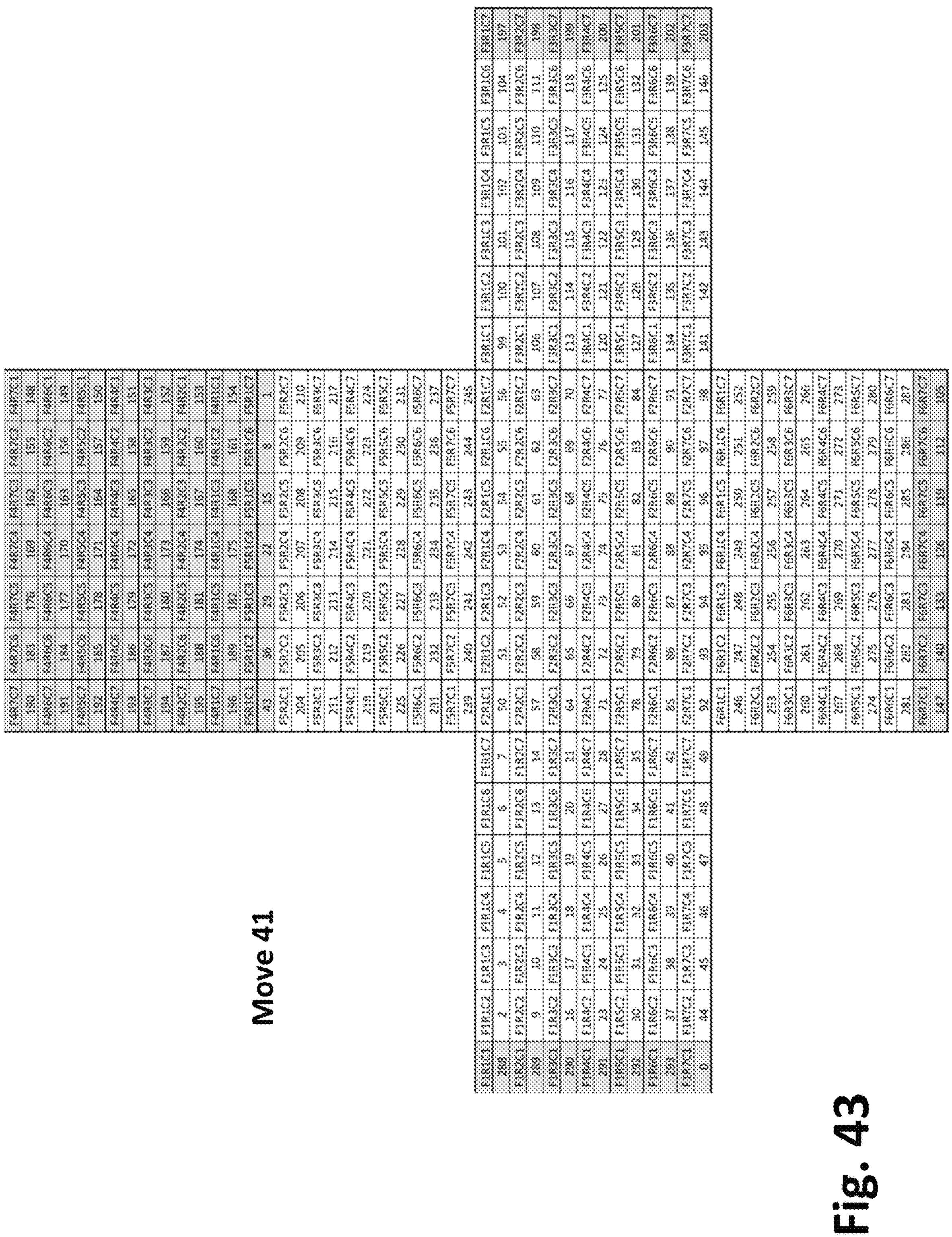
Figure 44:
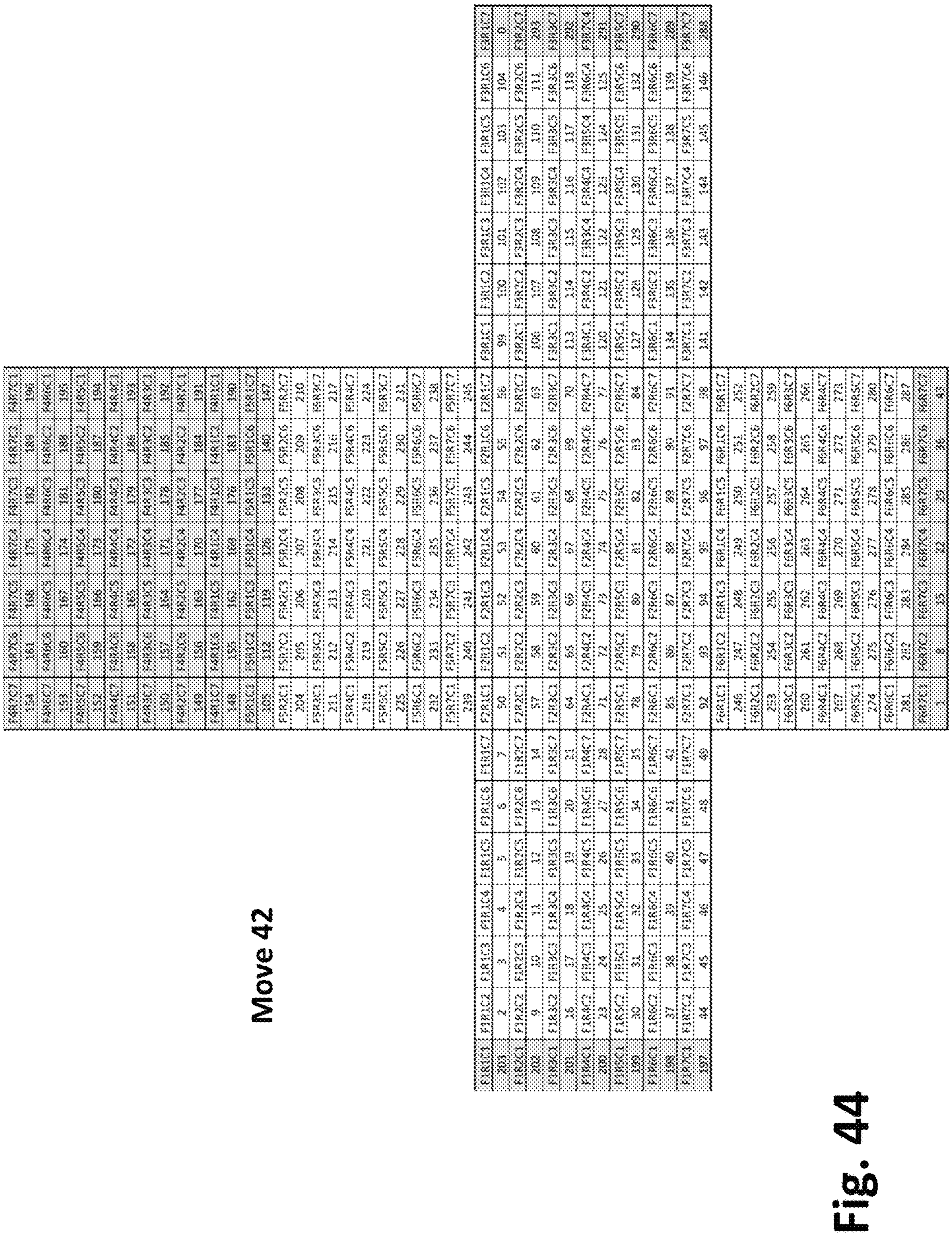

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

The disclosed method and system will be described in terms of the following six primary aspects: (i) text entanglement and text search; (ii) numerical entanglement for numbers and IP addresses and the corresponding numerical search process; (iii) generating format preserving (FP) tokens and retrieval; (iv) software platforms that implement the present text search process, the numerical search process and format preserving tokens; (v) data entanglement using 3 or higher-dimensional cubes; and (vi) using data entanglement to protect against malware, including ransomware.

I. Text Entanglement and Text Search

A. Background and Assumptions

According to some embodiments, the present system implements a process to improve the security of search indexes while using native search engines that are utilized in enterprise search platforms. In addition, the present system allows enterprises to move away from storing sensitive data in cleartext indices with minimal friction (e.g., without requiring a change to existing systems, processes, or applications)

In some embodiments, the system disclosed herein has the following features: (i) no storage of cleartext for earmarked fields; (ii) no retrieval back to cleartext for the purpose of performing search; (iii) no change to native ingest or storage mechanisms; (iv) no change to native search engines; (v) no additional filtering after native algorithm performs search; (vi) no change to node infrastructure (e.g., minimal resource footprint); (vii) minimal performance overhead (i.e., 5-10%); (viii) reduced storage overhead; and (ix) improvement in security relative to cleartext.

Common causes of data breaches that impact enterprise search platforms include accidental exposure leading to loss of sensitive data in cleartext (i.e., data not encrypted) or loss of admin access credentials. The present system's data entanglement reduces the impact of both opportunistic breaches, as well as targeted breaches that utilize stolen admin credentials, by ensuring that any sensitive data resident in the datastore is not available in cleartext.

B. Attributes of Data Entanglement

In order to provide the above features, the present data entanglement system provides a native search engine with an input in the form the native search normally expects. The data entanglement system further enables the native search engine to utilize the input to perform search using its usual method, but on entangled data. Two attributes of the present search engine include the Search Term and the Search Position explained below.

In order for a search engine to function, the search engine receives a Search Term. The Search Term is subsequently compared (e.g., by an algorithm) to previously stored data for the identification of potential matches. A positive match occurs when the Search Term matches the stored data either partially or wholly. According to some embodiments, the Search Term and the stored data does not need to be transformed in any way for a match to occur.

The search engine also receives a position at which the match must be made. This is specified in terms of starting (prefix), ending (suffix), or anywhere (wildcard). An exact match (term) search implies that every position is matched. Other variations, such as the exact position of the term in the string or position-specific patterns (RegEx), provide the search engine with positional information.

The Search Term and Search Position are two inputs that traditional search engines utilize and maintained with the present data entanglement system. The present system improves on traditional encryption schemes which provide security by removing both the Search Term, as well as Search Position, context from the ciphertext (e.g., the plaintext encrypted by an algorithm) as it relates to the corresponding cleartext input. Iterative confusion and diffusion cycles repeatedly replace and shift the original data until both the characters forming the data, as well as their positions relative to each other, lose their original patterns. This process ensures that the only way to identify any attributes of the original data is to apply the encryption process in reverse. This is also the reason why the present system provides an improvement to a technical problem of prior systems—namely that encryption does not lend itself to search and cannot be used to protect sensitive data in search indices.

The present data entanglement system also provides the technical improvement by improving security beyond cleartext while maintaining searchability. Searchability requires that the Search Term and Search Position context is maintained. For enterprises that need search functionality and who are forced to store sensitive data in cleartext, data entanglement is an improvement to cleartext storage, as well as traditionally encrypted storage.

C. Data Entanglement Process

Data Entanglement utilizes a key to dynamically create two types of transformations applied to the input data, confusion and diffusion In the key-based confusion, the key is utilized to create a unique multi-dimensional space used to alter the positional context of the original data. Multiple alterations are made, but these are deterministic—e.g., the same key would allow the present entanglement process to reproduce the same position alterations. This serves to obfuscate the data and preserve positional context to the extent that it can be found by a key-based search engine.

In key-based diffusion, the same key, according to one embodiment, is utilized to alter the data so that the input characters are different from those that make up the entangled string. The present diffusion process is such that even when the same key is used, a given set of characters in the input data do not end up being mapped to a constant set of characters in the entangled output. Additionally, multiple alterations are made, but the variation in output characters can be deterministically reproduced every time a given key is applied to the same input data. As a result, key-based diffusion obfuscates the data, but still protects the term context used to implement the search.

The present data entanglement system creates an entangled string E as a function of the input string land the entanglement key k according to the following relationship:

$$E=f(I,k)$$

Function E is further made up of two components (e.g., the confusion step and the diffusion step), each of which is a function of the key as well as the input data:

$$E(I,k)=c(I,k)+d(I,k)$$

Positional context is positional information in the entangled string relative to positions of characters in the input string. Retaining positional context to any extent means that after the entanglement process, the entangled string retains some positional information that can be traced back to the original input data. Smaller positional information translated to a more secure transformation and a longer data retrieval process during the search. Applying c(I,k) to input string I using key k produces a confused string which includes a positional component p:

$$c(I,k)=E_c+p$$

Similarly, term context is term information in the entangled string relative to the characters that make up the original input string. Retaining term context to any extent also means that the terms in the entangled string can be traced back to specific characters in the original string. The most secure transformation would be the one where characters in the entangled string would have no correlation with the original input. However, this would also render the string unsearchable in its transformed form. According to some embodiments, the present system retains some term context and balances the amount of context retained with the time it takes a search engine to sift through it and connect it with the original input data. Applying d(I,k) to input string I using key k produces a diffused string which includes a term component t:

$$d(I,k)=E_d+t$$

And because the entanglement function E is the sum of the confusion step and the diffusion step as discussed above (i.e., E(I,k)=c(I,k)+d(I,k)), when the present system applies the present entanglement function to an input string, it produces an output string with the following characteristics:

$$E=E_c+E_d+p+t,$$

which can be written as:

$$E=E_b+p+t$$

provided that $E_c$ and $E_d$ are combined together into $E_b$.

According to some embodiments, a given input cleartext string, I, is defined as the ordered set $\{i_1, i_2, i_3, \ldots i_n\}$, and its corresponding entangled string, E, is defined as the ordered set $\{e_1, e_2, e_3, \ldots e_m\}$, with n not being equal to m. Consequently, the entangled string E=f(I,k) can be written as:

$$e_{1\text{-}m}=f(i_{1\text{-}n},k).$$

It is noted that while the subscripts for $\{i_1, i_2, i_3, \ldots i_n\}$ and $\{e_1, e_2, e_3, \ldots e_m\}$ both use contiguous numbers (e.g., 1, 2, 3, etc.) these do not imply a direct correlation in position between ix and ex for any given x.

In the absence of k and any other entangled strings, an entangled string E, when examined by itself, would not divulge any information about the original input string I. The presence of p and t inside E would not create information leak or other security problems as they would be indistinguishable from the overall entangled string.

Components p and t, can be used by existing native search engines to sort through entangled data.

D. Instructing Native Search Engines to Examine Entangled Data

As discussed above, when using existing native search engines to perform searches, term and position information must be provided and used on the entangled data. For normal cleartext data defined as items I={I1, I2, I3, . . . }, the Search Term is defined as T. The type of search determines the position element (e.g., the Search Position), such as the prefix (e.g., start), suffix (e.g., end), and wildcard (e.g., anywhere). Assuming the Search Position is P, a search would be defined as:

Look for any $I_x$ in $\{I_1,I_2,I_3, \ldots\}$, where $T$ is found in position $P$ within $I$.

If each I consists of a series of characters $i_x=i_1\ i_2\ i_3 \ldots i_n$, then P is the value of x, and the above statement can be written as:

Look for any $I$ in $\{I_1,I_2,I_3, \ldots\}$, where $i_P=T$

For prefix searches P=1, for suffix searches P=n or the last value in the string. For wildcard searches this input is iterative:

Look for any $I_x$ in $\{I_1,I_2,I_3, \ldots\}$, where $i_1=T$ or $I_2=T$ or $I_3=T \ldots$ or $i_n=T$.

RegEx (e.g., position-specific pattern) terms would be an extension of the above where the search engine would be supplied with T values for individual values of P.

The present search engine works on entangled data with no variation in its fundamental components because the entangled data have positional and term components P and T.

For the entangled data defined as items $E=\{E_1, E_2, E_3, \ldots\}$ and Search Term as T. The type of search determines the position element (e.g., the Search Position), such as the prefix (e.g., start), suffix (e.g., end), and wildcard (e.g., anywhere). Assuming the Search Position is P. The search being requested could be written as:

Look for any $I_x$ in $\{I_1,I_2,I_3, \ldots\}$, where $T$ is found in position $P$ within $I$.

However, the requested search for the entangled data would be written as:

Look for any $E_x$ in $\{E_1,E_2,E_3, \ldots\}$, where $T$ is found in position $P$ for the corresponding cleartext data $I$.

Each E consists of a series of characters $e_x=e_1\ e_2\ e_3 \ldots e_m$ with m being different from n in the equivalent cleartext series of characters $i_x=i_1\ i_2\ i_3 \ldots i_n$. The native search engine translates T and P into equivalent constructs that can be applied to E instead of I—the search translation function. The search translation function needs to translate T into $T_e$ and P into $P_e$ so that they can be used on entangled data E. The search translation function would then provide the native search engine with the following:

Look for any $E_x$ in $\{E_1,E_2,E_3, \ldots\}$, where $T_e$ is found in position $P_e$.

Given that n is not equal to m, the cleartext Search Term Twill not be equivalent in length to the translated Search Term $T_e$. Further, given the application of the confusion function, $P_e$ will not have direct positional correlation with the original P. So the search translation function, ES, is similar but not the same as the original entanglement function E(i,k):

$$ES_{i \ldots q}=h(T,k,P)$$

E=f(I,k) and ES=u(E,P). Tis used as the input argument into E, and P is added as an additional argument. This results in ES=h(T,k,P).

The above function yields a variable number, q, of outputs depending on k and P $$ES(T,k,P)=\{T_1P_1,T_2P_2,T_3P_3, \ldots T_qP_q\}, \text{ where } q=f(k,P).$$

$$ES(T,k,P)=\text{The set of all } (T_iP_i) \text{ for } i=1 \text{ to } q.$$

$T_e$ then becomes the set of all $T_i$ and $P_e$ becomes the set of all $P_i$ presented with the corresponding $T_i$.

$$ES=T_e+P_e=\text{The set of all } (T_iP_i) \text{ for } i=1 \text{ to } q.$$

Since n (e.g., the length of the input string I), and m (e.g., the length of the entangled string E) are not equal, the number of values that can be assumed by P for the cleartext string is going to be different from the number of values that can be assumed by $P_e$ for the entangled string E. This is also true of T and $T_e$. Thus, a single T can produce multiple $T_e$.

This provides enough information to the native search engine to do what it usually does for a search without noticing a difference. In cases where q>1, the present system provides the search engine with multiple requests, all of which would facilitate the equivalent of a single search on cleartext data.

Where the original search would be the following:

Look for any $I_x$ in $\{I_1,I_2,I_3, \ldots\}$ where $T$ is found in position $P$ within $I$ The modified instructions would be the following:

Look for any $E_x$ in $\{E_1,E_2,E_3, \ldots\}$ where $t_1$ is found in position $p_1$ or $t_2$ is found in position $p_2$ or $t_3$ is found in position $p_3$ or $t_q$ is found in position $p_q$ within an individual $E$ which is the ordered set $\{e_1,e_2,e_3 \ldots e_m\}$. $m$ is not the same as $q$.

Note that while $p_1$, $p_2$, $p_3 \ldots p_m$ have contiguous subscripts; however, this does not mean that these are contiguous positions on an entangled string. The relation of $p_1$, $p_2$, $p_3 \ldots p_m$ to each other is not static, but a function of k.

In referring top, which represents the positional context of the entangled string relative to the input string, p can be broken down as the ordered set $\{p_1, p_2\ p_3 \ldots p_m\}$, where each $p_x$ conceptually represents the relative position of that specific character relative to its corresponding character in the original string I. Accordingly, I is represented as the ordered set $\{i_1, i_2, i_3, \ldots i_n\}$, and E is represented as the ordered set $\{e_1, e_2, e_3 \ldots e_m\}$, thus $p_x=g(i_x,e_y)$ where $g(i_x,e_y)$ is a function derived from c(i,k) and d(i,k) for the specific $i_x$, and $$p_x=g(i_x,k).$$

And because n is not equal to m, c(i,k) and d(i,k) produces more than one p for every i, and further, each i will result in more than one t.

While the present modified search function ES produces instructions that will be interpreted by the native search engine, the interpretation of results requires additional steps to map the set of resulting $E=\{e_1, e_2, e_3 \ldots e_m\}$ back into cleartext string $I=\{i_1, i_2, i_3, \ldots i_n\}$ using $p_x=g(i_x, k)$ and $t_x=v(i_x,k)$. It is noted that the present data entanglement system utilizes k as an argument in both c(i,k) and d(i,k).

The "untangling" operation, is represented as:

$$I=U(E,k)$$

$$U(E,k)=r(E_s,p,t,k)$$

$$I = U(E, k) = r(e_{s,\ 1-m-}, p_{1-m}, t_{1-m}, k)$$

$$i_{1-n}=h(e_{s,1-m-},p_{1-m},t_{1-m},k) \text{ where for each } p,p_x=g(i_x,k) \text{ and for each } t,t_x=t(i_x,k) \text{ creating a mapping back from } m \text{ into } n.$$

When the native search engine is provided with the following instructions:

Look for any $E_x$ in $\{E_1,E_2,E_3, \ldots\}$ where $t_1$ is found in position $p_1$ or $t_2$ is found in position $p_2$ or $t_3$ is found in position $p_3$ or $t_q$ is found in position $p_q$ within an individual $E$ which is the ordered set$\{e_1,e_2,e_3 \ldots e_m\}$, it returns a set of results which will be in the following entangled form, $R=\{R_1, R_2, R_3, \ldots\}$ where Rx represents one of the individual results. To return the data to the end user in cleartext, each Rx is untangled using U:

$$I_x=U(R_x,k).$$

So, the present data entanglement process outlined so far has the following functions. f(I,k) entangles string I using key k and produces entangled string E. This is in turn comprised of two functions c(I,k) and d(I,k) that confuse and diffuse, respectively. And because the above yields $E=E_b+p+t$, we can derive functional relationships between p, t and I, k via c(I,k) and d(I,k). Further, g(I,k) yields positional context p for input I, and v(I,k) yields term context t for input I. In addition, h(T,k,P) uses key k to translate Search Term T for position P into a set of terms, ES, that can be used by the native search engines. U(R,k) returns cleartext string I from Result R and key k.

E. Attributes of Data Entanglement Functions

Two of the functions discussed above are c(k) and d(I,k) that confuse and diffuse, respectively. The confuse function, c(k), is a function that takes the input string I and confuses it using key k. The confusion function deployed in the present data entanglement system utilizes multi-dimensional spaces uniquely generated from k to produce $E_c$ and p. This means that the present data entanglement system takes one dimensional input—i.e., a series of characters in a string where each character has a position that can be specified by one coordinate—and convert it into multi-dimensional output, where each character in the multi-dimensional output has a position that can no longer be specified by a single coordinate, but instead requires a set of coordinates (i.e., one for each dimension).

If the original input string was I, the ordered set is written as $\{i_1\ i_2\ i_3 \ldots i_n\}$. Once I has passed through c(I,k), it results in a temporary output $\{E_{c1}+p_1, E_{c2}+p_2, E_{c3}+p_3, \ldots E_{cn}+p_n\}$, where each $p_x$ is further made up of dimensional components based on c(I,k). For example, $p_x=(p_{x1}, p_{x2}, p_{x3}, \ldots p_{xw})$, where w is number of dimensions.

In the present data entanglement system, the diffusion function, d(I,k), acts in part independently on the original string, and in part on the output of c(I,k), which is $\{E_{c1}+p_1, E_{c2}+p_2, E_{c3}+p_3, \ldots E_{cn}+p_n\}$. Both aspects can still be stated as a consolidated function d(I,k), where d(I,k) is a function that takes the input string I and diffuses it by using key k, because c(I,k) takes one dimensional input and produces multi-dimensional output. Using the output from c(I,k) as input for diffusion, also produces an multi-dimensional output. Applying d(I,k) turns each $E_c$ into $E_p$+t.

The transformation for the diffusion process utilizes attributes of the key to produce diffusion along each dimension for each character of the input string I. The resulting entangled string, after the application of c(I,k) and d(I,k), contains key-based confusion, as well key-based diffusion, and presents itself with three components in each dimension for relative to a single input character.

As discussed above, $E_c$ and $E_p$ can be represented jointly as $E_b$. So, the input string is transformed as follows:

$$\{E_{b1}+p_1+t_1, E_{b2}+p_2+t_2, E_{b3}+p_3+t_3, \ldots E_{bm}+p_m+t_m\},$$

where m is not equal to n, and m=n*w, with w being the number of dimensions. If the input string is expressed in terms of n, it can be written as:

$$\{E_{b1}+p_{11},p_{12},p_{13},p_{1w}+t_{11},t_{12},t_{13}, \ldots t_{1w},E_{b2}+p_{21},p_{22}, p_{23}, \ldots p_{1w}+t_{21},t_{22},t_{23}, \ldots t_{1w},E_{b3}+p_{31},p_{32}, p_{33}, \ldots p_{3w}+t_{31},t_{32},t_{33}, \ldots t_{3w}, \ldots E_{bn}+p_{n1}, p_{n2},p_{n3}, \ldots p_{nw}+t_{n1},t_{n2},t_{n3}, \ldots t_{nw}\},$$

where w is number of dimensions.

F. Applying Encryption as a Final Step in the Entanglement Process

Once a searchable entangled string is produced using the above method, it can be provided to a search platform for indexing. Indexes are built by fragmenting text strings based on pre-defined searches. For the method described herein, index fragments would be created for the string below:

$$\{E_{b1}+p_{11},p_{12},p_{13},p_{1w}+t_{11},t_{12},t_{13}, \ldots t_{1w},E_{b2}+p_{21},p_{22}, p_{23}, \ldots p_{1w}+t_{21},t_{22},t_{23}, \ldots t_{1w},E_{b3}+p_{31},p_{32}, p_{33}, \ldots p_{3w}+t_{31},t_{32},t_{33}, \ldots t_{3w}, \ldots E_{bn}+p_{n1}, p_{n2},p_{n3}, \ldots p_{nw}+t_{n1},t_{n2},t_{n3}, \ldots t_{nw}\}$$

Subsequently, each fragment would be encrypted using encryption, such as symmetric key encryption, prior to storing it in the native search index. This final step improves the overall security of the searchable entangled string and raises it to encryption standards.

G. Implications for Security

For a randomly generated key with high entropy, the entanglement function E produces an output string with a high degree of unpredictable variability. For example, a cleartext input string of n characters—each of which could take on 256 values if represented by at least a byte—can occur with $256^n$ permutations. The same string, when entangled with a key of length n—each of which can take on 256 values—can occur with $(256^n)^n$ permutations. The impact of going from a single (e.g., one) tow dimensions is substantial because a string of length n, when entangled, becomes a string of length m=n*w. For instance, assuming each character is represented by at least a byte, the total number of possible permutations for the string values can be $(256^{n*w})^n$. Assuming that n=32 and w=3, the number of permutations for an entangled string could be equal to $1.55\times10^{231}$.

Using, for example, the name Jane Ireland, Jane Ireland is a 12-character input string. When entangled using a randomly generated 32-character key with w=3, Jane Ireland is converted by the present system to the following entangled string:

*i$;,,x+&$$i#[#[[-&-i-,[,N,-&+&i,,iN,*

If it is known that w=3, then it may be determined that an entangled string of 36 characters, like the one above, was created from 12 input characters. To guess the first character out of 12, a hacker would need to first select 3 out of the 36 characters when there are 42,840 ways of doing that (nPr). For each of these, they could represent one of 256 characters so the chances of getting the first character right is 1 (one) in 42,840×256, or 1 (one) in 10,967,040.

Once the first character is selected, there are 32,736 ways of selecting the next character, which yields to 8,380,416 possibilities. The number of ways in which the entire string could be constructed would be $3\times10^{70}$. This mean that the chances of guessing the entire string are 1 (one) in $3\times10^{70}$. This number increases if the hacker does not know the value of w or n, which does not need to be the same for the length of string and the length of key.

Comparing this to a simple substitution where each character could be represented by 256 characters, the same string below would be formed from a 36-character original string:

*i$;,,x+&$$i#[#[[-&-i-,[,N,-&+&i,,iN,*

Looking at the string above a hacker would know that there are only 11 unique characters in this string. The first one can represent 256 values, including itself. Once the first one is selected, the second can take 255 and so on. This yields a total of $2\times10^{26}$ tries. Therefore, the odds of guessing the right answer in the second case only increase by $1\times10^{44}$. This means that both have a very low chance of being guessed, so playing the guessing game is out of the question when these entangled strings are encountered without access to any additional information about the input data, key, or underlying transformation algorithm.

Even in the absence of any cleartext equivalents, the presence of a large number of entangled strings, which were entangled using the same key, would lend itself to a specific frequency analysis in which a hacker could determine the extent of commonalities in the input data. However, this is not the same as knowing that a certain character occurred a certain number of times, which is the typical interpretation of frequency analysis. For this to be of value to an attacker, the attacker would have to know the type of input data very well, in addition to understanding positional commonalities in the input data. Comparing to the alternative of storing in cleartext where the odds of compromise are 1 in 1, odds of 1 in $2\times10^{45}$ for cases where no cleartext string input string is known, and 1 in $1.5\times10^{23}$ where one out of two is known, are quite low.

Once the above string is indexed for search, the method calls for each searchable fragment to be further encrypted using symmetric key encryption. However, in the event that search fragments are not required, the entire string would be further encrypted using symmetric key encryption.

In summary, the security-focused conclusions made from this section are the following:

1. Entangled strings by themselves (i.e. with no information about other entangled strings, k, or any corresponding cleartext data) are secure.
2. Applying encryption (e.g., symmetric key encryption) to the entangle strings further improves security.
3. Large numbers of entangled strings that have been entangled using the same key, before applying the final step of encryption, would yield a minimal amount of information about commonalities among them. (This is not a big concern because the odds of predicting two 10-character long input strings with 20% overlap is at 1 in $2\times10^{45}$. When compared to the 1 in 1 odds of knowing input string that is stored in cleartext, even before applying the final step of encryption, one would be compelled to choose the present data entanglement system over storing sensitive data in cleartext in enterprise search applications). However, once the symmetric key encryption is applied to the search index fragments, a security level matching the security level of encrypted data is achieved.

4. Large numbers of input data with corresponding entangled strings that have been entangled using the same key would be a concerning scenario. Although this scenario is better than providing data in cleartext, the present system prevents this from happening.

According to some embodiments, the present data entanglement system has four components:

1. Key-based obfuscation via E(I,k) as described above.
2. Application of symmetric key encryption to all searchable string fragments as a final step in the entanglement process.
3. Data distribution to limit the amount of data accessible on a single node.
4. Field-level key application to limit the amount of entangled data that can be entangled with a single key.
5. Segregation of Duties to ensure that unless an individual is a highly trusted insider, the same individual cannot access cleartext data along with its corresponding entangled strings. This would avoid scenario #3 above.

II. Numerical Entanglement for Numbers and IP Addresses/Numerical Search

For numerical entanglement and IP address entanglement, IP addresses are first converted to numbers and then transformed. Although IP addresses are discussed below, the same process applies to numbers.

Entangled IP addresses support the following types of searches:

1. Exact Match.
2. Range (starting IP and ending IP).
3. Classless Inter-Domain Routing (CIDR).
4. List.

A. Entanglement for IP Addresses

The present system represents IP Addresses with integers. According to one embodiment, entangled IP addresses are stored as integers that are twice the size of the original IP address. For example, IPV4 dresses are represented as 32-bit integers while entangled IPV4 addresses are stored as 64-bit integers.

To obfuscate (entangle) IP addresses, the present system maps the set of possible original IP addresses into a much larger space and assigns to each one a band. The present system picks a random number in the assigned band to represent a single original IP address. Specifically, the present system performs the following conversion/entanglement process when the input is an Entanglement Key (e.g., a strong cryptographic key) and the original cleartext IP address:

1. Convert the IP address to an integer (O).
2. Use the key to select a number towards the beginning of the range (S) from 0 to the maximum integer that can be represented by double the size of the original IP address (e.g., in the case of an IPV4, the total range would be between 0 and approximately 9.5 billion).
3. Use the key to select a number towards the end of the above range (E).
4. Subtract the first selection from the second and divide by a number larger than the total number of IP addresses in the given category to arrive at the gap (e.g., for IPV4 the gap would be G=(E−S)/4,294,967,299 (divisor has to be greater than 4,294,967,295)).
5. Compute the Upper Bound, UB=S+G+O*G.
6. Compute the Lower Bound, LB=UB−G+2.
7. Compute the Entangled Value, T=RANDBETWEEN (LB, UB).
8. Apply the Knuth-Fisher-Yates (KFY) algorithm to shuffle for display purposes as follows:

Derive a seed from the key to seed the KFY routine.

Pick the maximum possible entangled number to be such that the unshuffled string will always be a max of 62 bits (out of the 64 available bits).

Apply KFY to the binary string.

Add to the shuffle string a leading bit equal to 1.

Convert the binary string to decimal. This is the final shuffled value that would be displayed.

The present system generates a randomly selected entangled value T between a key determined upper and lower bound. This entangled value will be stored as a 64-bit integer.

If the process is applied in reverse, the original IP Address is recovered.

According to some embodiments, a similar process, like the one described above, can be applied to IPV6 and to numbers.

Example for IPV4 Equal to 192.168.10.10:

If the beginning of the range S is $9\times10^{8}$ and the end of the range E is $6\times10^{18}$, then the gap G is equal to 1,396,983,862. Consequently, the upper bound UB is 4,515,384,450,897,540,000 and the lower bound LB is 4,515,384,452,294,520,000.

The entangled value T would be randomly selected between LB and UB, for example T could be equal to 4,515,384,451,894,610,000.

B. Search for IPV4

A method for searching IPV4 addresses in terms of an exact match, a prefix search, a range search, and a CIDR search is provided below.

Exact Match Search

In the case of an exact match, the present system: (i) tangles the original IP address, (ii) calculates the LB and the UB, and (iii) constructs a range search using the LB and UB together in a concatenated string. In this sense, an exact match search is converted to an range search. For example, performing an exact search for 192.168.10.10 means that a range is selected between 4,515,384,452,294,520,000 and 4,515,384,450,897,540,000, and any number within that range (e.g., 515,384,451,894,610,000) will in turn untangle to 192.168.10.10.

Prefix Search

In the case of a prefix search, the present system: (i) completes the prefix with trailing zeros to construct a whole IP address, and (ii) looks for all values greater than the LB for that address and less than 255 for those trailing prefixes. For example, a prefix search for all addresses starting with 192.168, becomes a range search between 192.168.0.0 and 192.168.255.255. Subsequently, LB is selected as the low end of the range and UB is selected as the high end of the range. For example, LB for 192.168.0.0 equals to 4,515,380,860,649,010,000 and UB for 192.168.255.255 equals to 4,515,472,411,860,570,000. The search will look for all values that are between 4,515,380,860,649,010,000 and 4,515,472,411,860,570,000.

Range Search

In the case of a range search, the present system searches from a LB of lower range segments to an UB of upper range segments. For example, assuming that a starting IP is equal to 192.168.200.195 and an ending IP is equal to 192.255.255.100. For the starting IP 192.168.200.195, LB is equal to 4,515,452,657,237,620,000 and UB is equal to 4,515,452,658,634,600,000. Accordingly, for the ending IP 192:255:255:100, the LB is equal to 4,523,437,281,948,210,000 and the UB is equal to 4,523,437,283,345,200,000. Thus the Range search query is between 4,515,452,657,237,620,000 and 4,523,437,283,345,200,000.

CIDR Search

According to some embodiments, the present system supports all CIDR searches, not just full subnet search. The method includes: (i) identify mask m (e.g., the subnet mask), (ii) use an existing library to identify the upper and lower bounds for CIDR search (e.g., an online calculator can be found at https://www.ipaddressguide.com/cidr), and (iii) look for all addresses greater than the lower bound.

For example, assume a CIDR equal to 192.168.0.0/16. This means that the first 16 bits are specified in the address and the rest of the bits cover the range of all addressed that should be returned. Thus, m is equal to 16 and the required range is between 192.168.0.0 and 192.168.255.255. Hence, the lower bound LB for 192.168.0.0 is 4,515,380,860,649,010,000 and the upper bound UB for 192.168.255.255 is 4,515,472,411,860,570,000. Accordingly, the search will look for all the addresses between 4,515,380,860,649,010,000 and 4,515,472,411,860,570,000.

In another example, and for a CIDR 192.168.255.0/22, m is equal to 22 and the required range is between 192.168.252.0 and 192.168.255.255. Hence, the lower bound LB for 192.168.252.0 is 4,515,470,981,474,940,000 and the upper bound UB for 192.168.255.255 is 4,515,472,411,860,570,000. Accordingly, the search will look for all the addresses between 4,515,470,981,474,940,000 and 4,515,472,411,860,570,000.

List

According to some embodiments, a list search should be implemented as a set of exact match searches described above.

C. Sort for IPV4

For an IPV4 address, the unshuffled entangled 64-bit integer is sortable as it is. An IPV6 address is handled similar to an IPV4 address, but with larger integers. For IPV6, a single address may be handled as two integers. IPV6 searches are described below:

D. Search for IPV6

Exact Match

In the case of the exact match, the present system: (i) tangles the original IP address and store as two segments T1 and T2, (ii) calculates LB and UB for each segment (e.g., calculate pairs LBT1, UBT1 and LBT2, UBT2), and (iii) search in T1 as range between LBT1 and UBT1 and in T2 as range between LBT2 and UBT2.

Range Search

In the case of a range search, the present system: (i) tangles the starting IP as segments T1S and T2S, and the ending IP as segments T1E and T2E; (ii) and calculates an LB and UB for each—e.g., LST1 LST2 UST1 UST2 and LET1 LET2 UET1 UET2. According to some embodiments, the Query terms are based on the following table if both ends of the range are included:

| Segment | T1 | T2 |
|---|---|---|
| Path 1 | >LST1 and <UST1 | >LST2 and <UST2 |
| Path 2 | >LST1 and <UST1 | >LST2 |
| Path 3 | >LST1 and <UET1 | |
| Path 4 | >LET1 and <UET1 | <UET2 |
| Path 5 | >LET1 and <UET1 | >LET2 and <UET2 |

An example for an LB equal to 2001:0db8:85a3:0000:0000:8a2e:0370:7331 and an UB equal to 2001:0db8:85a3:0000:0000:8a2e:0370:7334 is provided below.

For segment 2001:0db8:85a3:0000

1. 43068149563280091589579701555796508666 is LST1
2. 43068149563280091585659768440133228950 is UST1

For segment 0000:8a2e: 0370:7331

1. 34028832248436946747361798113899355826 is LST2
2. 34028832248436946743441864998236076110 is UST2

For segment 2001:0db8:85a3:0000

1. 43068149563280091589579701555796508666 is LET1
2. 43068149563280091585659768440133228950 is UET1

For segment 0000:8a2e: 0370:7334

1. 34028832248436946747361798113899355826 is LET2
2. 34028832248436946743441864998236076110 is UET2

CIDR Search

According to some embodiments, the CIDR search includes the following operations:

1. identify mask m; and
2. divide m by 64 to identify segments partially covered by the mask.
3. In the event that the mask is in the leading segment T1, the search will be limited to just T1 as follows:
   i. complete the trailing bits in T1 with zeros, convert to an integer and tangle, and calculate the LB of the entangled value to obtain the lower end of the range;
   ii. complete the trailing bits in T1 with 1s, convert to an integer and tangle, and calculate the UB of the entangled value to obtain the upper end of the range; and
   iii. search on T1 between the above the calculated LB and UB.
4. In the event that the mask is in the trailing segment T2, the search will be across both T1 and T2 as follows:
   i. With regard to T1: convert the provided 64 bits to an integer, tangle, obtain LB and UB, and use that to search in the T1 field.
   ii. With regard to T2: complete the trailing bits in T2 with zeros, convert to an integer and tangle; and take the LB of the entangled value to get the lower end of the range.
   iii. Complete the trailing bits in T2 with 1s, convert to an integer and tangle, and take the UB of the entangled value to get the upper end of the range.
   iv. Search T2 between the above calculated LB and UB.

Thus, the overall query becomes T1 range and T2 range.

E. Sort for IPV6

For an IPV6 address, the present system uses the following sorting process according to some embodiments: takes the two unshuffled 128-bit entangled ints, concatenates them together and stores them as a string. Finally, performs an alphanumeric sort on the concatenated string above by IPV6 field. These are stored as string because 256 bits are expensive to handle as numbers.

III. Generating Format Preserving (FP) Tokens and Retrieval

This process utilizes spaces very similar to the text entangled process described above. While text entanglement requires the creation of one space, the present tokenization process requires the creation of two distinct spaces. The present system creates these from derived keys based on the entanglement key—e.g., similar to the key used above. In other words, this process uses two cryptographic spaces together to produce, without an additional input, a large number of cipher texts for one given input plaintext and one given key, without an additional input, and having. As a result, each ciphertext resolves back to the original text.

By way of example and not limitation, in the present system, a space may be represented by a cube having faces F1 through F6, where each face includes rows R1 through R3 and columns C1 through C3 as shown in table I below. The initialized cube, shown in table I below, represents the original space from which the data originate, and the two shuffled cubes, as represented by subsequent tables II and III, correspond to two new spaces different from the original. However, the process is not limited to spaces represented by cubes. For example, arrays, tesseracts, or other geometric constructions may be used to represent a space.

The following example illustrates the method, according to some embodiments. In this example, the original text is arti, and the first derived key is 12ty and the second derived key is 156t. Further the initialized cube includes values: 1 2 3 4 5 6 7 8 9 0 a b c d e f g h i j k l m n o p q r s t u v w x y z A B C D E F G H S J K L M N O P Q R, distributed as shown in Table I below.

TABLE I

| Initialized cube | | | | | | | | | | | | | | | | | | |
|---|---|---|---|---|---|---|---|---|---|---|---|---|---|---|---|---|---|---|
| | F1 | | | F2 | | | F3 | | | F4 | | | F5 | | | F6 | | |
| | C1 | C2 | C3 | C1 | C2 | C3 | C1 | C2 | C3 | C1 | C2 | C3 | C1 | C2 | C3 | C1 | C2 | C3 |
| R1 | 1 | 2 | 3 | 0 | a | b | i | j | k | R | s | t | A | B | C | J | K | L |
| R2 | 4 | 5 | 6 | c | d | e | l | m | n | U | v | w | D | E | F | M | N | O |
| R3 | 7 | 8 | 9 | f | g | h | o | p | q | X | y | z | G | H | S | P | Q | R |

Shuffled cube 1 includes the values: t 8 o 1 D v a k h q Q 5 J 2 c f F K 3 R e 4 O x 0 L u P y M s m 9 b n i z w g I N G p j H A 7 1 B 6 C r d E, distributed as shown in Table II below.

TABLE II

| Shuffled cube 1 | | | | | | | | | | | | | | | | | | |
|---|---|---|---|---|---|---|---|---|---|---|---|---|---|---|---|---|---|---|
| | F1 | | | F2 | | | F3 | | | F4 | | | F5 | | | F6 | | |
| | C1 | C2 | C3 | C1 | C2 | C3 | C1 | C2 | C3 | C1 | C2 | C3 | C1 | C2 | C3 | C1 | C2 | C3 |
| R1 | t | 8 | o | q | Q | 5 | 3 | R | e | P | y | M | z | w | g | A | 7 | S |
| R2 | 1 | D | v | J | 2 | c | 4 | O | x | S | m | 9 | I | N | G | B | 6 | C |
| R3 | a | k | h | f | F | K | 0 | L | u | B | n | i | p | j | H | r | d | E |

Shuffled cube 2 includes the values: d e 9 R F w N 4 Q J a c H 1 L 1 S f x r t i v 5 B 8 C A K j E G 3 2 n O 6 k D o P q M u 7 m b z h 0 y g p s, distributed as shown in Table III below.

TABLE III

| Shuffled cube 2 | | | | | | | | | | | | | | | | | | |
|---|---|---|---|---|---|---|---|---|---|---|---|---|---|---|---|---|---|---|
| | F1 | | | F2 | | | F3 | | | F4 | | | F5 | | | F6 | | |
| | C1 | C2 | C3 | C1 | C2 | C3 | C1 | C2 | C3 | C1 | C2 | C3 | C1 | C2 | C3 | C1 | C2 | C3 |
| R1 | d | e | 9 | J | a | c | x | r | t | A | K | j | 6 | k | D | m | b | z |
| R2 | R | F | w | H | I | L | i | v | 5 | E | G | 3 | o | P | q | h | 0 | y |
| R3 | N | 4 | Q | 1 | S | f | B | 8 | C | 2 | n | O | M | u | 7 | g | p | s |

The present method can be applied to strings of any length, but will operate in chunks of 1024 characters at a time. The following steps or operations apply to a single chunk of up to 1024 characters. The present method is not limited to operations provided. Rather, the operations used illustrate the present method performed by the system.

According to some embodiments, the operations performed by the system include:

1. Select the first character of the original chunk.
2. Locate the coordinates of the first character of the original text on the first cube (e.g., cube 1).
3. Use the coordinates of the first character on the first cube to identify a corresponding character ("resulting character") on the second cube that has matching coordinates to the first character on the first cube. The resulting character on the second cube becomes the first character in the FP token. This step is called a "Hop".
4. Identify the coordinates of the first character in the FP token on the first cube.
5. Add the coordinates identified on the first cube from the first character in the FP token (e.g., the coordinated from the previous step) to form a number, n1. For example, if the coordinates are 1, 3, 1, n1 is equal to 5. Alternatively, the coordinates can be concatenated—e.g., n1 is equal to 131.
6. Identify the coordinates of the last character from the input text on the first cube and apply the identified coordinates (from the first cube) on the second cube to identify a corresponding character on the second cube. Subsequently, identify the coordinates of the new corresponding character on the second cube and use them to identify a new character back on the first cube. This is defined as one full hop. Repeat the hop between the first and second cubes n1 times. The resulting character is the second character in FP token.
7. Identify the coordinates of the second character in FP token on the first cube and add (or concatenate) coordinates to a number, n2.
8. Repeat step 5 for the second character using n2 hops.

It is noted that the present method goes back and forth between the front and back characters of the original chunk until all the characters are exhausted so that similar prefixes do not result in similar tokens. Subsequently, the present system continues to:

9. identify the coordinates of the resulting character from the n2 hops on cube 1. Add them and find n3 and use n3 to transform the second to last character and so on.
10. Repeat until the whole string is transformed into an FP token string.

If alphanumeric attributes need to be preserved, the present system uses character cubes to transform characters and number cubes to transform numbers.

An example is provided below for the original string arti:

1. The coordinates of character "a" on cube 1 are 1, 3, 1
2. The character corresponding to the coordinates 1, 3, 1 on cube 2 is character "N"
3. Therefore, the first character of the FP token is "N".
4. The coordinates for character "N" (e.g., the first character of the FP token) on cube 1 are 5, 2, 2. Therefore, n1 is equal to 5+2+2=9.
5. The coordinates for the last character, "i", on cube 1 are 6, 3, 1.
6. After hopping n1=9 times, the final character on cube 2 is "w" as shown in the table below.

| Character | i |
|---|---|
| Hop 1a | 433 |
| Hop 1b | O |
| Hop 2a | 322 |
| Hop 2b | v |
| Hop 3a | 123 |
| Hop 3b | W |
| Hop 4a | 512 |
| Hop 4b | k |
| Hop 5a | 132 |
| Hop 5b | 4 |
| Hop 6a | 321 |
| Hop 6b | i |
| Hop 7a | 433 |
| Hop 7b | O |
| Hop 8a | 322 |
| Hop 8b | v |
| Hop 9a | 123 |
| Hop 9b | w |

In the table above, notation "a" corresponds to the a first "portion" of a hop from the first cube to the second cube, and notation "b" correspond to the a second "portion" of the hop from the second cube back to the first cube.

7. Therefore, the last character of the FP token is "w"
8. The coordinates for character "w" on cube 1 are 5, 1, 2, and therefore, n2 is equal to 5+1+2=8
9. The present system uses 8 to transform the second character of the original string, which is "r".
10. The coordinates for the second character "r" of the original string on cube 1 are 6, 3, 1
11. After hopping 8 times, the final character for "r" on cube 2 is "I" as shown in the table below.

| Character | r |
|---|---|
| Hop 1a | 631 |
| Hop 1b | g |
| Hop 2a | 513 |
| Hop 2b | D |
| Hop 3a | 122 |
| Hop 3b | F |
| Hop 4a | 232 |
| Hop 4b | S |
| Hop 5a | 533 |
| Hop 5b | 7 |
| Hop 6a | 612 |
| Hop 6b | b |
| Hop 7a | 431 |
| Hop 7b | 2 |
| Hop 8a | 222 |
| Hop 8b | I |

12. Therefore, the second character of the FP token is "I".
13. The coordinates for character "I" on cube 1 are 5, 2, 1, and therefore, n3 is equal to 5+2+1=8.
14. The present system uses n3=8 to transform the second last character of the original string, "t".
15. The coordinates for the second last character of the original string "t" on cube 1 are 4, 3, 3.
16. After hopping n3=8 times, the final character corresponding to "t" on cube 2 is "H" as shown in the table below.

| Character | t |
|---|---|
| Hop 1a | 111 |
| Hop 1b | d |
| Hop 2a | 632 |

-continued

| Character | t |
|---|---|
| Hop 2b | P |
| Hop 3a | 411 |
| Hop 3b | A |
| Hop 4a | 611 |
| Hop 4b | m |
| Hop 5a | 422 |
| Hop 5b | G |
| Hop 6a | 323 |
| Hop 6b | 5 |
| Hop 7a | 213 |
| Hop 7b | c |
| Hop 8a | 221 |
| Hop 8b | H |

17. Therefore, the second last character of the FP token is "H".

Consequently, the FP token for the original string arti becomes NIHw

According to some embodiments, a reverse process may be used to transform the FP token back to the original cleartext string. The process is described as follows.

1. Starting with the left most character "N" of the token, identify the coordinates for character "N" on cube 2. In this case, the coordinates are 1, 3, 1.
2. On cube 1, find the character that corresponds to coordinates 1, 3, 1, which in this case, is character "a". This is the first character of the original string.
3. Identify the coordinates for character "N" on cube 1. In this case the coordinates are 5, 2, 2, which correspond to n1 equal to 5+2+2=9.
4. Taking the last character of the token "w", identify its coordinates on cube 2.
5. Hop back and forth between cube 2 and cube 1 n1=9 times. The last character identified belongs to cube 1 and is character "i". This is the last character of the original string.
6. Identify the coordinates of character "w" on cube 1, which in this case are 5, 1, 2, and corresponds to n2 equal to 5+1+2=8.
7. Take the second token character "I" and locate it on cube 2.
8. Hop back and forth between cube 2 and cube 1, n2=8 times. The last character to be identified belongs to cube 1 and is character "r". This is the second character of the original string.
9. Identify the coordinates for the second token character "I" on cube 1, which in this case are 5, 2, 1, and correspond to n3 equal to 5+2+1=8.
10. Take the second last token character "H" and locate it on cube 2.
11. Hop back and forth between cube 2 and cube 1 n3=8 times. The last character to be identified belongs to cube 1 and is character "t", which is the second from last character of the original string.

As discussed above, to calculate the number of hops, the coordinates can be concatenated rather than added. Therefore, coordinates 1, 3, 1 would correspond to 131 hops.

IV. Software Platforms

A. Background

Data at rest are typically secured by injecting encryption in three places: (i) encryption at the level of block storage or file system level encryption, (ii) encryption by the storage service, and (iii) encryption by the application that creates/consumes the data.

Encrypting the storage medium prevents data from being compromised at the physical level—e.g., when the storage device is at risk of being stolen, such as in a case where an intruder gains access to the physical facility that hosts the data. However, in modern data centers and cloud storage services, the physical location of data is very hard to pinpoint and hence this sort of attack is not the most anticipated threat. This form of encryption does not prevent data from being breached if the intruder has logical access to the file system. For example, system administrators or information technology (IT) staff who installs software components on the host machines may access the data in plain text. Encrypting at file system level adds protection; however, some file system users may need access to clear text in order to process the data. For example, a user from a datastore service may need to read data in cleartext.

The second kind of encryption is one where there is a dedicated storage application that does the reading and writing from disk. Most online transaction processing (OLTP) applications and many analytical applications use a database to manage data storage. Typically this is a relational database (RDBMS) or non-relational stores database (NOSQL). All databases offer some form of encryption to secure a column of data or even specific rows of data if it matches certain criteria. This prevents the system administrators from gaining access to sensitive data.

The third kind is where the application which generates and consumes the data, encrypts and decrypts the data before sending them to the database. This adds another layer of data security that renders the data inaccessible even by system and database administrators. This form of encryption is computationally expensive and not all application vendors support this. However, large enterprises demand this type of encryption from their vendors.

All the above encryption approaches are useful in OLTP use cases. However, when the data must be analyzed, sliced and diced before any insights can be gained from them, the above encryption-based approaches are not helpful. This type of activity, often called analytics, requires data to be queried in flexible ways such as wildcard searches, fuzzy matches, range search and the like. In addition, the search results must be sortable and support aggregations. This entire class of activity is not served well by encryption because encryption prevents what software-based applications attempt to do. Therefore, most of the analytical stores (Enterprise data lakes, Elasticsearch indices, etc.) retain data in plain text. And this often poses a substantial risk to all organizations.

The present system provides a new approach to securing the data without using the above listed simple encryption approaches. The present system secures data while allowing them to be searched and analyzed without the penalty posed by simple encryption.

B. Present System & Method

According to some embodiments, and to support big data analytics, the present system secures data used a two-prong approach.

First, the present system fills the void between encryption (where very little analytics is possible) and plain text (which is entirely analyzable, but offers no security) to create a continuum. The present system allows a customer to balance security, performance and searchability/analyzability. In other words, if a customer wants range searches or wildcard search or regular expression pattern matching, the present system supports it. Whereas if a customer is happy with prefix search or term/phrase match searches having higher levels of security, the present system provides it. Regardless of the tradeoffs, the process is computationally efficient in order to be employed at scale.

Second, the present system provides flexibility in form factor. Unlike traditional OLTP applications where architecture standards such as client-server, three tier, microservices, etc. prevail, the big data analytics space is both evolving and diverse. There are several categories of solutions at play: Cheap storage (HDFS, S3, Azure blob), massively scalable NOSQL databases (Mongo, Cassandra, Redis, Riak), data warehouses (Snowflake, Redshift) distributed computation frameworks (Hadoop, Map reduce, Spark, Flink), search solutions (Lucene, SolR, ElasticSearch), visualization solutions (Tableau, PowerBI, Quicksight), to name a few. A typical organization may choose one or more of these to develop their analytical capabilities. The present system may provide its services in multiple form factors to make its consumption easy without delay or disruption.

Additionally, the present system allows the secure data format(s) to become established as the de-facto secured formats in an organization. In this modality, all sensitive data are secured as soon as they enter an organization, making it easy to share the data without worrying about breaches. In addition, all systems that must access the data would be granted the right set of privileges to consume, search, and analyze the secured data which are not in the form of plain text anywhere.

C. Elasticsearch

Elasticsearch is one of the most popular search engines that was written on top of Lucene. Elasticsearch's wide adoption is also quite diverse. Organizations, large and small use it for general purpose search analytics, as the primary backend storage for applications, as a search module in OLTP solutions, etc. Elasticsearch offers a flexible plugin based extension framework for third parties to augment its behavior. The present system may be used for Elasticsearch to allow customers to deploy, test, and roll out the solution quickly without getting into a multi-week configuration exercise.

According to one embodiment, the present system provides an Elasticsearch plugin. A plugin is a small piece of a program that runs within the host application. Delivering it in this form reduces the effort required to introduce the solution. Neither the client application (the one generating queries), nor the storage service (i.e., Elasticsearch) needs to be modified. The present plugin is installed on all Elasticsearch nodes. After installing the plugin the customer uses the present system per the following steps: (i) create a new ingest pipeline, (ii) start with a new index with mappings (akin to schema) that utilizes the present secure data types described below; and point the data pipelines to the new index instead of the old ones.

There are a number of advantages in delivering it in this form. First, Elasticsearch offers a broader degree of freedom for plugins. Plugins can not only modify the inputs but also influence the search behavior.

Second, customers can quickly install, try, evaluate and purchase these compared to traditional enterprise applications. This approach allows both the vendor and customer to be agile.

Third, since the Elasticsearch plugin runs within the Elasticsearch application process, customers do not have to procure separate hardware to host the application.

Finally, it is not uncommon for Elasticsearch to be running on 100 s to 1,000 s of nodes. A plugin that runs on that many nodes is not only resilient, but it can also perform a lot of computations in-parallel. In other words, an Elasticsearch plugin instantaneously gets a distributed computing footprint.

The present plugin exploits the constructs of Elasticsearch to deliver a set of custom data types that are secure with various degrees of searchability.

D. Secure Data Types

The plugin delivers a secure alternative to most Elasticsearch's native data types such as Keyword, Test, IP, Number, Date, and the like. If a customer finds certain data, such as a date field in an index to be sensitive (e.g. the date of birth), they can choose to use the present system's version of date tangled_date data type instead of elasticsearch's native date data type.

Additionally the plugin also offers varying levels of security including tangled, masked, format preserving equivalent, and redacted.

E. Securing the Source Document

Each Elasticsearch index consists of a collection of source documents and each source document consists of a set of fields. The source document is the most visible part of Elasticsearch index. When Elasticsearch returns search results, it returns a set of source documents. The entire source document is the default response unless the enterprise specifically chooses a subset of select fields from it.

When a field is secured through the present plugin, it intercepts the ingest process and prevents the raw plain text data from being stored in the document. Rather it tangles the data upfront even before Elastic persists the data. Therefore, the plugin ensures that the document never exposes the sensitive data in plain text in the fields it secures. Further the plugin also chooses the most secure form of the tangled text, referred to as "shuffled tangled text", to store in the source document.

Later, when a client searches for data, the plugin intercepts the Search Term and converts the Search Term to tangled form and hands it over to Elasticsearch, and lets Elasticsearch carry out the search. Subsequently, when results are sent back, if the client is authorized, the plugin translates back the results to plain text. In some cases, the plugin also changes the search logic to accelerate search performance for encrypted index. For example, in order to perform wildcard search, the plugin also stores additional tangled and encrypted fragments and conducts prefix searches on the fragments.

F. Client Authorization

As stated above, the plugin will only respond to authorized clients. In order to support this, the plugin can verify the client using a number of mechanisms such as bearer token, a certificate, etc. This way enterprises can make sure that the sensitive data do not reach the hands of those that should not have access to it.

G. Tangled Keyword Types, Searches and Additional Fields

Tangled data types are the most helpful with analytical tasks. Tangled data type support most of the searches, sorts, and aggregations without significant overhead in performance. By way of example and not limitation, tangled IP supports term search (e.g., exact match and CIDR) and range search; tangled text supports match, match prefix, and match phrase prefix searches; tangled keyword supports term and prefix search; and tangled tiny keyword (up to 32 characters) supports wildcard searches.

H. Prefix Search

To support prefix search, the plugin stores the forward tangled value as a hidden field outside of the source document.

I. Suffix Search

To support suffix search, which in Elasticsearch corresponds to wildcard searches with an asterisk at the beginning, the plugin stores the reverse tangled value as a hidden field outside of the source document. Any suffix search request is then catered by doing a prefix search query on this field.

J. Wildcard Search

To support wildcard search, the plugin breaks down the forward tangled field into multiple fragments and encrypts and stores the individual fragments in specific pre-provisioned fields. Later, when a client requests a wildcard query, the plugin (using the engine) generates a set of search patterns that translates the wildcard search into a boolean prefix queries. This makes the wildcard search on a tangled keyword field faster compared to wildcard search on a regular keyword field. The method employed here is provided via the following example.

Assuming that the clear text input to be stored and indexed is RAINBOW, the outputs produced with the initial preprocessing using the cube can be represented as follows:

R in first position=R1,
A in second position=A2,
I in third position=I3,
N in fourth position=N4
B in fifth=B5
O in sixth=O6
W in seventh=W7

Therefore, the string becomes R1A2I3N4B5O6W7. Later, the product computes the following unigram values R1, A2, I3, N4, B5, O6, W7

Subsequently, the product encrypts and adds them to a position referenced index.

a. Position 1: E(R1),
b. Position 2: E(A2),
c. Position 3: E(I3),
d. Position 4: E(N4),
e. Position 5: E(B5),
f. Position 6: E(O6),
g. Position 7: E(W7)

Where encryption is denoted by the function E.

Assuming that a wild card search is requested with input *NBO*—i.e., find all stored terms that contain the string "NBO", the product produces and executes the following search terms:

h. {Position 1=E(N1) AND Position 2=E(B2) AND Position 3=E(O3)} OR
i. {Position 2=E(N2) AND Position 3=E(B3) AND Position 4=E(O4)} OR
j. {Position 3=E(N3) AND Position 4=E(B4) AND Position 5=E(O5)} OR
k. {Position 4=E(N4) AND Position 5=E(B5) AND Position 6=E(O6)} OR
l. {Position 5=E(N5) AND Position 6=E(B6) AND Position 7=E(O7)} OR and so on until a preset limit. Because input strings can be very long, an explicit limit can be set to define how many characters from the beginning of the wild card search needs to be supported. The limit will determine how many fragments will be computed and stored.

In the example above, criteria k (italicized and bold) would match, and therefore, the original string would be a match for the search term.

Even with obfuscation and encryption, unigrams are not adequate from a security standpoint. And because unigrams are only required if a single character wildcard is required—e.g., when the wildcard search has the form 'find all terms that contain the letter W'—the product favors improved security over single character wildcard search. In some embodiments, this behavior can be set at varying granularity and not as a system-wide setting. For example, it can be set at collection or index level, or at field level.

In some embodiments, the improved security alternative is achieved by storing encrypted bigrams and trigrams and conducting a different search algorithm. Examples of bigrams and trigrams are shown below.

Bigrams (based on original length):

i. Position 1: E(R1A2),
ii. Position 2: E(A2I3),
iii. Position 3: E(I3N4),
iv. Position 4: E(N4B5),
v. Position 5: E(B5O6) and
vi. Position 6: E(O6W7)

Trigrams (based on original length):

i. Position 1: E(R1A2I3),
ii. Position 2: E(A2I3N4),
iii. Position 3: E(I3N4B5),
iv. Position 4: E(N4B5O6) and
v. Position 5: E(B5O6W7)

If the length of the search term is two character long, then all searches could be done in just within the bigram index entries. For example, if the search term is 'NB'. The search can be executed as:

vi. Position 1 bigram=E(N1B2) OR
vii. Position 2 bigram=E(N2B3) OR
viii. Position 3 bigram=E(N3B4) OR
ix. Position 4 bigram=E(N4B5) OR
x. Position 5 bigram=E(N5B6) OR
xi. Position 6 bigram=E(N6B7) OR
xii. And so on till a preset limit With the above search, criteria ix (italicized and bold) would provide a match and the entry would be a search hit. If the search term is exactly three character long a similar search may be done exclusively with trigram indices.

When the search term is longer than three characters, the search term is partitioned into three and two characters. Since three and two are the smallest primes, all lengths greater than three can be expressed as a sum of these two prime numbers (e.g., 2 and 3). For example, a search term with 5 characters can be expressed as 3 and 2, a search term with 6 characters can be expressed as 3 and 3, a search term with 7 characters can be expressed as 3, 2, and 2, and so on.

For example, assuming the search term is "AINBO". This will be split in to two independent searches for AIN and BO appearing in succession. In some embodiments, these searches can be performed in parallel further speeding up the query execution. For example:

i. {E(A1I2N3) in first trigram and E(B4O5) in fourth bigram} OR
ii. {E(A2I3N4) in second trigram and E(B5O6) in fifth bigram}
iii. {E(A3I4N5) in third trigram and E(B6O7) in sixth bigram} and so on. In the case above, criteria iii (italicized and bold) would provide a match and the entry would be a search hit.

In cases of longer n-grams, the process breaks down long search terms into shorter prime-length n-grams and conducts separate searches in the positioned n-gram indices. The process is accelerated if longer prime-length n-grams are used, such as 5-grams, 7-grams, etc. According to some embodiments, these are choices customers can make based on their use cases. If a customer expects longer search terms based on previous observed behavior, they could option to store 5-grams, 7-grams, 11-grams, etc.

Even number n-gram may also be used, but prime factorization results to improved pre-processing, storage, and compute optimization. Thus, the search algorithm is able to execute full featured wild card searches on fully encrypted indices.

K. Tangled IP, Number and Dates

Securing IP, Number, and Dates in a searchable manner introduces a general challenge because these data types employ a small subset of characters from the 100 s of 1000 s of characters in Unicode specs. With such a small diversity in characters, it is challenging to produce secure equivalents that are searchable, sortable, and aggregable without compromising the original values.

L. Using Entanglement within Tokenized Text Fields

While ingesting paragraphs of text, the present system splits paragraphs in to words based on common delimiters or other similar criteria, and performs prefix, suffix, or term searches on individual tokens. In addition to the above, the present system performs the following:

1. Instructs the text tangling engine to exclude certain character classes from the 13 characters used to represent entangled data. These character classes contain the characters that Elasticsearch (ES) uses in tokenization as separators.
2. Creates a new field type "Tangled_Text".
3. Ingests the cleartext string.
4. Identifies all segments that do not have excluded characters, and sends the identified segments to the engine to be tangled.
5. Reassembles the string by leaving the special characters in their original position and by replacing the rest of the segments with their tangled counterparts.
6. Creates a reverse string where each tangled segment uses the reverse tangled output from the engine. The string is actually a forward string, however, each segment will have the reverse tangled string in place of the forward tangled string.

An example is provided below for cleartext Arti is amazing with Arti, is, and amazing being the segments to be tangled. The tangled output for each segment would be as follows:

a. For segment Arti, forward is fghgytujkhgd, and reverse is ghjdfagfhjkjh.
b. For segment is, forward is ghfjhk, and reverse is hgjkjh.
c. For segment amazing, forward is asdfdgshgfdhjhgddgsh, and reverse is kjhggdhsjfgsdagfhfjag.

Consequently, the following strings are sent to the search engine (Elasticsearch, Opensearch, etc.) for indexing: fghgytujkhgd ghfjhk asdfdgshgfdhjhgddgsh for prefix search, and ghjdfagfhjkjh hgjkjh kjhggdhsjfgsdagfhfjag for suffix search.

Subsequently, the search engine is instructed to process each of the above strings and utilize native match queries on tokenized values. In some embodiments, the forward tokenized string is used for the prefix and term search while the reverse tokenized string is used for the suffix search.

M. Other Form Factors and Modes of Use

Standalone Service

In order to be integrated into the data pipelines, the present system may also be implemented as a highly distributed and horizontally scalable service on a customer's on-prem environment and cloud accounts. By doing so, the present methods and processes can be called from existing data pipelines, orchestrators, and the like, so that the data fed into any on-prem or cloud datastores are made more secure.

The present system and processes are also available for Relational Databases (such as Postgres, Oracle, SQL Server, My SQL, and Maria DB), Large distributed NOSQL stores (such as Mongo, Cassandra, Redis, and Riak), Hadoop Datastores (such as HDFS, Hive, Impala, and HBase), Cloud Object Stores (such as AWS S3, Azure Blob, Azure ADLS Gen2, and GCP GCS), and Cloud Databases and Data Warehouses (such as AWS Redshift, Snowflake, Azure SQL DWH, AWS DynamoDB, Azure CosmosDB, and GCP BigQuery).

N. Edge Deployed Engine

Finally in the world where all things are connected, the Internet of Things world, data generation increasingly occurs in edge or field-deployed devices such as sensors, probes, and client agents (like virus scanners on laptops). These agents generate data that is often very sensitive and must be protected. It is possible to tangle the data from the beginning in these devices so that tangling of the data happens at the source. Such data could be ingested into any of the enterprise data services listed above. As long as these systems are protected with the present systems and processes, they would be able to read and make sense of the data.

V. Text Entanglement Using Three (or Higher) Dimensional Cubes

According to some embodiments, the present system and process for using three-dimensional cubes generally follows the sequence below:

1. Receive strong crypto key (K) as input.
2. Derive field level key (FK) from K.
3. Derive rotation steps from FK.
4. Initialize the cube.
5. Apply rotations to the initialized cube to create interim scrambled cube (ISC).
6. Apply the KFY algorithm to shuffle the ISC using seed derived from FK and create a final scrambled cube (FSC).
7. Project FK on FSC and record FK Coordinate Triplets (FKCT).
8. Project original cleartext input string (O) on FSC and record O Coordinate Triplets (OCT)
9. Calculate the vector distance between FK and O on FSC by subtracting OCT from FKCT. This is a coordinate difference string (CDS)
10. Extract 13 printable characters from FSC (deterministically), referred to as the lucky 13 character set.

However, the choice of a 13 character set is not limiting. In its most general form, a unique character for each possible coordinate per dimension is required. So the number of character sets may vary based on the number of dimensions. It can also vary if more than one character is used to represent a single coordinate position in a given dimension. The algorithm would then use "or" statements to select either character while performing search. This process would add iterations to the search algorithm, but make the resulting entangled string more secure.

11. Map each of the values from −6 to +6 to the lucky 13 character set.
12. Rewrite CDS in terms of the lucky 13 set to produce an L13 string (L13).
13. Apply KFY to L13 to create shuffled L13 (SL13).
14. Apply traditional symmetric key encryption to all fragments of L13 (SL13) as well as to the entire entangled string prior to storage.

A. Receive Strong Crypto Key (K) as Input

The present system includes a data entanglement engine that receives both the cleartext string (O) and the strong crypto key (K) as input, as described above. Crypto keys can be anywhere from 256 to 4096 bits depending on the algorithm being used to generate it. The key length is maintained as a variable.

Keys from vaults are generated in bits not bytes and are not aware of their corresponding character or number representations.

The present system uses keys one byte at a time and therefore processes keys as a series of numbers between 0 and 256. When the present system entangles keywords (which is text field with a predetermined max length), the present system applies a version of the key to the original input string O. If length of O is longer than the key that is used to entangle it, the present system loops back and reuses the key from the beginning. As long as O is shorter than the key used to entangle it, there is no reuse. If O is longer, however, the key is reused as many times as needed. For this reason, the present engine determines the key length.

The present engine treats the original string O as a series of bytes. Regardless of how the string is encoded (e.g., ASCII or other), the present engine breaks it down into a byte array and looks at it one byte at a time. In this respect, both O and K are treated the same way.

B. Derive Field Level Key (FK) from K

The present system uses HDKF, which is a simple key derivation function (KDF) based on a hash-based message authentication code (HMAC). HKDF extracts a pseudorandom key (PRK) using an HMAC hash function (e.g. HMAC-SHA256) on an optional salt (acting as a key) and any potentially weak input key material (IKM) (acting as data). It then generates similarly cryptographically strong output key material (OKM) of any desired length by repeatedly generating PRK-keyed hash-blocks, appending them into the output key material, and finally truncating them to the desired length. For added security, the PRK-keyed HMAC-hashed blocks are chained during their generation by prepending the previous hash block to an incrementing 8-bit counter using an optional context string in the middle, and prior to being hashed by HMAC, to generate the current hash block. HKDF does not amplify entropy. However, it does allow a large source of weaker entropy to be utilized evenly and effectively.

The present system uses the strong crypto key K and a field identifier different from the Field Name as input. According to some embodiments, the field identifier used herein becomes an integral part of the key, and for this reason, the field identifier is thought of as a salt. These field level salts will need to be stored somewhere for easy retrieval when they need to be combined with K to produce FK.

Once K and the field identifier (salt) is fed into the HKDF, FK is determined. Since data entanglement is applied at a field level, the actual key used for entanglement is FK.

C. Derive Rotation Steps from FK

The present process utilizes a 7×7 cube shown in FIG. 1 to implement a spatial tangling routine. Each position on the face of the cube is used to represent a value that can be taken by one byte of data. 7×7 allows for the representation of the total number of values (i.e., 256) that can be represented by 8 bits. A 7×7 cube can hold 7×7×6=294 pieces of data on its faces.

A cube can hold more data in two ways, by having a bigger square on each face (e.g., 8×8, 9×9, etc.) or by adding dimensions to it. In the latter case, the "cube" departs from the strict geometrical sense of the regular cube. For example, adding dimensions to cube results in a tesseract with four or more dimensions (a higher dimensional "cube").

An n×n cube where n is larger than 7 holds more values than 294 and processes more than a single byte of data at a time. A higher dimensional cube where n is equal to 7 but the dimensions are more than 3, creates more complex rotations and be more difficult to brute force.

The present system extracts a set of steps from FK that are used to scramble an initialized cube with the idea of utilizing that scrambled cube later. If moves are randomly selected, it takes a minimum of n×6 moves to attain the maximum entropy—i.e., to make it fully shuffled. After that point, additional moves reduce the entropy relative to the original state of the cube. According to some embodiments, the minimum number of moves is 7×6=42. Therefore, 42 moves from FK are derived.

Moves are defined as the smallest unit of rotation that can be applied to a cube. FIG. 1 provides clarification on row, column, and slice names used in the next few sections. In FIG. 1, Row 1, Column 1 and slice 1 are identified. Row numbers would follow Row 1 and proceed until Row 7, which is the bottom row of the cube. Similarly, column 1 is the left most column from a total of 7 columns. Similarly, with slices, there are a total of 7 slices with the front most face labeled as slice 1.

According to some embodiments, the 42 moves are shown in the table below and are numbered so that the numbers derived from FK can be applied to the cube as represented by this list:

| Move # | Description | Move # | Description |
|---|---|---|---|
| 1 | Row 1 Right | 22 | Slice 4 Clockwise |
| 2 | Row 1 Left | 23 | Slice 5 Anticlockwise |
| 3 | Row 2 Right | 24 | Slice 5 Clockwise |
| 4 | Row 2 Left | 25 | Slice 6 Anticlockwise |
| 5 | Row 3 Right | 26 | Slice 6 Clockwise |
| 6 | Row 3 Left | 27 | Slice 7 Anticlockwise |
| 7 | Row 4 Right | 28 | Slice 7 Clockwise |
| 8 | Row 4 Left | 29 | Column 7 Up |
| 9 | Row 5 Right | 30 | Column 7 Down |
| 10 | Row 5 Left | 31 | Column 6 Up |
| 11 | Row 6 Right | 32 | Column 6 Down |
| 12 | Row 6 Left | 33 | Column 5 Up |
| 13 | Row 7 Right | 34 | Column 5 Down |
| 14 | Row 7 Left | 35 | Column 4 Up |
| 15 | Slice 1 Anticlockwise | 36 | Column 4 Down |
| 16 | Slice 1 Clockwise | 37 | Column 3 Up |

-continued

| Move # | Description | Move # | Description |
|---|---|---|---|
| 17 | Slice 2 Anticlockwise | 38 | Column 3 Down |
| 18 | Slice 2 Clockwise | 39 | Column 2 Up |
| 19 | Slice 3 Anticlockwise | 40 | Column 2 Down |
| 20 | Slice 3 Clockwise | 41 | Column 1 Up |
| 21 | Slice 4 Anticlockwise | 42 | Column 1 Down |

According to some embodiments, the move numbers are selected in the following manner:

1. Examine FK one byte at a time and translate each byte to a number. A byte will yield a number between 0 and 255.
2. Add 1 to the resulting number. 1 is added to the number upfront because there is no move 0. Thus, the numbering scheme for the 42 moves starts from move 1, not zero.
3. If the resulting number is less than 42, use that number to represent a move number in the list.
4. If the resulting number is greater than 42, divide the number by 42 and extract the remainder. The remainder will always be a number between 1 and 42.
5. If the entire string is exhausted and there are not enough moves, go back to the front of the FK string and recycle the moves from the front of the string until the total number of moves is equal to 42. For example, a 256-bit key yields 32 moves. The rest of the moves to reach a total number of 42 are produced by recycling the moves from the front of the string.
6. Apply the KFY shuffle to this list of moves in order to shuffle it. Use FK as a seed.
7. Examine the resulting string and check whether the same move is repeated more than 3 times in a row. If it does, keep only the first 3 instances of the same move.
8. If a move is dropped because it was repeated more than 3 times, the move string will become shorter than 42 moves. In this case, additional moves can be picked from the front of the string until the total number of moves becomes equal to 42.

This is the final list of moves to be used for scrambling the cube.

D. Initialize Cube

Before the cube is scrambled, it is first initialized. Initialization happens in a way so that the entire transformation is deterministic and precise. The cube is initialized across all faces, rows, and columns starting with face 1, row 1, and column 1 (e.g., F1R1C1) and ending with face 6, row 7, and column 7 (e.g., F6R7C7). Each position on the cube defined by a face, row, column (FRC) is assigned a numeric value between 0 and 293. More specifically, the first face, row, and column (e.g., F1R1C1) is assigned value 1, and the last two positions, F6R7C6 and F6R7C7, are assigned values 293 and 0, respectively.

According to some embodiments, FIG. 2 illustrates the initialized cube as described above in the form of a net or flattened cube.

E. Apply Rotations to Initialized Cube to Create Interim Scrambled Cube (ISC)

Once the cube has been initialized, the present system performs the rotations discussed above. For each rotation, the positions on the cube move according to what would happen if a real 7×7 cube were to undergo these rotations. This section shows each of these rotations and the expected outcome relative to the initialized cube shown in FIG. 2.

It is noted that each subsequent rotation (e.g., move) applies to the cube formed from the immediately previous rotation. Therefore, the initialized cube is only used as the starting point for the first rotation. The reason each and every rotation is shown in relation to the initialized cube is because the correctness of the rotations can be verified by testing them one at a time against the initialized cube.

The resulting cubes from the rotations (moves) are shown in FIGS. 3 through 44. In FIGS. 3-44, cells highlighted gray represent positions on the cube impacted by the corresponding rotation or move. Non-highlighted cells represent positions on the cube that are not impacted. The table below lists the moves or rotations performed to the initialized cube shown in FIG. 1.

| Move # | Description | FIG. | Move # | Description | FIG. |
|---|---|---|---|---|---|
| 1 | Row 1 Right | 3 | 22 | slice 4 clockwise | 24 |
| 2 | Row 1 Left | 4 | 23 | slice 5 anticlockwise | 25 |
| 3 | Row 2 Right | 5 | 24 | slice 5 clockwise | 26 |
| 4 | Row 2 Left | 6 | 25 | slice 6 anticlockwise | 27 |
| 5 | Row 3 Right | 7 | 26 | slice 6 clockwise | 28 |
| 6 | Row 3 Left | 8 | 27 | slice 7 anticlockwise | 29 |
| 7 | Row 4 Right | 9 | 28 | slice 7 clockwise | 30 |
| 8 | Row 4 Left | 10 | 29 | Column 7 Up | 31 |
| 9 | Row 5 Right | 11 | 30 | Column 7 Down | 32 |
| 10 | Row 5 Left | 12 | 31 | Column 6 Up | 33 |
| 11 | Row 6 Right | 13 | 32 | Column 6 Down | 34 |
| 12 | Row 6 Left | 14 | 33 | Column 5 Up | 35 |
| 13 | Row 7 Right | 15 | 34 | Column 5 Down | 36 |
| 14 | Row 7 Left | 16 | 35 | Column 4 Up | 37 |
| 15 | slice 1 anticlockwise | 17 | 36 | Column 4 Down | 38 |
| 16 | slice 1 clockwise | 18 | 37 | Column 3 Up | 39 |
| 17 | slice 2 anticlockwise | 19 | 38 | Column 3 Down | 40 |
| 18 | slice 2 clockwise | 20 | 39 | Column 2 Up | 41 |
| 19 | slice 3 anticlockwise | 21 | 40 | Column 2 Down | 42 |
| 20 | slice 3 clockwise | 22 | 41 | Column 1 Up | 43 |
| 21 | slice 4 anticlockwise | 23 | 42 | Column 1 Down | 44 |

F. Apply KFY Shuffle to ISC Using Seed Derived from FK to Create Final Scrambled Cube (FSC)

Once all the moves have been applied to the initialized cube and the interim shuffled cube ISC is determined, ISC is viewed like an array and a KFY shuffle is applied to it. The KFY is used as a secondary shuffle after the cube rotation. FK seeds the KFY shuffle. The result of this shuffle provides the final shuffled cube (FSC).

G. Project FK on FSC and Record FK Coordinate Triplets (FKCT)

The present system entangles O (the original input string) with the FK. This is achieved by projecting the FK on to FSC by reading the FK one byte at a time as a number between 0 and 255, and finding the coordinates of the first byte on the FSC and recording them as a triplet.

Repeat the same process for each byte of the FK until there is a string of coordinate triplets representing the entire FK. The string of coordinate triplets, which is the FKCT string, is 3 times the length of the FK. Further, each coordinate triplet has a face number, a row number, and a column number that identifies its position on the FSC.

H. Project Original Cleartext Input String (O) on FSC and Record O Coordinate Triplets (OCT)

According to some embodiments, projecting the original cleartext input string O on to the FSC includes reading O (one byte at a time) as a number between 0 and 255, finding the coordinates of the first byte on the FSC and recording them as a triplet. Repeat the same process for each byte of O until a string of coordinate triplets is obtained. The string of coordinate triplets, which is the OCT string, represents the entire string O. In some embodiments, the OCT string is 3 times the length of O. Further, each triplet will have a face number (1-6), a row number (1-7), and a column number (1-7) that identifies the position of the corresponding character on the FSC.

I. Calculate Vector Distance Between FK and O on FSC by Subtracting OCT from FKCT The next step is to use each character in the FK to locate the corresponding character of string O on FSC. This is achieved by taking the vector difference between FKCT and OCT character by character. According to some embodiments, and for each character from left to right, the following process is performed:

1. Subtract OCT from FKCT so that the first triplet in OCT will be subtracted from the first triplet in FKCT, the second triplet in OCT will be subtracted from the second triplet in FKCT, and so on.
2. In the event that the FK is shorter than string O, in which case there will be a shortage of characters (and coordinates) before the entire string O is processed, circle back to the front of the FK and use the first characters coordinates against the next character of O.
3. The previous step results in a set of numbers between −6 and +6.
4. Once the coordinate differences are determined, the present system adds 6 to each set of numbers—e.g., resulting in numbers between 0 and 12.

The final string of numbers between 0 and 12 (ends inclusive) is the coordinate difference string, CDS. An example is provided in the table below.

| | FK | | | | O | | | |
|---|---|---|---|---|---|---|---|---|
| Characters | 1 | a | 9 | $ | a | r | t | 1 |
| Coordinate Triplets | 1, 5, 7 | 6, 7, 7 | 2, 5, 3 | 4, 2, 1 | 6, 7, 7 | 1, 4, 7 | 3, 3, 3 | 1, 5, 7 |
| FKCT/OCT | 157677253421 | | | | 677147333157 | | | |
| FKCT − OCT | −6, −2, 0 | | 6, 3, 0 | | −1, 2, 0 | | 3, −3, −6 | |
| Adding 6 | 0, 4, 6 | | 12, 9, 6 | | 5, 8, 6 | | 9, 3, 0 | |
| CDS | 0 4 6 12 9 6 5 8 6 9 3 0 | | | | | | | |

J. Extract Printable Characters from FSC (Deterministically)

Since 13 unique characters are used to represent entangled data, the present system can create additional security by selecting a different set of 13 based on the FK. These are selected from a printable ASCII set. And because these 13 characters are used in the entangled string, the process of selecting them does not disclose any information about K, FK or O.

In some embodiments, FK and FSC can be used as follows to select the 13 characters:

1. Identify the number represented by the first byte of the FK. This will be a number m between 0 and 255.
2. Examine the FSC array and select the $m^{th}$ position in that array. If this is a printable character, it becomes the first of the 13 characters. If it is not, the very next character in the array may be selected, or the next one after that until a printable character is found.
3. For the second character, the same process is repeated using the second byte of the FK. The same check is performed as discussed above, along with one additional check:
   a. If it is not printable, grab the next available character; and
   b. once a printable character has been identified, the system checks if it has already been part of the 13 character set. If it has, the system discards it and determines the next acceptable character after that.
4. The system continues until 13 unique printable characters are obtained with the process described above.

K. Map Each of the Values −6 . . . +6 to the 13 Character Set

With the 13 unique printable characters derived from the FK, the present system maps them to the CDS numbers. The table below includes a sample mapping:

| CDS characters | 0 | 1 | 2 | 3 | 4 | 5 | 6 | 7 | 8 | 9 | 10 | 11 | 12 |
|---|---|---|---|---|---|---|---|---|---|---|---|---|---|
| L13 characters | $ | [ | a | H | 6 | s | * | & | c | P | n | { | @ |

L. Rewrite CDS in Terms of the 13 Number Set. This Becomes the L13 String (L13)

The CDS is expressed in terms of the lucky 13 characters, as the L13 string shown in the table below.

| | |
|---|---|
| CDS | 0 4 6 12 9 6 5 8 6 9 3 0 |
| L13 | $6*@P*sc*PH$ |

M. Apply the KFY Algorithm to L13 to Create Shuffled L13 (SL13)

The final step in the present entanglement process is to apply the KFY shuffle to L13. This becomes the shuffled L13 or the SL13 string and this is what the present system stores as entangled data. For the original string arti used above, the present system generates the following entangled string, @**$cPsH$6P*. It is noted that the entangled string is 3-times the size of the input string O and is made up entirely of L13 characters. The entire transformation is shown in the table below.

| | FK | | | | O | | | |
|---|---|---|---|---|---|---|---|---|
| Characters | 1 | a | 9 | $ | a | r | t | 1 |
| Coordinate Triplets | 1, 5, 7 | 6, 7, 7 | 2, 5, 3 | 4, 2, 1 | 6, 7, 7 | 1, 4, 7 | 3, 3, 3 | 1, 5, 7 |
| FKCT/OCT | 157677253421 | | | | 677147333157 | | | |
| FKCT − OCT | −6, −2, 0 | | 6, 3, 0 | | −1, 2, 0 | | 3, −3, −6 | |
| +6 | 0, 4, 6 | | 12, 9, 6 | | 5, 8, 6 | | 9, 3, 0 | |
| CDS | 0 4 6 12 9 6 5 8 6 9 3 0 | | | | | | | |
| L13 | $6*@P*sc*PH$ | | | | | | | |
| SL13 | @**$cPsH$6P*. | | | | | | | |

N. Apply Symmetric Encryption to all String Fragments Used to Create the Search Index O. Additional Entangled Forms Since entanglement supports various types of searches, entangled strings are generated in forms that enable existing native search algorithms to work (e.g. Elastic native search). For every given cleartext input, O, the following forms of entangled text are generated:

1. SL13: The shuffled entangled string (as above) with traditional symmetric key encryption applied on top of it.
2. L13: The unshuffled form of the entangled string with traditional symmetric key encryption applied on top of all searchable fragments used to construct the search index. This is what is used to support search
3. RL13: This is the product when the original string is entangled in reverse order—i.e., backwards. RL13 is used to support suffix search. For example, if O is arti and suffix search needs to be supported, the process below is followed:

a. Reverse the string—i.e., write the string backwards as itra (RO).

b. Entangle RO just like the original string O to produce RL13.

c. Apply traditional symmetric key encryption to the entire string as well as any fragments used to construct the search index.

d. L13_1, L13_2, . . . , L13 k, where K is the length of the keyword that is being entangled. These are fragments of L13 which are created by extracting 3 characters at a time (e.g., one triplet). L13_1 would be the first triplet or the first 3 characters of the L13 string, L13_2 would be the second triplet or characters 4, 5 and 6 of the L13 string, and so on. These are used to support wildcard searches. Apply traditional symmetric key encryption to each individual fragment.

P. Untangling

Untangling is the reverse of the entangling operation described above. According to some embodiments, untangling process described below uses K and LS13 as the inputs, and outputs the original cleartext string O. By way of example and not limitation, the untangling process includes the following steps:

1. K and LS13 are inputs.
2. Decrypt the original LS13 to counter the traditional symmetric key encryption. And assign it back to LS13.
3. Derive FK from K.
4. Unshuffle SL13 using a reverse KFY with a deterministic seed derived from FK to obtain the L13 string.
5. Initialize the cube.
6. Use FK to derive the rotation moves for the initialized cube.
7. Apply the rotation moves to the initialized cube to obtain an ISC.
8. Apply FKY to the ISC to create FSC.
9. Project the FK on FSC and derive FKCT.
10. Subtract 6 from each L13 character to arrive at CDS.
11. Calculate OCT by subtracting the CDS from FKCT (e.g., OCT=FKCT−CDS).
12. Use the coordinate triplets from OCT string to identify each character in the input string O.

Q. Search

Text Entanglement supports, at least, the following types of search: Exact Match, Prefix, Suffix, and Wildcard. Each of these search types is discussed below.

1. Exact Match

According to some embodiments, an exact match search uses the following inputs: a search term, ST, and K. The operations or steps for an exact match follow the entanglement steps and entangle ST up to the point of obtaining L13 (the unshuffled entangled string). L13 can be subsequently supplied to a search engine such as Elasticsearch for the exact match search.

2. Prefix

According to some embodiments, an exact match search uses the following inputs: a prefix term, ST, and K. The operations or steps for a prefix search follow the entanglement steps and entangle ST up to the point of creating L13 (the unshuffled entangled string). L13 can be subsequently supplied to a search engine such as Elasticsearch (ES) for the prefix search.

3. Suffix

According to some embodiments, suffix search uses the following inputs: a suffix term, ST, and K. The operations or steps for the suffix search include the following additional steps: reverse the term supplied, followed by entangling it until the L13 string is created. It is noted that shuffling is not permitted.

The output from the above step is searched against the suffix field which is the RL13 field.

4. Wildcard

According to some embodiments, suffix search uses the following inputs: a wildcard term, ST, and K. According to one embodiment, the wildcard is tested against each of the fragment fields L13_1, L13_2, etc. The operations or steps for the wildcard search include the following additional steps:

1. Derive FK from K, derive rotations and arrive at FSC and FKCT.
2. Project ST onto the cube and arrive at OCT using ST as the original input text; and generate two sets of coordinate triplets. Each triplet is numbered in the following manner:

| Position on the string | FKCT (Coordinate triplets for FK) | OCT for ST (Coordinate triplets for ST) |
|---|---|---|
| 1 | K1 | S1 |
| 2 | K2 | S2 |
| 3 | K3 | S3 |
| 4 | K4 | S4 |
| 5 | K5 | — |
| 6 | K6 | — |
| 7 | K7 | — |
| 8 | K8 | — |

3. A Search Term is 4 characters long, the key FK is 8 characters long, the keyword field is also 8 characters long is handled as follows. Since the wildcard can begin anywhere in the string, the present system generates Search Terms for each possible positions. This is done by assuming each starting position separately and calculating coordinate difference string CDS for each one and then creating the entangled string for each one. In the table below K1-S1 means the coordinate differences are subtracted for the first character of the Search Term from the first character of the key FK and so on.

| Position on keyword string | CDS | L13 |
|---|---|---|
| 1 | K1-S1, K2-S2, K3-S3, K4-S4 | Convert to L13_1 |
| 2 | K2-S1, K3-S2, K4-S3, K5-S4 | Convert to L13_2 |
| 3 | K3-S1, K4-S2, K5-S3, K6-S4 | Convert to L13_3 |
| 4 | K4-S1, K5-S2, K6-S3, K7-S4 | Convert to L13_4 |
| 5 | K5-S1, K6-S2, K7-S3, K8-S4 | Convert to L13_5 |
| 6 | — | |
| 7 | — | |
| 8 | — | |

4. Once the CDS is created for each term, create the corresponding L13.
5. Each L13 derived as above becomes one of the Search Terms used for the wildcard search.

VI. Using Data Entanglement to Protect Computer Systems from Malware Including Ransomware Data Entanglement can be used to protect computer systems from malware, including ransomware. This section will cover the following topics:

- A. Variation of entanglement algorithm that is employed for malware protection.
- B. Preventing attackers from identifying specific file types.
- C. Preventing unauthorized programs from executing.
- D. General representation of the two implementations above.

A. Entanglement Process

In this application of data entanglement, the present system uses two keys (called helper keys in the example below) derived from a master key, and other segments of the master key, to create two cubes. These cubes are used to generate a large number of variations of entangled strings based on the same input cleartext, and can be uniquely resolved back to the original cleartext. It is noted that the security of each entangled string can be further improved by using encryption, such as traditional symmetric key encryption, on top of the entanglement steps.

An example, which may find application in malware protection, is provided below with a full key as 12ty156t1234 and the following segments: input text arti, helper key 1 as 12ty, and helper key 2 as 156t. The initialized cube, and shuffled cubes 1 and 2 are provided below:

| | F1 | | | F2 | | | F3 | | | F4 | | | F5 | | | F6 | | |
|---|---|---|---|---|---|---|---|---|---|---|---|---|---|---|---|---|---|---|
| | C1 | C2 | C3 | C1 | C2 | C3 | C1 | C2 | C3 | C1 | C2 | C3 | C1 | C2 | C3 | C1 | C2 | C3 |
| INITIALIZED CUBE: 1 2 3 4 5 6 7 8 9 0 a b c d e f g h i j k l m n o p q r s t u v w x y z A B C D E F G H S J K L M N O P Q R | | | | | | | | | | | | | | | | | | |
| R1 | 1 | 2 | 3 | 0 | a | b | i | j | k | r | s | t | A | B | C | J | K | L |
| R2 | 4 | 5 | 6 | c | d | e | l | m | n | u | v | w | D | E | F | M | N | O |
| R3 | 7 | 8 | 9 | f | g | h | o | p | q | x | y | z | G | H | S | P | Q | R |
| SHUFFLED CUBE 1: t 8 o 1 D v a k h q Q 5 J 2 c f F K 3 R e 4 O x 0 L u P y M s m 9 b n i z w g I N G p j H A 7 l B 6 C r d E | | | | | | | | | | | | | | | | | | |
| R1 | t | 8 | o | q | Q | 5 | 3 | R | e | P | y | M | z | w | g | A | 7 | S |
| R2 | 1 | D | v | J | 2 | c | 4 | O | x | s | m | 9 | I | N | G | B | 6 | C |
| R3 | a | k | h | f | F | K | 0 | L | u | b | n | i | p | j | H | r | d | E |
| SHUFFLED CUBE 2: d e 9 R F w N 4 Q J a c H l L 1 S f x r t i v 5 B 8 C A K j E G 3 2 n O 6 k D o P q M u 7 m b z h 0 y g p s | | | | | | | | | | | | | | | | | | |
| R1 | d | e | 9 | J | a | c | x | r | t | A | K | j | 6 | k | D | m | b | z |
| R2 | R | F | w | H | I | L | i | v | 5 | E | G | 3 | o | P | q | h | 0 | y |
| R3 | N | 4 | Q | 1 | S | f | B | 8 | C | 2 | n | O | M | u | 7 | g | p | s |

The shuffled cubes are used to create new entangled variations by using coordinates from one cube to hop (as defined in paragraph 0089) to the other cube and so on. During the entangling process, after each hop, the system checks to ensure that an instance is not repeated by accident more than once. If this happens, the hops are terminated at the previous step.

The original data is retrieved by recreating the cubes using the key and reversing the direction of the hops. The helper keys 1 and 2 are used by the system to detect when to terminate hopping from one cube to another. In other words, the entangled process described here uses a fixed random number of hops to generate different outputs for the same input and same key. This is the main difference between the process described here and the FP and Retrieval process described above in section III where a variable number of cube rotations or hops is used based on the previous character output. In some embodiments, the entanglement process described here is a variant of the FP and Retrieval process described above in section III. In some embodiments, this variant of the FP and Retrieval process finds application in malware protection.

The table below list all the possible hops, according to some embodiments.

| | a | r | t | i | 1 | 2 | 3 | 4 |
|---|---|---|---|---|---|---|---|---|
| Hop 1a | 131 | 631 | 111 | 433 | 121 | 221 | 311 | 321 |
| Hop 1b | N | g | d | O | R | H | x | i |
| Hop 2a | 522 | 513 | 632 | 322 | 312 | 533 | 323 | 433 |
| Hop 2b | P | D | p | v | r | 7 | 5 | O |
| Hop 3a | 411 | 122 | 531 | 123 | 631 | 612 | 213 | 322 |
| Hop 3b | A | F | N | w | g | b | c | v |
| Hop 4a | 611 | 232 | 522 | 512 | 513 | 431 | 223 | 123 |
| Hop 4b | m | S | P | k | D | 2 | L | w |
| Hop 5a | 422 | 613 | 411 | 132 | 122 | 222 | 332 | 512 |
| Hop 5b | G | z | A | 4 | F | I | 8 | k |

After all the above steps, for the text input arti, the following entangled strings are obtained: Entangled string 1: NgdORHxi, Entangled string 2: PDpvr75O, Entangled string 3: AFNwgbcv, Entangled string 4: mSPkD2Lw, and Entangled string 5: GzA4Figk.

B. Preventing Attackers from Identifying Specific File Types

According to some embodiments, entangling file names or other file identification attributes using the process described above, prevents attackers from identifying specific file types. Since the entanglement process described above yields a large number of different entangled strings, file extensions and other identifying attributes for same file types would look different. Nevertheless, the operating system or applications that need to retrieve the files would still be able to locate them with the present system. However, to an outsider, the file system would be unusable.

C. Preventing Unauthorized Programs from Executing

Data entanglement can prevent unauthorized files from executing by changing the operating's system default process to untangle every file prior to reading it. Files are tangled with an instance of a specific key prior to being placed on the system that is being protected. Once on the target system, these files would work as designed since the operating system would always seek to untangle them prior to use. However, any unauthorized file that has not undergone pre-processing, would fail to execute because the default process of untangling it would render it non-executable.

D. General Representation of the Two Implementations Above.

Option 1: File Translation Layer Inside Application Layer.

Figure 45:
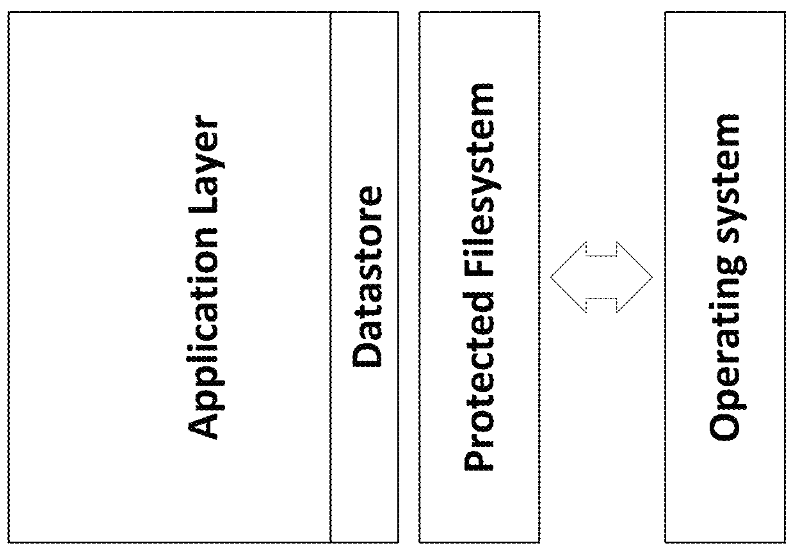
FIG. 45 is a representations of a file translation layer inside an application layer, according to some embodiments.

In option 1 shown in FIG. 45, the application layer when accessing a file in the file system obfuscates the names of the file. The operational sequence is as follows:

1. Application wants to access a file located at /path/filename.
2. Application calls File Translation Layer to convert the path into a protected path.
3. File Translation Layer uses the Protected Filesystem Adapter, to which the present engine builds, to generate a filename that is different from the original path (e.g., /anotherpath/randomfilename)
4. Application layer uses the new path generated by the Protected Filesystem Adapter to communicate with the operating system.

Option 2: Securing Operating System Through Protected Filesystem

Figure 46:
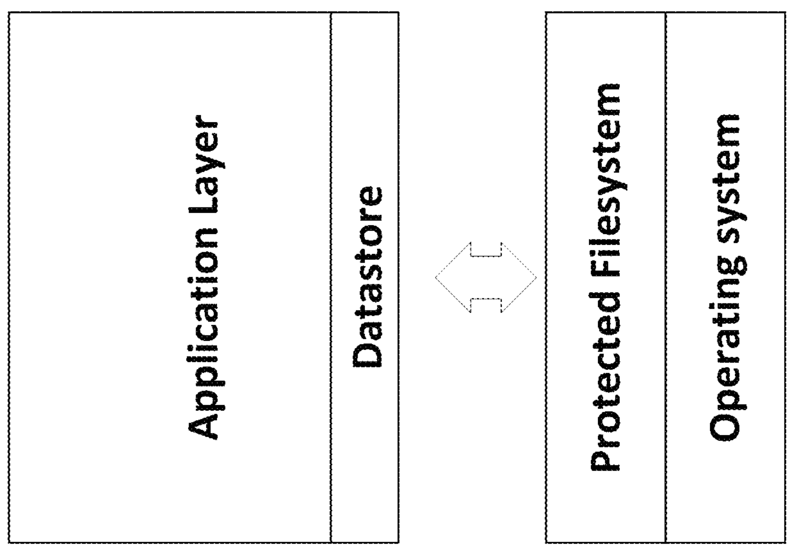
FIG. 46 is a representations of a secured operating system via a Protected Filesystem, according to some embodiments.

In option 2 shown in FIG. 46, the underlying operating system takes the responsibility for creating filenames that are obfuscated and not in cleartext. The application layer communicates with the filesystem using normal application programming interfaces (APIs). At the file system level, the following enhancements occur:

1. Application layer requests access to file /path/filename.
2. Filesystem receives the request.
3. Filesystem translates the request into another unrelated path (e.g., /anotherpath/randomfilename) using a Protected Filesystem Adapter.
4. Filesystem makes an association between the requested path from the application and the real path it generated.
5. For all subsequent requests, the Protected Filesystem Adapter will be used to correctly translate the requests.
6. Protected Filesystem Adapter will also support searches for file names using prefix and suffix queries on files.
7. The Protected Filesystem Adapter's engine does not need a secure storage to keep track of the file translations.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for searchable encryption, the method comprising:

acquiring cleartext strings comprising respective characters, wherein a position of each character in the cleartext strings is defined as a single coordinate in a one-dimensional space;

using a unique multi-dimensional space, altering a positional context of the characters in the cleartext strings so that the position of each character is no longer defined by the single coordinate but by one coordinate in each dimension of the multi-dimensional space;

applying a position specific variability on the cleartext strings so that characters appearing with different coordinates are transformed to different characters; and after applying the position specific variability on the cleartext strings, applying encryption to the characters of the cleartext strings to form encrypted strings, wherein applying the position specific variability on the cleartext strings prior to encryption allows the encrypted strings to become searchable in a search index.

2. The method of claim 1, wherein applying the position specific variability for the cleartext strings reduces a frequency analysis on the searchable encrypted strings.

3. The method of claim 1, wherein generating the multi-dimensional space and applying the position specific variability for the cleartext strings are based on a key.

4. The method of claim 3, the key comprises a cryptographic key.

5. The method of claim 1, wherein the encryption is a symmetric key encryption.

6. The method of claim 1, further comprising applying the position specific variability and encryption on n-grams of text inputs to execute partial match searches on encrypted text and to prevent frequency attacks.

7. The method of claim 6, wherein the partial match searches comprise prefix, suffix, wildcard and position-specific patterns (RegEx) searches.

8. A method for searchable encryption, the method comprising:

applying a confusion process to characters of a cleartext string to produce an entangled string by using a unique multi-dimensional space to alter a positional context of the characters in the cleartext string so that a position of each character is no longer defined by a single coordinate in a one-dimensional space but by one coordinate in each dimension of the multi-dimensional space, wherein the entangled string preserves character positional information from the cleartext string; and after applying the confusion process, applying encryption to the entangled string to form an encrypted string, wherein applying the confusion process on the cleartext string prior to encryption allows the encrypted string to become searchable in a search index based at least on the positional information.

9. The method of claim 8, further comprising, before applying the encryption, applying a diffusion process to the cleartext string so that characters in the entangled string are altered from those in the cleartext string.

10. The method of claim 9, wherein the diffusion process preserves term information for the characters in the cleartext string.

11. The method of claim 10, wherein applying the diffusion process allows the encrypted string to become searchable in the search index based at least on the term information.

12. The method of claim 9, wherein both the confusion process and the diffusion process are non-static and are based on a cryptographic key.

13. The method of claim 9, wherein the entangled string and the cleartext string have a different number of characters.

14. The method of claim 8, wherein applying the confusion process to the cleartext string comprises using a key to create the unique multi-dimensional space.

15. A method for searchable encryption, the method comprising:
- using a unique multi-dimensional space, altering a positional context of characters in cleartext strings so that a position of each character within the cleartext strings is defined by one coordinate in each dimension of the multi-dimensional space;
- applying a position specific variability on the cleartext strings so that characters appearing with different coordinates are transformed to different characters, wherein the position specific variability preserves character positional information and character context information for each character in the cleartext strings; and
- applying encryption to the characters of the cleartext strings to produce encrypted strings, wherein applying the position specific variability on the cleartext strings prior to encryption allows the encrypted strings to become searchable in a search index based on the character positional information and character context information.

16. The method of claim 15, wherein applying the position specific variability on the characters of the cleartext strings comprises using a key to create the unique multi-dimensional space.

17. The method of claim 16, wherein the key comprises a cryptographic key.

18. The method of claim 15, further comprising applying the position specific variability and encryption on n-grams of text inputs to execute partial match searches on encrypted text.

19. The method of claim 15, wherein applying the position specific variability on the characters of the cleartext strings transforms the cleartext strings to entangled strings with a different number of characters form those in the cleartext strings.

20. The method of claim 15, wherein applying the encryption comprises creating index fragments and applying a symmetric key encryption to each fragment.

* * * * *